US012257834B2

(12) United States Patent
Kashimura

(10) Patent No.: US 12,257,834 B2

(45) Date of Patent: Mar. 25, 2025

(54) LIQUID DISCHARGE DEVICE AND WIRING SUBSTRATE

(71) Applicant: SEIKO EPSON CORPORATION, Tokyo (JP)

(72) Inventor: Toru Kashimura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 204 days.

(21) Appl. No.: 18/192,318

(22) Filed: Mar. 29, 2023

(65) Prior Publication Data

US 2023/0311492 A1 Oct. 5, 2023

(30) Foreign Application Priority Data

Mar. 31, 2022 (JP) ................................. 2022-058556

(51) Int. Cl.

*B41J 2/045* (2006.01)

*B41J 2/14* (2006.01)

(52) U.S. Cl.

CPC ....... *B41J 2/04581* (2013.01); *B41J 2/04541* (2013.01); *B41J 2/14233* (2013.01); *B41J 2002/14491* (2013.01)

(58) Field of Classification Search

CPC ................ B41J 2/04581; B41J 2/04541; B41J 2/14233; B41J 2002/14491; B41J 2002/14241; B41J 2002/14362; B41J 2002/14419; B41J 2202/08; B41J 2202/18; B41J 2202/20; B41J 2/0455; B41J 2/04588; B41J 2/04593; B41J 2/04596; B41J 2/14201; B41J 2/04501

See application file for complete search history.

(56) References Cited

U.S. PATENT DOCUMENTS

2018/0178510 A1* 6/2018 Nakajima ............ B41J 2/04588

FOREIGN PATENT DOCUMENTS

JP 2018-099865 A 6/2018

* cited by examiner

*Primary Examiner* — Lisa Solomon

(74) *Attorney, Agent, or Firm* — Global IP Counselors, LLP

(57) ABSTRACT

A liquid discharge device in which an inter-wiring region between a first wiring through which a first drive signal, and a second wiring through which a second drive signal propagates includes a wide inter-wiring region in which an inter-wiring distance between the first wiring and the second wiring is larger than a sum of a wire width of a fourth wiring and a minimum diameter of a via wiring, and a narrow inter-wiring region in which the inter-wiring distance is smaller than the sum of the wire width of the fourth wiring and the minimum diameter of the via wiring, and larger than a wire width of the via wiring, and a third wiring is not located in the narrow inter-wiring region between a virtual line coupling a first terminal and a second terminal, and the wide inter-wiring region, in the inter-wiring region of a first wiring layer.

12 Claims, 22 Drawing Sheets

| [SIH, SIL] | [1, 1] LD | [1, 0] SD | [0, 1] ND | [0, 0] BSD |
|---|---|---|---|---|
| S1 | H | L | L | L |
| S2 | L | H | L | L |
| S3 | L | L | L | H |

LIQUID DISCHARGE DEVICE AND WIRING SUBSTRATE

The present application is based on, and claims priority from JP Application Serial Number 2022-058556, filed Mar. 31, 2022, the disclosure of which is hereby incorporated by reference herein in its entirety.

BACKGROUND

1. Technical Field

The present disclosure relates to a liquid discharge device and a wiring substrate.

2. Related Art

As a liquid discharge device that discharges a liquid to form a document or an image on a medium, a device using a piezoelectric element is known. Piezoelectric elements are provided corresponding to each of a plurality of discharge portions in a print head. When the piezoelectric element is driven according to a drive signal, an amount of liquid is discharged from the corresponding discharge portion according to the drive of the piezoelectric element, and dots are formed on the medium.

In JP-A-2018-099865, a liquid discharge device is described that discharges liquid from a discharge portion by driving a piezoelectric element with a drive signal supplied to one end of the piezoelectric element and a reference voltage signal supplied to the other end of the piezoelectric element, and that includes a drive circuit substrate provided such that a wiring through which a drive signal propagates and a wiring through which a reference voltage signal propagates overlap with each other along a normal direction.

In the drive circuit substrate provided such that the wiring through which the drive signal propagates and the wiring through which the reference voltage signal propagates overlap with each other along the normal direction as described in JP-A-2018-099865, an inductance component generated by the propagation of the drive signal and an inductance component generated by the propagation of the reference voltage signal VBS are mutually canceled. As a result, the possibility that waveform distortion due to the inductance component occurs in the signal waveform of the drive signal is reduced, and as a result, the waveform accuracy of the drive signal can be improved.

On the other hand, in the liquid discharge device, the demand for increasing the image formation speed on the medium has increased in recent years, and therefore, it is required to increase the speed of a dot formation cycle for forming dots of a desired size on the medium by discharging the liquid. In response to such demands, technological development is performed to realize a high-speed dot formation cycle by shortening a waveform cycle of the drive signal for forming dots on the medium and adding a new drive signal.

However, JP-A-2018-099865 does not describe anything about the disposition of the wiring through which the drive signal propagates when a new drive signal is added, and there is room for improvement.

SUMMARY

According to an aspect of the present disclosure, there is provided a liquid discharge device including a discharge head that includes a first piezoelectric element having a first electrode and a second electrode, and a second piezoelectric element having a third electrode and a fourth electrode, and that discharges a liquid by driving the first piezoelectric element and the second piezoelectric element, and a wiring substrate through which a drive signal for driving the first piezoelectric element and the second piezoelectric element propagates, and includes a plurality of wiring layers provided along a first direction and a via wiring electrically coupling layers of the plurality of wiring layers, in which a first wiring layer among the plurality of wiring layers includes a first wiring through which a first drive signal supplied to the first electrode for driving the first piezoelectric element such that the liquid is discharged from the discharge head propagates, among the drive signals, a second wiring through which a second drive signal supplied to the third electrode for driving the second piezoelectric element such that the liquid is discharged from the discharge head propagates, among the drive signals, and a third wiring in which at least a part thereof located in an inter-wiring region between the first wiring and the second wiring, a second wiring layer among the plurality of wiring layers includes a fourth wiring through which a third drive signal supplied to the first electrode for driving the first piezoelectric element such that the liquid is not discharged from the discharge head propagates, among the drive signals, and a fifth wiring through which a reference voltage signal supplied to the second electrode and the fourth electrode and having a constant voltage value propagates, the wiring substrate includes a first terminal that outputs the first drive signal, and a second terminal that outputs the second drive signal, the first wiring layer and the second wiring layer are located adjacent to each other in the plurality of wiring layers, in a direction along the first direction, at least a part of the fourth wiring is located so as to overlap with the inter-wiring region, the inter-wiring region includes a wide inter-wiring region in which an inter-wiring distance between the first wiring and the second wiring is larger than a sum of a wire width of the fourth wiring and a minimum diameter of the via wiring, and a narrow inter-wiring region in which the inter-wiring distance is smaller than the sum of the wire width of the fourth wiring and the minimum diameter of the via wiring, and larger than a wire width of the via wiring, and the third wiring is not located in the narrow inter-wiring region between a virtual line coupling the first terminal and the second terminal, and the wide inter-wiring region, in the inter-wiring region of the first wiring layer.

According to another aspect of the present disclosure, there is provided a wiring substrate through which a drive signal for driving a first piezoelectric element and a second piezoelectric element propagates to a discharge head which includes the first piezoelectric element having a first electrode and a second electrode, and the second piezoelectric element having a third electrode and a fourth electrode, and which discharges a liquid by driving the first piezoelectric element and the second piezoelectric element, the wiring substrate including a plurality of wiring layers provided along a first direction, a via wiring that electrically couples layers of the plurality of wiring layers, a first terminal that outputs a first drive signal, and a second terminal that outputs a second drive signal, in which a first wiring layer among the plurality of wiring layers includes a first wiring through which a first drive signal supplied to the first electrode for driving the first piezoelectric element such that the liquid is discharged from the discharge head propagates, among the drive signals, a second wiring through which a second drive signal supplied to the third electrode for driving the second piezoelectric element such that the liquid is discharged from the discharge head propagates, among the drive signals, and a third wiring in which at least a part thereof located in an inter-wiring region between the first wiring and the second wiring, a second wiring layer among the plurality of wiring layers includes a fourth wiring through which a third drive signal supplied to the first electrode for driving the first piezoelectric element such that the liquid is not discharged from the discharge head propagates, among the drive signals, and a fifth wiring through which a reference voltage signal supplied to the second electrode and the fourth electrode and having a constant voltage value propagates, the first wiring layer and the second wiring layer are located adjacent to each other in the plurality of wiring layers, in a direction along the first direction, at least a part of the fourth wiring is located so as to overlap with the inter-wiring region, the inter-wiring region includes a wide inter-wiring region in which an inter-wiring distance between the first wiring and the second wiring is larger than a sum of a wire width of the fourth wiring and a minimum diameter of the via wiring, and a narrow inter-wiring region in which the inter-wiring distance is smaller than the sum of the wire width of the fourth wiring and the minimum diameter of the via wiring, and larger than a wire width of the via wiring, and the third wiring is not located in the narrow inter-wiring region between a virtual line coupling the first terminal and the second terminal, and the wide inter-wiring region, in the inter-wiring region of the first wiring layer.

DESCRIPTION OF EXEMPLARY EMBODIMENTS

Hereinafter, preferred embodiments of the present disclosure will be described with reference to the drawings. The drawings used are for convenience of description. The embodiments described below do not unreasonably limit the content of the present disclosure described in the aspects. In addition, not all of the configurations described below are essential constituent requirements of the present disclosure.

1. Configuration of Liquid Discharge Device

Figure 1:
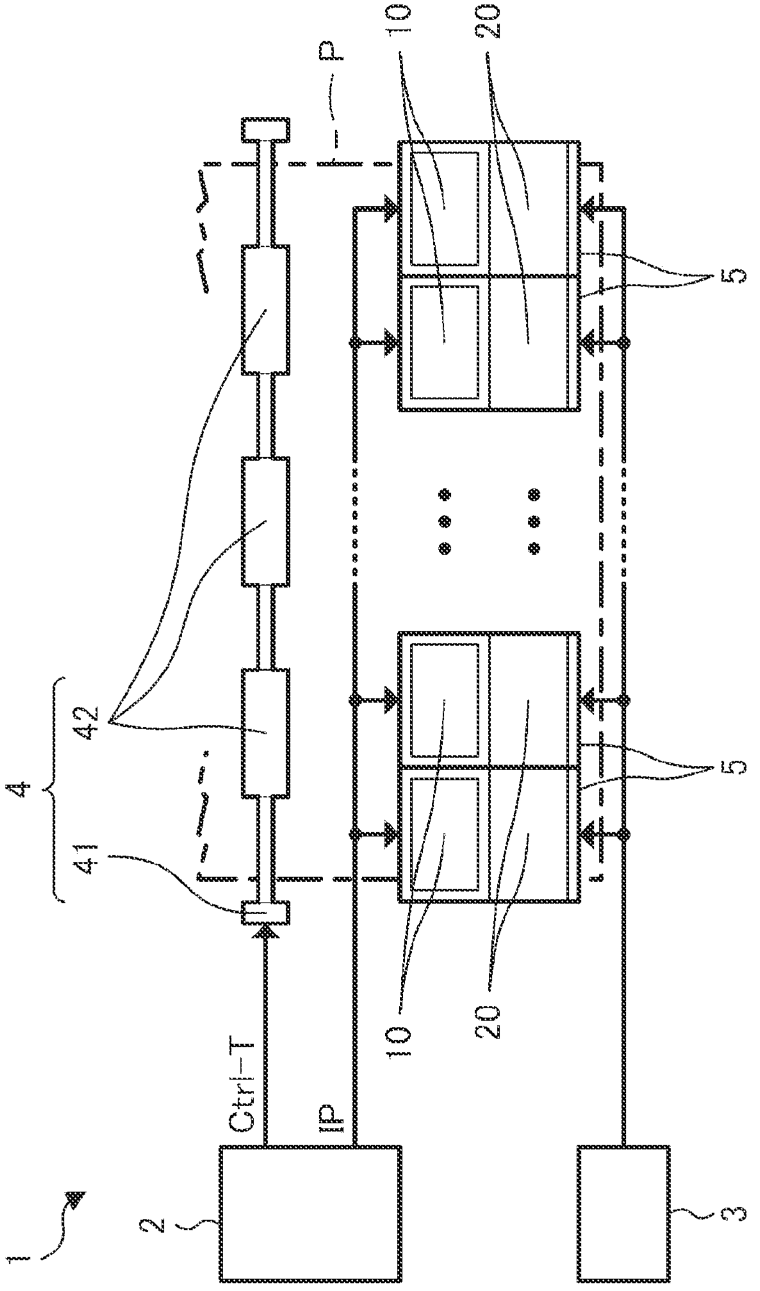
FIG. 1 is a diagram illustrating a schematic configuration of a liquid discharge device.

FIG. 1 is a diagram illustrating a schematic configuration of a liquid discharge device 1. As illustrated in FIG. 1, the liquid discharge device 1 is a so-called line-type ink jet printer that forms a desired image on a medium P by discharging ink at a desired timing on the medium P transported by a transport unit 4. Here, in the following description, a direction where the medium P is transported may be referred to as a transport direction, and a width direction of the transported medium P may be referred to as a main scanning direction.

As illustrated in FIG. 1, the liquid discharge device 1 is provided with a control unit 2, a liquid container 3, a transport unit 4, and a plurality of discharge units 5.

The control unit 2 includes a processing circuit such as a central processing unit (CPU) and a field programmable gate array (FPGA), and a storage circuit such as a semiconductor memory. The control unit 2 outputs a signal for controlling each element of the liquid discharge device 1 based on image data input from an external device such as a host computer (not illustrated) provided outside the liquid discharge device 1.

The ink as an example of the liquid supplied to the discharge unit 5 is stored in the liquid container 3. Specifically, the liquid container 3 stores inks of a plurality of colors discharged on the medium P, such as black, cyan, magenta, yellow, red, and gray.

The transport unit 4 includes a transport motor 41 and a transport roller 42. A transport control signal Ctrl-T output by the control unit 2 is input to the transport unit 4. The transport motor 41 operates based on the input transport control signal Ctrl-T, and the transport roller 42 is rotationally driven with the operation of the transport motor 41. As a result, the medium P is transported along the transport direction.

Each of the plurality of discharge units 5 includes a head drive module 10 and a liquid discharge module 20. An image information signal IP output by the control unit 2 is input to the discharge unit 5, and the ink stored in the liquid container 3 is supplied. The head drive module 10 controls the operation of the liquid discharge module 20 based on the image information signal IP input from the control unit 2, and the liquid discharge module 20 discharges the ink supplied from the liquid container 3 on the medium P according to the control of the head drive module 10.

Here, in the liquid discharge device 1 of the present embodiment, the liquid discharge modules 20 included in each of the plurality of discharge units 5 are located in a row along the main scanning direction so as to be equal to or larger than the width of the medium P. As a result, the liquid discharge module 20 can discharge ink to the entire region of the transported medium P in the width direction. That is, the liquid discharge device 1 of the present embodiment is a so-called line-type ink jet printer in which the plurality of liquid discharge modules 20 located in a row so as to be equal to or larger than the width of the medium P discharge ink as the medium P is transported to form a desired image on the medium P. The liquid discharge device 1 is not limited to the line-type ink jet printer, and may be a so-called serial type ink jet printer in which the liquid discharge module 20 reciprocates along the width direction of the medium P in the main scanning direction and discharges ink on the medium P transported in synchronization with the reciprocating movement to form a desired image on the medium P.

Figure 2:
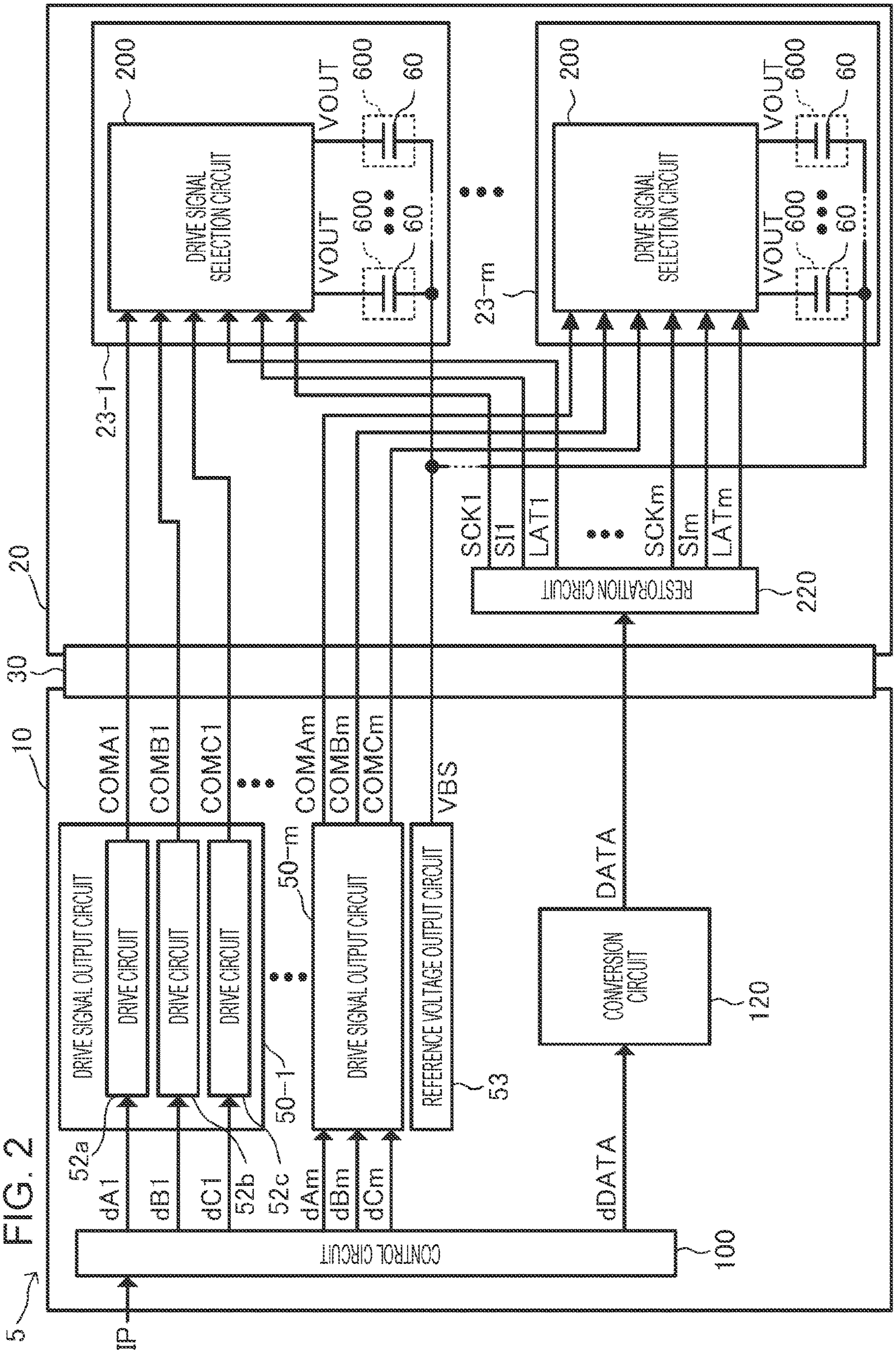
FIG. 2 is a diagram illustrating a schematic configuration of a discharge unit.

Next, a schematic configuration of the discharge unit 5 will be described. Here, the plurality of discharge units 5 included in the liquid discharge device 1 all have the same configuration, and in the following description, only one discharge unit 5 will be described. FIG. 2 is a diagram illustrating a schematic configuration of the discharge unit 5. As illustrated in FIG. 2, the discharge unit 5 includes the head drive module 10 and the liquid discharge module 20. In addition, in the discharge unit 5, the head drive module 10 and the liquid discharge module 20 are electrically coupled by a coupling member 30.

The coupling member 30 is a flexible member for electrically coupling the head drive module 10 and the liquid discharge module 20, and for example, flexible printed circuits (FPC) or a flexible flat cable (FFC) can be used. As the coupling member 30, a board to board (B to B) connector may be used instead of the FPC or FFC, and the B to B connector and the FPC or FFC may be used in combination.

The head drive module 10 includes a control circuit 100, a drive signal output circuit 50-1 to **50-*m*, a reference voltage output circuit 53, and a conversion circuit 120**.

The control circuit 100 includes a CPU, FPGA, or the like. The image information signal IP output by the control unit 2 is input to the control circuit 100. The control circuit 100 outputs a signal for controlling each element of the discharge unit 5 based on the input image information signal IP.

The control circuit 100 generates a basic data signal dDATA for controlling the operation of the liquid discharge module 20 based on the image information signal IP, and outputs a basic data signal dDATA to the conversion circuit 120. The conversion circuit 120 converts the basic data signal dDATA into a differential signal such as low voltage differential signaling (LVDS) and outputs a data signal DATA to the liquid discharge module 20. The conversion circuit 120 may convert the basic data signal dDATA into a differential signal of a high-speed transfer method such as low voltage positive emitter coupled logic (LVPECL) or current mode logic (CML) other than LVDS and output the differential signal to the liquid discharge module 20 as the data signal DATA. In addition, the conversion circuit 120 may convert a part or all of the input basic data signal dDATA into a predetermined single-ended signal and output the single-ended signal to the liquid discharge module 20 as the data signal DATA.

In addition, the control circuit 100 outputs basic drive signals dA1, dB1, and dC1 to the drive signal output circuit 50-1. The drive signal output circuit 50-1 includes drive circuits **52*a*, 52*b*, and 52*c*. The basic drive signal dA1 is input to the drive circuit 52*a*. The drive circuit 52*a* generates a drive signal COMA1 by performing digital/analog conversion of the input basic drive signal dA1 and then amplifying in class D, and outputs the drive signal COMA1 to the liquid discharge module 20. The basic drive signal dB1 is input to the drive circuit 52*b*. The drive circuit 52*b* generates a drive signal COMB1 by performing digital/analog conversion of the input basic drive signal dB1 and then amplifying in class D, and outputs the drive signal COMB1 to the liquid discharge module 20. The basic drive signal dC1 is input to the drive circuit 52*c*. The drive circuit 52*c* generates a drive signal COMC1 by performing digital/analog conversion of the input basic drive signal dC1 and then amplifying in class D, and outputs the drive signal COMC1 to the liquid discharge module 20**.

Here, each of the drive circuits **52*a*, 52*b*, and 52*c* may generate the drive signals COMA1, COMB1, and COMC1 by amplifying the waveforms defined by each of the input basic drive signals dA1, dB1, and dC1. Therefore, each of the drive circuits 52*a*, 52*b*, and 52*c* may include a class A amplifier circuit, a class B amplifier circuit, a class AB amplifier circuit, or the like in place of the class D amplifier circuit or in addition to the class D amplifier circuit. In addition, in the following description, it will be described that each of the basic drive signals dA1, dB1, and dC1 is a digital signal, and each of the basic drive signals dA1, dB1, and dC1 may be an analog signal as long as the waveforms of the corresponding drive signals COMA1, COMB1, and COMC1** can be defined.

The drive signal output circuits 50-2 to **50-*m* have the same configuration as the drive signal output circuit 50-1, except that the input signal and the output signal are different. That is, the drive signal output circuit 50-*j* (j is any one of 1 to m) includes a circuit corresponding to each of the drive circuits 52*a*, 52*b*, and 52*c*. The drive signal output circuit 50-*j* generates drive signals COMAj, COMBj, and COMCj based on the basic drive signals dAj, dBj, and dCj input from the control circuit 100, and outputs the drive signals to the liquid discharge module 20**.

Here, the drive signal output circuit 50-1 and the drive signal output circuits 50-2 to **50-*m* have the same configuration, and when it is not necessary to distinguish the drive signal output circuits, the drive signal output circuits may be simply referred to as a drive signal output circuit 50. In this case, it will be described that the drive signal output circuit 50 includes the drive circuits 52*a*, 52*b*, and 52*c*, the drive circuit 52*a* outputs the drive signal COMA, the drive circuit 52*b* outputs the drive signal COMB, and the drive circuit 52*c*** outputs the drive signal COMC.

Furthermore, the drive circuits **52*a*, 52*b*, and 52*c* included in the drive signal output circuit 50 all have the same configuration, and when it is not necessary to distinguish the drive circuits, the drive circuits may be simply referred to as a drive circuit 52. In this case, the drive circuit 52 will be described as generating a drive signal COM based on a basic drive signal do and outputting the generated drive signal COM to the liquid discharge module 20**.

In addition, when the drive circuits **52*a*, 52*b*, and 52*c* included in the drive signal output circuit 50-1 and the drive circuits 52*a*, 52*b*, and 52*c* included in the drive signal output circuit 50**-*j* are separately described, each of the drive circuits 52*a*, 52*b*, and 52*c* included in the drive signal output circuit 50-1 may be referred to as drive circuits 52*a*1, 52*b*1, and 52*c*1, and each of the drive circuits 52*a*, 52*b*, and 52*c* included in the drive signal output circuit 50-*j* may be referred to as drive circuits 52*aj*, 52*bj*, and 52*cj*. A specific example of the configuration of the drive circuit 52 will be described later.

The reference voltage output circuit 53 generates a reference voltage signal VBS indicating a reference potential for driving a piezoelectric element 60 described later included in the liquid discharge module 20, and outputs the reference voltage signal VBS to the liquid discharge module 20. The reference voltage signal VBS is, for example, a signal having a constant potential such as 5.5V or 6V. Here, the signal having a constant potential includes a case where it can be regarded as a constant potential when various variations or errors such as a fluctuation of the potential caused by the operation of the peripheral circuit, a fluctuation of the potential caused by variations in the circuit element, and a fluctuation of the potential caused by temperature characteristics of the circuit element are taken into consideration.

The liquid discharge module 20 includes a restoration circuit 220 and discharge modules 23-1 to 23-*m*.

A data signal DATA is input to the restoration circuit 220. The restoration circuit 220 restores the data signal DATA of the input differential signal to a single-ended signal, separates the restored single-ended signal into a signal corresponding to each of the discharge modules 23-1 to 23-*m*, and outputs the signal to each of the corresponding discharge modules 23-1 to 23-*m*.

Specifically, the restoration circuit 220 restores and separates the data signal DATA to generate a clock signal SCK1, a print data signal SI1, and a latch signal LAT1, and outputs these signals to the discharge module 23-1. In addition, the restoration circuit 220 restores and separates the data signal DATA to generate a clock signal SCKj, a print data signal SIj, and a latch signal LATj, and outputs these signals to the discharge module 23-*j*. Any signal of the clock signals SCK1 to SCKm, the print data signals SI1 to SIm, and the latch signals LAT1 to LATm corresponding to each of the discharge modules 23-1 to 23-*m* output by the restoration circuit 220 may be input in common to the discharge modules 23-1 to 23-*m*.

Here, considering that the restoration circuit 220 generates the clock signals SCK1 to SCKm, the print data signals SI1 to SIm, and the latch signals LAT1 to LATm by restoring and separating the data signal DATA, the data signal DATA output by the conversion circuit 120 is a differential signal including signals corresponding to the clock signals SCK1 to SCKm, the print data signals SI1 to SIm, and the latch signals LAT1 to LATm. Therefore, the basic data signal dDATA output by the control circuit 100 includes a single-ended signal corresponding to each of the clock signals SCK1 to SCKm, the print data signals SI1 to SIm, and the latch signals LAT1 to LATm.

The discharge module 23-1 includes a drive signal selection circuit 200 and a plurality of discharge portions 600. In addition, each of the plurality of discharge portions 600 includes a piezoelectric element 60. That is, the discharge module 23-1 includes a plurality of piezoelectric elements 60 having the same number as the plurality of discharge portions 600.

The drive signals COMA1, COMB1, and COMC1, the reference voltage signal VBS, the clock signal SCK1, the print data signal SI1, and the latch signal LAT1 are input to the discharge module 23-1. The drive signals COMA1, COMB1, and COMC1, the clock signal SCK1, the print data signal SI1, and the latch signal LAT1 are input to the drive signal selection circuit 200 included in the discharge module 23-1. The drive signal selection circuit 200 generates a drive signal VOUT by selecting or not selecting each of the signal waveforms of the drive signals COMA1, COMB1, and COMC1 based on the input clock signal SCK1, the print data signal SI1, and the latch signal LAT1. The drive signal selection circuit 200 supplies the generated drive signal VOUT to one end of the piezoelectric element 60 included in the corresponding discharge portion 600. In addition, a reference voltage signal VBS is supplied to the other end of the piezoelectric element 60. The piezoelectric element 60 is driven by the potential difference between the drive signal VOUT supplied to one end and the reference voltage signal VBS supplied to the other end. As a result, an amount of ink corresponding to the drive amount of the piezoelectric element 60 is discharged from the corresponding discharge portion 600.

Similarly, the discharge module 23-*j* includes the drive signal selection circuit 200 and the plurality of discharge portions 600. In addition, each of the plurality of discharge portions 600 includes a piezoelectric element 60. That is, the discharge module 23-*j* includes a plurality of discharge portions 600 and a plurality of piezoelectric elements 60 having the same number.

The drive signals COMAj, COMBj, and COMCj, the reference voltage signal VBSj, the clock signal SCKj, the print data signal SIj, and the latch signal LATj are input to the discharge module 23-*j*. The drive signals COMAj, COMBj, and COMCj, the clock signal SCKj, the print data signal SIj, and the latch signal LATj are input to the drive signal selection circuit 200 included in the discharge module 23-*j*. The drive signal selection circuit 200 generates a drive signal VOUT by selecting or not selecting each of the signal waveforms of the drive signals COMAj, COMBj, and COMCj based on the input clock signal SCKj, the print data signal SIj, and the latch signal LATj. The drive signal selection circuit 200 supplies the generated drive signal VOUT to one end of the piezoelectric element 60 included in the corresponding discharge portion 600. In addition, a reference voltage signal VBS is supplied to the other end of the piezoelectric element 60. The piezoelectric element 60 is driven by the potential difference between the drive signal VOUT supplied to one end and the reference voltage signal VBS supplied to the other end. As a result, an amount of ink corresponding to the drive amount of the piezoelectric element 60 is discharged from the corresponding discharge portion 600.

As described above, in the liquid discharge device 1, the control unit 2 controls the transport of the medium P by the transport unit 4 and controls the operation of the head drive module 10 included in each of the plurality of discharge units 5 based on image data supplied from a host computer (not illustrated). As a result, the discharge of ink from the liquid discharge module 20 is controlled. As a result, the liquid discharge device 1 can land a desired amount of ink at a desired position on the medium P, and forms a desired image on the medium P.

Here, the discharge modules 23-1 to 23-*m* included in the liquid discharge module 20 have the same configuration except that the input signals are different. Therefore, in the following description, when it is not necessary to distinguish the discharge modules 23-1 to 23-*m*, the discharge modules may be simply referred to as a discharge module 23. In this case, the drive signals COMA1 to COMAm input to the discharge module 23 may be referred to as a drive signal COMA, the drive signals COMB1 to COMBm may be referred to as a drive signal COMB, and the drive signals COMC1 to COMCm may be referred to as a drive signal COMC. The clock signals SCK1 to SCKm may be referred to as a clock signal SCK, the print data signals SI1 to SIm may be referred to as a print data signal SI, and the latch signals LAT1 to LATm may be referred to as a latch signal LAT. That is, the discharge module 23 controls driving of the piezoelectric element 60 by selecting or not selecting signal waveforms of the drive signals COMA, COMB, and COMC at the timing defined by the clock signal SCK, the print data signal SI, and the latch signal LAT, and discharges an amount of ink corresponding to the drive amount of the piezoelectric element 60 from the corresponding discharge portion 600.

2. Functional Configuration of Drive Signal Selection Circuit

Next, the configuration and operation of the drive signal selection circuit 200 included in the discharge module 23 will be described. In describing the configuration and operation of the drive signal selection circuit 200 included in the discharge module 23, first, an example of signal waveforms included in the drive signals COMA, COMB, and COMC input to the drive signal selection circuit 200 will be described.

Figure 3:
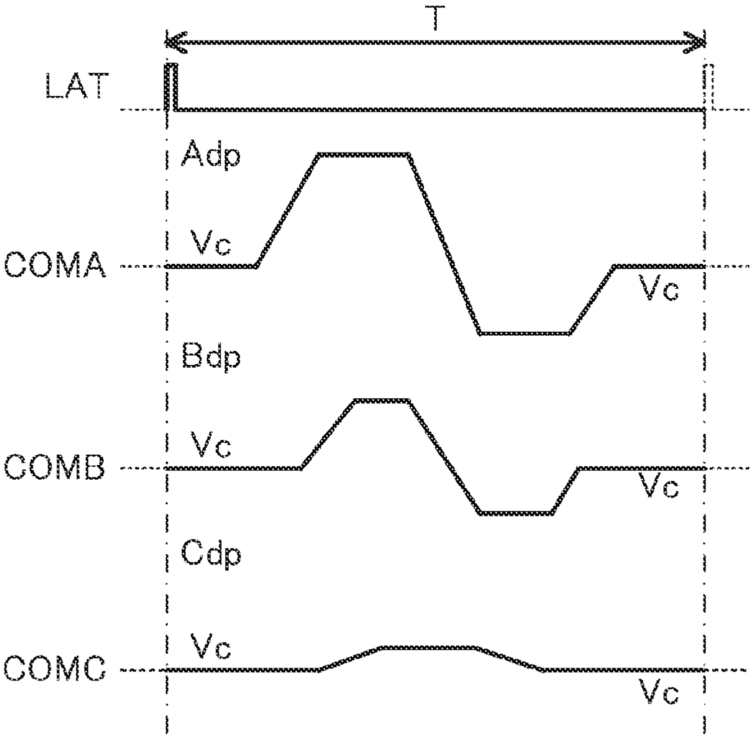
FIG. 3 is a graph illustrating an example of signal waveforms of drive signals.

FIG. 3 is a diagram illustrating an example of the signal waveforms of the drive signals COMA, COMB, and COMC. As illustrated in FIG. 3, the drive signal COMA includes a trapezoidal waveform Adp arranged in a cycle T from the rise of the latch signal LAT to the rise of the next latch signal LAT. The trapezoidal waveform Adp is a signal waveform that drives the piezoelectric element 60 such that a predetermined amount of ink is discharged from the corresponding discharge portion 600 by being supplied to one end of the piezoelectric element 60.

The drive signal COMB includes a trapezoidal waveform Bdp arranged in the cycle T. The trapezoidal waveform Bdp is a signal waveform whose voltage amplitude is smaller than that of the trapezoidal waveform Adp, and when the trapezoidal waveform Bdp is supplied to one end of the piezoelectric element 60, a smaller amount of ink than a predetermined amount is discharged from the discharge portion 600 corresponding to the piezoelectric element 60. That is, the trapezoidal waveform Bdp is a signal waveform that drives the piezoelectric element 60 such that a smaller amount of ink than a predetermined amount is discharged from the corresponding discharge portion 600 by being supplied to one end of the piezoelectric element 60.

Here, the amount of ink discharged from the discharge portion 600 corresponding to the case where the drive signal COMA is supplied to the piezoelectric element 60 is larger than the amount of ink discharged from the discharge portion 600 corresponding to the case where the drive signal COMB is supplied to the piezoelectric element 60. Therefore, the drive amount of the piezoelectric element 60 when the drive signal COMA is supplied to the piezoelectric element 60 is larger than the drive amount of the piezoelectric element 60 when the drive signal COMB is supplied to the piezoelectric element 60. In other words, the amount of ink discharged from the discharge portion 600 corresponding to the piezoelectric element 60 when the drive signal COMA is supplied to the piezoelectric element 60 is different from the amount of ink discharged from the discharge portion 600 corresponding to the piezoelectric element 60 when the drive signal COMB is supplied to the piezoelectric element 60. The amount of ink discharged from the discharge portion 600 corresponding to the piezoelectric element 60 when the drive signal COMA is supplied to the piezoelectric element 60 is larger than the amount of ink discharged from the discharge portion 600 corresponding to the piezoelectric element 60 when the drive signal COMB is supplied to the piezoelectric element 60. Therefore, the amount of current generated by the propagation of the drive signal COMA is larger than the amount of current generated by the propagation of the drive signal COMB.

In addition, the drive signal COMC includes a trapezoidal waveform Cdp arranged in the cycle T. The trapezoidal waveform Cdp is a signal waveform whose voltage amplitude is smaller than that of the trapezoidal waveforms Adp and Bdp, and when the trapezoidal waveform Cdp is supplied to one end of the piezoelectric element 60, the ink in the vicinity of a nozzle opening portion is vibrated to such an extent that the ink is not discharged from the discharge portion 600 corresponding to the piezoelectric element 60. That is, the trapezoidal waveform Cdp is a signal waveform that drives the piezoelectric element 60 to such an extent that ink is not discharged from the corresponding discharge portion 600 by being supplied to one end of the piezoelectric element 60. The trapezoidal waveform Cdp vibrates the ink in the vicinity of the nozzle opening portion of the discharge portion 600 including the piezoelectric element 60. As a result, the possibility that the viscosity of the ink increases in the vicinity of the corresponding nozzle opening portion is reduced.

As described above, the drive signals COMA and COMB drive the corresponding piezoelectric element 60 such that the ink is discharged from the discharge portion 600, and the drive signal COMC drives the corresponding piezoelectric element 60 such that the ink is not discharged from the discharge portion 600. That is, the drive amount of the piezoelectric element 60 when the drive signals COMA and COMB are supplied to the piezoelectric element 60 is larger than the drive amount of the piezoelectric element 60 when the drive signal COMC is supplied to the piezoelectric element 60. Therefore, the voltage amplitude of the drive signals COMA and COMB is larger than the voltage amplitude of the drive signal COMC, and the amount of current generated by the propagation of the drive signals COMA and COMB is larger than the amount of current generated by the propagation of the drive signal COMC.

In addition, at the start timing and end timing of each of the trapezoidal waveforms Adp, Bdp, and Cdp, the voltage values of the trapezoidal waveforms Adp, Bdp, and Cdp are all common to the voltage Vc. That is, each of the trapezoidal waveforms Adp, Bdp, and Cdp are signal waveforms that start at the voltage Vc and end at the voltage Vc.

Here, in the following description, when the trapezoidal waveform Adp is supplied to one end of the piezoelectric element 60, the amount of ink discharged from the discharge portion 600 corresponding to the piezoelectric element 60 may be referred to as a large amount. When the trapezoidal waveform Bdp is supplied to one end of the piezoelectric element 60, the amount of ink discharged from the discharge portion 600 corresponding to the piezoelectric element 60 may be referred to as a small amount different from a large amount. In addition, when the trapezoidal waveform Cdp is supplied to one end of the piezoelectric element 60, the fact that the ink in the vicinity of the nozzle opening portion is vibrated to such an extent that the ink is not discharged from the discharge portion 600 corresponding to the piezoelectric element 60 may be referred to as micro-vibration BSD.

That is, in the liquid discharge device 1 of the present embodiment, the drive circuit 52*a* outputs a drive signal COMA that drives the piezoelectric element 60 such that the discharge portion 600 included in the discharge module 23 discharges a predetermined amount of ink, which is a large amount. The drive circuit 52*b* outputs a drive signal COMB that drives the piezoelectric element 60 such that the discharge portion 600 included in the discharge module 23 discharges an amount smaller than a predetermined amount and a small amount of ink. The drive circuit 52*c* outputs a drive signal COMC that drives the piezoelectric element 60 such that the discharge portion 600 included in the discharge module 23 does not discharge ink.

The signal waveforms of the drive signals COMA, COMB, and COMC are not limited to the shapes illustrated in FIG. 3, and signal waveforms having various shapes may be used depending on the type of ink discharged from the discharge portion 600, the number of piezoelectric elements 60 driven by drive signals COMA, COMB, and COMC, the wiring length through which the drive signals COMA, COMB, and COMC propagate, and the like. Therefore, the drive signals COMA1 to COMAm may have signal waveforms having different shapes from each other, and the amount of ink discharged from the corresponding discharge portion 600 by the drive signal COMA1 and the amount of ink discharged from the corresponding discharge portion 600 by the drive signal COMAj may be different from each other. Similarly, the drive signals COMB1 to COMBm may have signal waveforms having different shapes from each other, and the amount of ink discharged from the corresponding discharge portion 600 by the drive signal COMB1 and the amount of ink discharged from the corresponding discharge portion 600 by the drive signal COMBj may be different from each other. Similarly, the drive signals COMC1 to COMCm may have signal waveforms having different shapes from each other, and the displacement amount of the piezoelectric element 60 generated by the drive signal COMC1 and the displacement amount of the piezoelectric element 60 generated by the drive signal COMCj may be different from each other.

Figure 4:
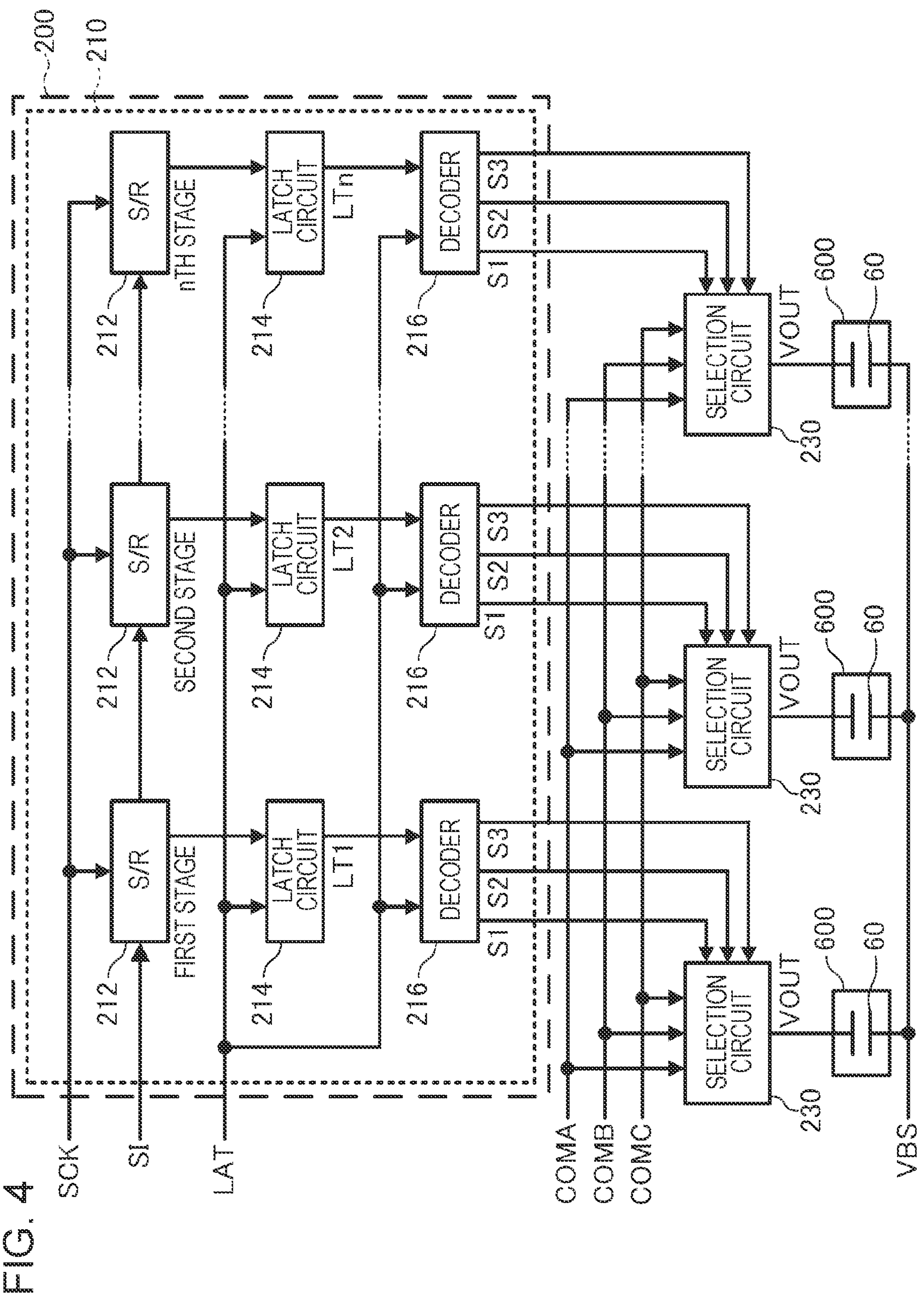
FIG. 4 is a diagram illustrating a functional configuration of a drive signal selection circuit.

Next, the configuration and operation of the drive signal selection circuit 200 that outputs the drive signal VOUT by selecting or not selecting each of the signal waveforms of the drive signals COMA, COMB, and COMC will be described. FIG. 4 is a diagram illustrating a functional configuration of the drive signal selection circuit 200. As illustrated in FIG. 4, the drive signal selection circuit 200 includes a selection control circuit 210 and a plurality of selection circuits 230.

The print data signal SI, the latch signal LAT, and the clock signal SCK are input to the selection control circuit 210. In addition, the selection control circuit 210 includes n set of a shift register (S/R) 212, a latch circuit 214, and a decoder 216 corresponding to each of the n discharge portions 600. That is, the drive signal selection circuit 200 includes n shift registers 212, n latch circuits 214, and n decoders 216, which are the same number as n discharge portions 600.

The print data signal SI is a signal synchronized with the clock signal SCK, and includes 2-bit print data [SIH, SIL] for defining the dot size formed by the ink discharged from each of the n discharge portions 600 by any of "large dot LD", "small dot SD", "non-discharge ND", and "micro-vibration BSD". This print data signal SI is held in the shift register 212 corresponding to the discharge portion 600 for each 2-bit print data [SIH, SIL].

Specifically, the n shift registers 212 corresponding to the discharge portion 600 are coupled in cascade to each other. The 2-bit print data [SIH, SIL] included in the print data signal SI is sequentially transferred to the subsequent stage of the shift register 212 sequentially coupled in cascade according to the clock signal SCK. When the supply of the clock signal SCK is stopped, the 2-bit print data [SIH, SIL] corresponding to the discharge portion 600 corresponding to the shift register 212 is held in the n shift registers 212. In FIG. 4, in order to distinguish the n shift registers 212 coupled in cascade, the shift registers are illustrated as the first stage, the second stage, . . . , and the n-th stage from the upstream to the downstream where the print data signal SI is input.

Each of the n latch circuits 214 latches simultaneously the 2-bit print data [SIH, SIL] held in the corresponding shift register 212 at the rise of the latch signal LAT.

Figures 5, 6:
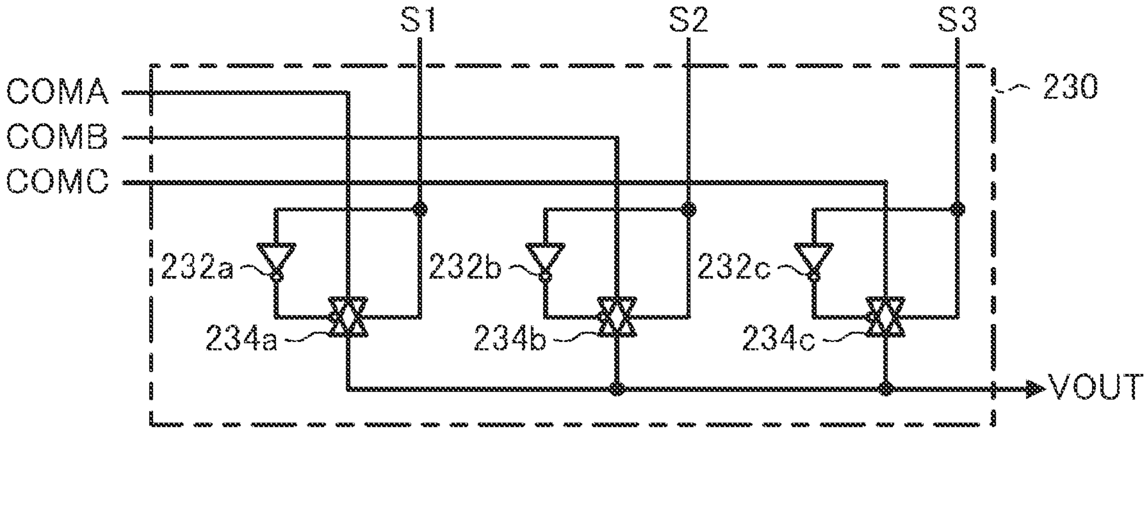
FIG. 5 is a table illustrating an example of a decoding content in a decoder.
FIG. 6 is a diagram illustrating an example of a configuration of a selection circuit corresponding to one discharge portion.

The 2-bit print data [SIH, SIL] latched by the latch circuit 214 is input to the corresponding decoder 216. Each of the n decoders 216 decodes the input 2-bit print data [SIH, SIL], and outputs the selection signals S1, S2, and S3 of the logic level according to a decoding content for each cycle T. FIG. 5 is a table illustrating an example of the decoding content in the decoder 216. The decoder 216 outputs the input 2-bit print data [SIH, SIL] and the selection signals S1, S2, and S3 of the logic level defined by the decoding content illustrated in FIG. 5. For example, when the 2-bit print data [SIH, SIL] input to the decoder 216 is [1,0], the decoder 216 sets the logic level of each of the selection signals S1, S2, and S3 to the L, H, and L levels in the cycle T.

Returning to FIG. 4, the selection circuit 230 is provided corresponding to each of the n discharge portions 600. That is, the drive signal selection circuit 200 includes n selection circuits 230. The selection signals S1, S2, and S3 output by the decoder 216 corresponding to the same discharge portion 600 and the drive signals COMA, COMB, and COMC are input to the selection circuit 230. The selection circuit 230 generates a drive signal VOUT by selecting or not selecting each of the drive signals COMA, COMB, and COMC based on the selection signals S1, S2, and S3, and outputs the drive signal VOUT to the corresponding discharge portion 600.

FIG. 6 is a diagram illustrating an example of a configuration of the selection circuit 230 corresponding to one discharge portion 600. As illustrated in FIG. 6, the selection circuit 230 includes inverters 232*a*, 232*b*, and 232*c* and transfer gates 234*a*, 234*b*, and 234*c*.

The selection signal S1 is input to a positive control end not marked with a circle at the transfer gate 234*a*, and is also input to the negative control end marked with a circle in the transfer gate 234*a* after being logically inverted by the inverter 232*a*. The drive signal COMA is input to an input terminal of the transfer gate 234*a*. The transfer gate 234*a* is conductive between the input terminal and the output terminal when the input selection signal S1 is H level, and is non-conductive between the input terminal and the output terminal when the input selection signal S1 is L level. That is, the transfer gate 234*a* outputs the drive signal COMA to the output terminal when the selection signal S1 is H level, and does not output the drive signal COMA to the output terminal when the selection signal S1 is L level.

The selection signal S2 is input to a positive control end not marked with a circle in the transfer gate 234*b*, and is also input to the negative control end marked with a circle in the transfer gate 234*b* after being logically inverted by the inverter 232*b*. The drive signal COMB is input to the input terminal of the transfer gate 234*b*. The transfer gate 234*b* is conductive between the input terminal and the output terminal when the input selection signal S2 is H level, and is non-conductive between the input terminal and the output terminal when the input selection signal S2 is L level. That is, the transfer gate 234*b* outputs the drive signal COMB to the output terminal when the selection signal S2 is H level, and does not output the drive signal COMB to the output terminal when the selection signal S2 is L level.

The selection signal S3 is input to a positive control end not marked with a circle in the transfer gate 234*c*, and is also input to the negative control end marked with a circle in the transfer gate 234*c* after being logically inverted by the inverter 232*c*. In addition, the drive signal COMC is input to the input terminal of the transfer gate 234*c*. The transfer gate 234*c* is conductive between the input terminal and the output terminal when the input selection signal S3 is H level, and is non-conductive between the input terminal and the output terminal when the input selection signal S3 is L level. That is, the transfer gate 234*c* outputs the drive signal COMC to the output terminal when the selection signal S3 is H level, and does not output the drive signal COMC to the output terminal when the selection signal S3 is L level.

In the selection circuit 230, the output terminals of the transfer gates 234*a*, 234*b*, and 234*c* are commonly coupled. That is, the drive signals COMA, COMB, and COMC selected or not selected by each of the selection signals S1, S2, and S3 are output from the output terminals of the transfer gates 234*a*, 234*b*, and 234*c* commonly coupled. The drive signal selection circuit 200 supplies the signals at the output terminals of the transfer gates 234*a*, 234*b*, and 234*c* to the piezoelectric element 60 included in the corresponding discharge portion 600 as the drive signal VOUT.

Figure 7:
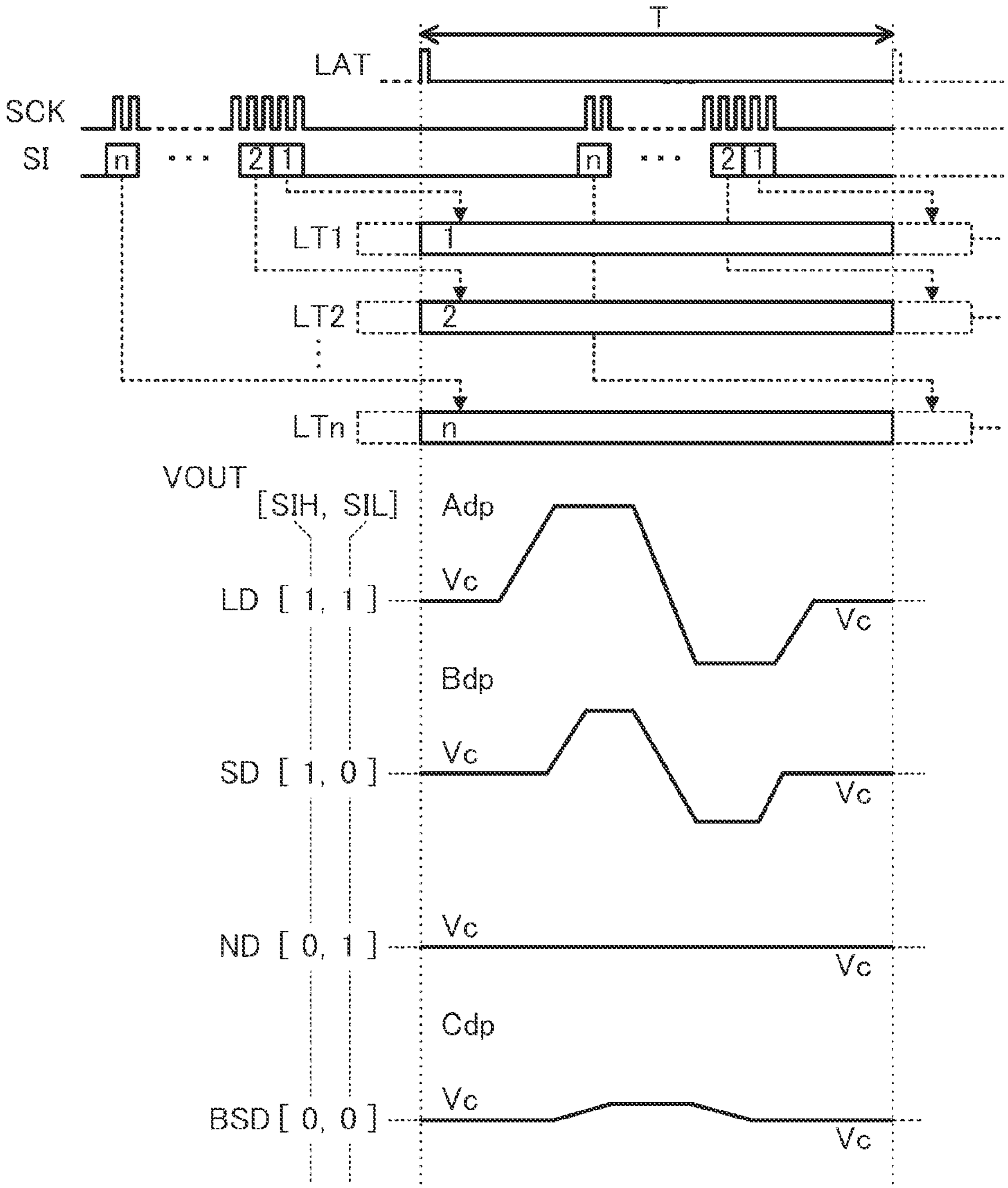
FIG. 7 is a graph for describing an operation of the drive signal selection circuit.

The operation of the drive signal selection circuit 200 configured as described above will be described. FIG. 7 is a diagram for describing the operation of the drive signal selection circuit 200. The print data signal SI is a signal serially including 2-bit print data [SIH, SIL] and is input to the drive signal selection circuit 200 in synchronization with the clock signal SCK. The 2-bit print data [SIH, SIL] included in the print data signal SI is sequentially transferred to the shift register 212 in the subsequent stage in synchronization with the clock signal SCK. Thereafter, when the input of the clock signal SCK is stopped, the 2-bit print data [SIH, SIL] corresponding to each of the discharge portions 600 is held in the shift register 212 corresponding to the same discharge portions 600.

Thereafter, when the latch signal LAT rises, the latch circuit 214 simultaneously latches the 2-bit print data [SIH, SIL] held in the shift register 212. In FIG. 7, the 2-bit print data [SIH, SIL] corresponding to each of the shift registers 212 of the first stage, the second stage, . . . , and the n-th stage latched by the latch circuit 214 is illustrated as LT1, LT2, . . . , and LTn.

The 2-bit print data [SIH, SIL] latched by the latch circuit 214 is input to the decoder 216. The decoder 216 outputs the selection signals S1, S2, and S3 of the logic level according to the dot size defined by the input 2-bit print data [SIH, SIL].

Specifically, when the input 2-bit print data [SIH, SIL] is [1, 1], the decoder 216 outputs the logic level of each of the selection signals S1, S2, and S3 to the selection circuit 230 as the H, L, and L levels in the cycle T. As a result, the selection circuit 230 selects the trapezoidal waveform Adp in the cycle T. As a result, the drive signal VOUT corresponding to the "large dot LD" illustrated in FIG. 7 is output from the drive signal selection circuit 200.

In addition, when the input 2-bit print data [SIH, SIL] is [1, 0], the decoder 216 outputs the logic level of each of the selection signals S1, S2, and S3 to the selection circuit 230 as the L, H, and L levels in the cycle T. As a result, the selection circuit 230 selects the trapezoidal waveform Bdp in the cycle T. As a result, the drive signal VOUT corresponding to the "small dot SD" illustrated in FIG. 7 is output from the drive signal selection circuit 200.

In addition, when the input 2-bit print data [SIH, SIL] is [0, 1], the decoder 216 outputs the logic level of each of the selection signals S1, S2, and S3 to the selection circuit 230 as the L, L, and L levels in the cycle T. As a result, the selection circuit 230 does not select any of the trapezoidal waveforms Adp, Bdp, and Cdp in the cycle T. As a result, the drive signal VOUT corresponding to the "non-discharge ND" illustrated in FIG. 7 is output from the drive signal selection circuit 200.

Here, when the selection circuit 230 does not select any of the trapezoidal waveforms Adp, Bdp, and Cdp, the voltage Vc supplied immediately before the piezoelectric element 60 is held by the capacitance component of the piezoelectric element 60 at one end of the corresponding piezoelectric element 60. That is, the fact that a constant drive signal VOUT is output from the drive signal selection circuit 200 at the voltage Vc includes a case where the voltage Vc immediately before being held by the capacitance component of the piezoelectric element 60 is supplied to the piezoelectric element 60 as the drive signal VOUT, when none of the trapezoidal waveforms Adp, Bdp, and Cdp is selected as the drive signal VOUT.

In addition, when the input 2-bit print data [SIH, SIL] is [0, 0], the decoder 216 outputs the logic level of each of the selection signals S1, S2, and S3 to the selection circuit 230 as the L, L, and H levels in the cycle T. As a result, the selection circuit 230 selects the trapezoidal waveform Cdp in the cycle T. As a result, the drive signal VOUT corresponding to the "micro-vibration BSD" illustrated in FIG. 7 is output from the drive signal selection circuit 200.

As described above, the drive signal selection circuit 200 generates a drive signal VOUT corresponding to each of the plurality of discharge portions 600 by selecting or not selecting each of the signal waveforms of the drive signals COMA, COMB, and COMC based on the print data signal SI, the latch signal LAT, and the clock signal SCK, and outputs the drive signal VOUT to the corresponding discharge portion 600. As a result, the amount of ink discharged from each of the plurality of discharge portions 600 is individually controlled.

In addition, in the liquid discharge device 1 according to the present embodiment, when a large dot is formed on the medium P, the drive signal selection circuit 200 supplies the drive signal COMA output by the drive circuit 52*a* to the discharge portion 600 as the drive signal VOUT. When a small dot is formed on the medium P, the drive signal selection circuit 200 supplies the drive signal COMB output by the drive circuit 52*b* to the discharge portion 600 as the drive signal VOUT. That is, the drive signal selection circuit 200 may select either the drive signal COMA or COMB according to the dot size formed on the medium P. Therefore, the waveform cycle of the drive signals COMA and COMB can be shortened as compared with the configuration in which one drive signal includes a plurality of signal waveforms and the dot size formed in the medium P is defined by selecting the signal waveform in a time division manner. As a result, the image formation speed at which the liquid discharge device 1 forms a desired image on the medium P can be increased.

Furthermore, in the liquid discharge device 1 according to the present embodiment, by including the drive signal COMC that drives the piezoelectric element 60 so as not to discharge ink on the medium P in addition to the drive signals COMA and COMB, it is possible to reduce the possibility that the discharge abnormality due to the thickening of the ink viscosity occurs in the discharge portion 600 without reducing the image formation speed at which the desired image is formed on the medium P. That is, in the liquid discharge device 1 according to the present embodiment, by having the drive signal COMC in addition to the drive signals COMA and COMB, it is possible to increase the image formation speed at which the desired image is formed on the medium P without deteriorating the image quality formed on the medium P, and it is possible to reduce the possibility that the ink discharge accuracy is lowered.

Here, the drive signal VOUT supplied to the piezoelectric element 60 is generated by selecting the signal waveform included in each of the drive signals COMA, COMB, and COMC. Specifically, when the drive signal selection circuit 200 selects the drive signal COMA, the drive signal COMA is supplied to the corresponding piezoelectric element 60 as the drive signal VOUT, when the drive signal selection circuit 200 selects the drive signal COMB, the drive signal COMB is supplied to the corresponding piezoelectric element 60 as the drive signal VOUT, and when the drive signal selection circuit 200 selects the drive signal COMC, the drive signal COMC is supplied to the corresponding piezoelectric element 60 as the drive signal VOUT. That is, the drive circuit 52*a* outputs the drive signal COMA supplied to the piezoelectric element 60, the drive circuit 52*b* outputs the drive signal COMB supplied to the piezoelectric element 60, and the drive circuit 52*c* outputs the drive signal COMC supplied to the piezoelectric element 60.

3. Configuration of Drive Signal Output Circuit

Figure 8:
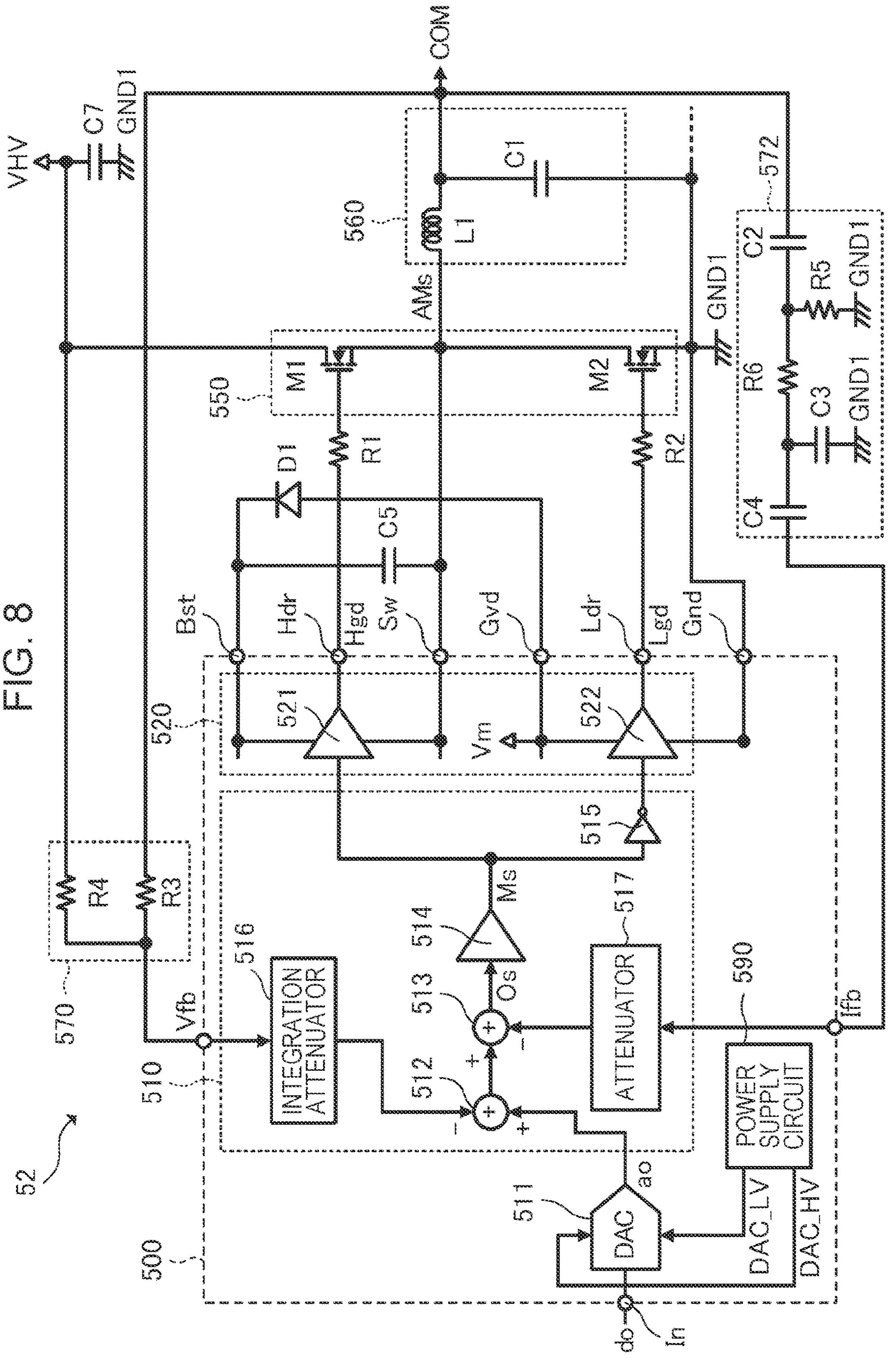
FIG. 8 is a diagram illustrating a configuration of a drive circuit.

Next, the configuration and operation of the drive circuit 52 that outputs the drive signal COM will be described. FIG. 8 is a diagram illustrating the configuration of the drive circuit 52. The drive circuit 52 includes an integrated circuit 500, an amplifier circuit 550, a demodulation circuit 560, feedback circuits 570 and 572, and other electronic components.

The integrated circuit 500 includes a plurality of terminals including a terminal In, a terminal Bst, a terminal Hdr, a terminal Sw, a terminal Gvd, a terminal Ldr, and a terminal Gnd. The integrated circuit 500 is electrically coupled to an externally provided substrate (not illustrated) via the plurality of terminals. In addition, the integrated circuit 500 includes a digital to analog converter (DAC) 511, a modulation circuit 510, a gate drive circuit 520, and a power supply circuit 590.

The power supply circuit 590 generates a voltage signal DAC HV and a voltage signal DAC LV and supplies the voltage signals to the DAC 511. In addition, a digital basic drive signal do that defines the signal waveform of the drive signal COM is input to the DAC 511. The DAC 511 converts the input basic drive signal do into a basic drive signal ao that is an analog signal of the voltage value between the voltage signal DAC HV and the voltage signal DAC LV, and outputs the basic drive signal ao to the modulation circuit 510. That is, the maximum value of the voltage amplitude of the basic drive signal ao is defined by the voltage signal DAC HV, and the minimum value is defined by the voltage signal DAC LV. The signal obtained by amplifying the analog basic drive signal ao output by the DAC 511 corresponds to the drive signal COM. That is, the basic drive signal ao corresponds to a target signal before amplification of the drive signal COM.

The modulation circuit 510 generates a modulation signal Ms obtained by modulating the basic drive signal ao and outputs the modulation signal Ms to the gate drive circuit 520. The modulation circuit 510 includes adders 512 and 513, a comparator 514, an inverter 515, an integration attenuator 516, and an attenuator 517.

The integration attenuator 516 attenuates and integrates the drive signal COM input via a terminal Vfb and supplies the drive signal COM to the input terminal on the − side of the adder 512. The basic drive signal ao is input to the input terminal on the + side of the adder 512. The adder 512 supplies the voltage obtained by subtracting and integrating the voltage input to the input terminal on the − side from the voltage input to the input terminal on the + side to the input terminal on the + side of the adder 513.

The attenuator 517 supplies a voltage obtained by attenuating the high frequency component of the drive signal COM input via a terminal Ifb to the input terminal on the − side of the adder 513. The voltage output from the adder 512 is input to the input terminal on the + side of the adder 513. The adder 513 generates a voltage signal Os obtained by subtracting the voltage input to the input terminal on the − side from the voltage input to the input terminal on the + side, and outputs the voltage signal Os to the comparator 514.

The comparator 514 outputs a modulation signal Ms obtained by pulse-modulating the voltage signal Os input from the adder 513. Specifically, the comparator 514 generates and outputs the modulation signal Ms that is an H level when the voltage value of the voltage signal Os input from the adder 513 is a predetermined threshold value Vth1 or more when the voltage value is increased, and that is L level when the voltage value of the voltage signal Os falls below a predetermined threshold value Vth2 when the voltage value is lowered. Here, the threshold values Vth1 and Vth2 are set in the relationship of threshold value Vth1 threshold value Vth2.

The modulation signal Ms output by the comparator 514 is input to the gate driver 521 included in the gate drive circuit 520, and is also input to the gate driver 522 included in the gate drive circuit 520 via the inverter 515. That is, a signal having a relation in which the logic levels are exclusive is input to the gate driver 521 and the gate driver 522. Here, the relationship in which the logic levels are exclusive includes that the logic levels of the signals input to the gate driver 521 and the gate driver 522 do not simultaneously be the H level. Therefore, the modulation circuit 510 may include a timing control circuit for controlling the timing of the modulation signal Ms input to the gate driver 521 in place of or in addition to the inverter 515 and the signal in which the logic level of the modulation signal Ms input to the gate driver 522 is inverted.

The gate drive circuit 520 includes the gate driver 521 and the gate driver 522. The gate driver 521 level-shifts the modulation signal Ms output from the comparator 514 and outputs the modulation signal Ms as an amplification control signal Hgd from the terminal Hdr.

Specifically, the voltage is supplied to the higher side of the power supply voltage of the gate driver 521 via the terminal Bst, and the voltage is supplied to the lower side via the terminal Sw. The terminal Bst is coupled to one end of a capacitor C5 and the cathode of the diode Dl for preventing backflow. The terminal Sw is coupled to the other end of the capacitor C5. In addition, the anode of the diode Dl is coupled to a terminal Gvd to which a voltage Vm, which is a DC voltage of, for example, 7.5 V, is supplied from a power supply circuit (not illustrated). That is, the voltage Vm is supplied to the anode of the diode Dl. Therefore, the potential difference between the terminal Bst and the terminal Sw is approximately equal to the voltage Vm. As a result, the gate driver 521 generates an amplification control signal Hgd having a voltage value larger than the terminal Sw by the voltage Vm according to the input modulation signal Ms, and outputs the amplification control signal Hgd from the terminal Hdr.

The gate driver 522 operates on the lower potential side than the gate driver 521.

The gate driver 522 level-shifts the signal in which the logic level of the modulation signal Ms output from the comparator 514 is inverted by the inverter 515, and outputs the signal as an amplification control signal Lgd from the terminal Ldr.

Specifically, of the power supply voltage of the gate driver 522, the voltage Vm is supplied to the higher side, and the ground potential GND is supplied to the lower side via the terminal Gnd. The gate driver 522 outputs an amplification control signal Lgd having a large voltage value by the voltage Vm with respect to the terminal Gnd from the terminal Ldr according to the signal in which the logic level of the input modulation signal Ms is inverted. Here, the ground potential GND is a reference potential of the drive circuit 52, and is, for example, 0 V.

The amplifier circuit 550 includes the transistor M1 and the transistor M2.

The transistor M1 is a surface mount-type field effect transistor (FET), and a voltage VHV, which is a DC voltage of, for example, 42 V, is supplied to the drain of the transistor M1 as a power supply voltage for amplification of the amplifier circuit 550. In addition, the gate of the transistor M1 is electrically coupled to one end of a resistor R1 and the other end of the resistor R1 is electrically coupled to the terminal Hdr of the integrated circuit 500. That is, the amplification control signal Hgd is input to the gate of the transistor M1. In addition, the source of the transistor M1 is electrically coupled to the terminal Sw of the integrated circuit 500.

The transistor M2 is the surface mount-type FET, and a drain of the transistor M2 is electrically coupled to the terminal Sw of the integrated circuit 500. That is, the drain of the transistor M2 and the source of the transistor M1 are electrically coupled to each other. The gate of the transistor M2 is electrically coupled to one end of a resistor R2, and the other end of the resistor R2 is electrically coupled to the terminal Ldr of the integrated circuit 500. That is, the amplification control signal Lgd is input to the gate of the transistor M2. In addition, a ground potential GND is supplied to the source of the transistor M2.

That is, the drive circuit 52 includes surface mount-type transistors M1 and M2 as amplification transistors. In the amplifier circuit 550, when the drain and the source of the transistor M1 are controlled to be non-conductive and the drain and the source of the transistor M2 are controlled to be conductive, the potential of the node to which the terminal Sw is coupled is the ground potential GND. Therefore, the voltage Vm is supplied to the terminal Bst. On the other hand, when the drain and the source of the transistor M1 are controlled to be conductive and the drain and the source of the transistor M2 are controlled to be non-conductive, the potential of the node to which the terminal Sw is coupled is the voltage VHV. Therefore, a voltage signal having a potential of voltage VHV+Vm is supplied to the terminal Bst. That is, the gate driver 521 that drives the transistor M1 generates an amplification control signal Hgd of the potential where the L level is the potential of voltage VHV and the H level is voltage VHV+voltage Vm by changing the potential of the terminal Sw to the ground potential GND or the voltage VHV according to the operation of the transistor M1 and the transistor M2 using the capacitor C5 as a floating power source, and outputs the amplification control signal Hgd to the gate of the transistor M1.

On the other hand, the gate driver 522 that drives the transistor M2 generates an amplification control signal Lgd of the potential where the L level is the ground potential GND and the H level is the voltage Vm, regardless of the operation of the transistor M1 and the transistor M2 and outputs the amplification control signal Lgd to the gate of the transistor M2.

The amplifier circuit 550 configured as described above generates an amplification modulation signal AMs obtained by amplifying the modulation signal Ms based on the voltage VHV at a coupling point between the source of the transistor M1 and the drain of the transistor M2. The amplifier circuit 550 outputs the generated amplification modulation signal AMs to the demodulation circuit 560.

Here, a capacitor C7 is provided in the propagation path through which the voltage VHV input to the amplifier circuit 550 propagates. Specifically, one end of the capacitor C7 is a propagation path through which the voltage VHV propagates, and is electrically coupled to the drain of the transistor M1, and the ground potential GND is supplied to the other end of the capacitor C7. As a result, the possibility that the potential of the voltage VHV input to the amplifier circuit 550 fluctuates is reduced, the possibility that noise is superimposed on the voltage VHV is reduced, and the waveform accuracy of the amplification modulation signals AMs output by the amplifier circuit 550 is improved.

The demodulation circuit 560 generates a drive signal COM by demodulating the amplification modulation signal AMs output by the amplifier circuit 550, and outputs the drive signal COM from the drive circuit 52. The demodulation circuit 560 includes an inductor L1 and a capacitor C1. One end of the inductor L1 is coupled to one end of the capacitor C1. The amplification modulation signal AMs is input to the other end of the inductor L1. In addition, a ground potential GND is supplied to the other end of the capacitor C1. That is, in the demodulation circuit 560, the inductor L1 and the capacitor C1 form a low pass filter. The demodulation circuit 560 demodulates the amplification modulation signal AMs by smoothing the amplification modulation signal AMs with the low-pass filter, and outputs the demodulated signal as the drive signal COM. That is, the drive circuit 52 outputs the drive signal COM from one end of the inductor L1 included in the demodulation circuit 560 and one end of the capacitor C1.

The feedback circuit 570 includes a resistor R3 and a resistor R4. The drive signal COM is supplied to one end of the resistor R3, and the other end is coupled to the terminal Vfb and one end of the resistor R4. The voltage VHV is supplied to the other end of the resistor R4. As a result, the drive signal COM passed through the feedback circuit 570 is fed back to the terminal Vfb in a state of being pulled up by the voltage VHV.

The feedback circuit 572 includes capacitors C2, C3, and C4 and resistors R5 and R6. The drive signal COM is input to one end of the capacitor C2, and the other end is coupled to one end of the resistor R5 and one end of the resistor R6. The ground potential GND is supplied to the other end of the resistor R5. As a result, the capacitor C2 and the resistor R5 function as a high pass filter. In addition, the other end of the resistor R6 is coupled to one end of the capacitor C4 and one end of the capacitor C3. The ground potential GND is supplied to the other end of the capacitor C3. As a result, the resistor R6 and the capacitor C3 function as a low pass filter. That is, the feedback circuit 572 includes a high pass filter and a low pass filter, and functions as a band pass filter that passes a signal in a predetermined frequency range included in the drive signal COM.

The other end of the capacitor C4 is coupled to the terminal Ifb of the integrated circuit 500. As a result, among the high frequency components of the drive signal COM passed through the feedback circuit 572 that functions as a band pass filter, the signal in which the DC component is cut is fed back to the terminal Ifb.

The drive signal COM is a signal obtained by smoothing the amplification modulation signal AMs based on the basic drive signal do by the demodulation circuit 560. In addition, the drive signal COM is integrated and subtracted via the terminal Vfb, and then fed back to the adder 512. As a result, the drive circuit 52 self-oscillates at a frequency determined by the feedback delay and the feedback transfer function. However, the feedback path via the terminal Vfb has a large delay amount. Therefore, it may not be possible to raise the frequency of self-oscillation to such an extent that the accuracy of the drive signal COM can be sufficiently ensured only by feedback via the terminal Vfb. Therefore, by providing a path for feeding back the high frequency component of the drive signal COM via the terminal Ifb separately from the path via the terminal Vfb, the delay in the entire circuit is reduced. As a result, the frequency of the voltage signal Os can be increased to such an extent that the accuracy of the drive signal COM can be sufficiently ensured as compared with the case where the path via the terminal Ifb does not exist.

As described above, the drive circuit 52 generates a drive signal COM by performing digital/analog conversion of the input basic drive signal do and then amplifying the analog signal in class D, and outputs the generated drive signal COM.

4. Configuration of Liquid Discharge Module

Figure 9:
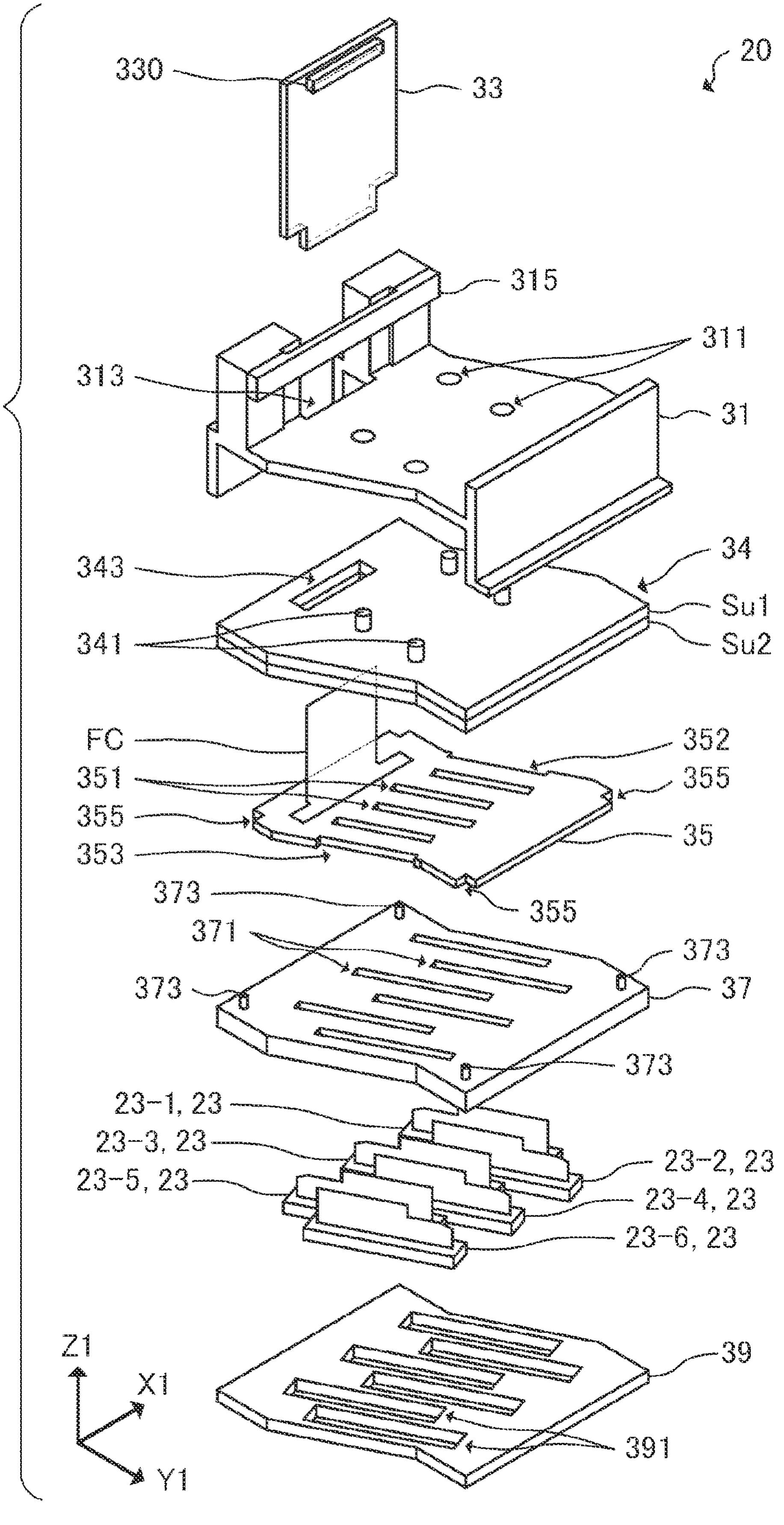
FIG. 9 is a diagram illustrating a structure of a liquid discharge module.
Figure 10:
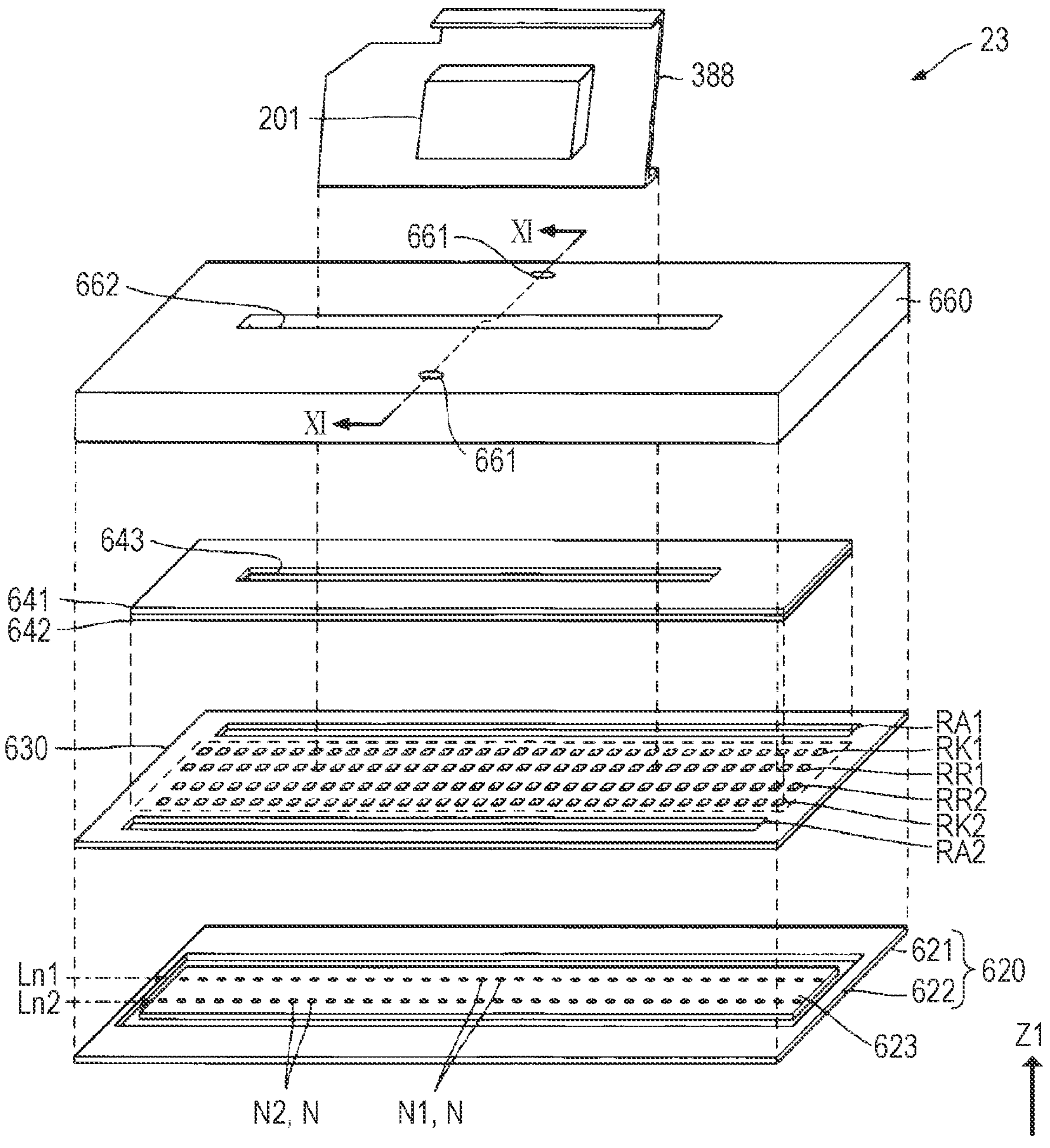
FIG. 10 is a diagram illustrating an example of a structure of a discharge module.
Figure 11:
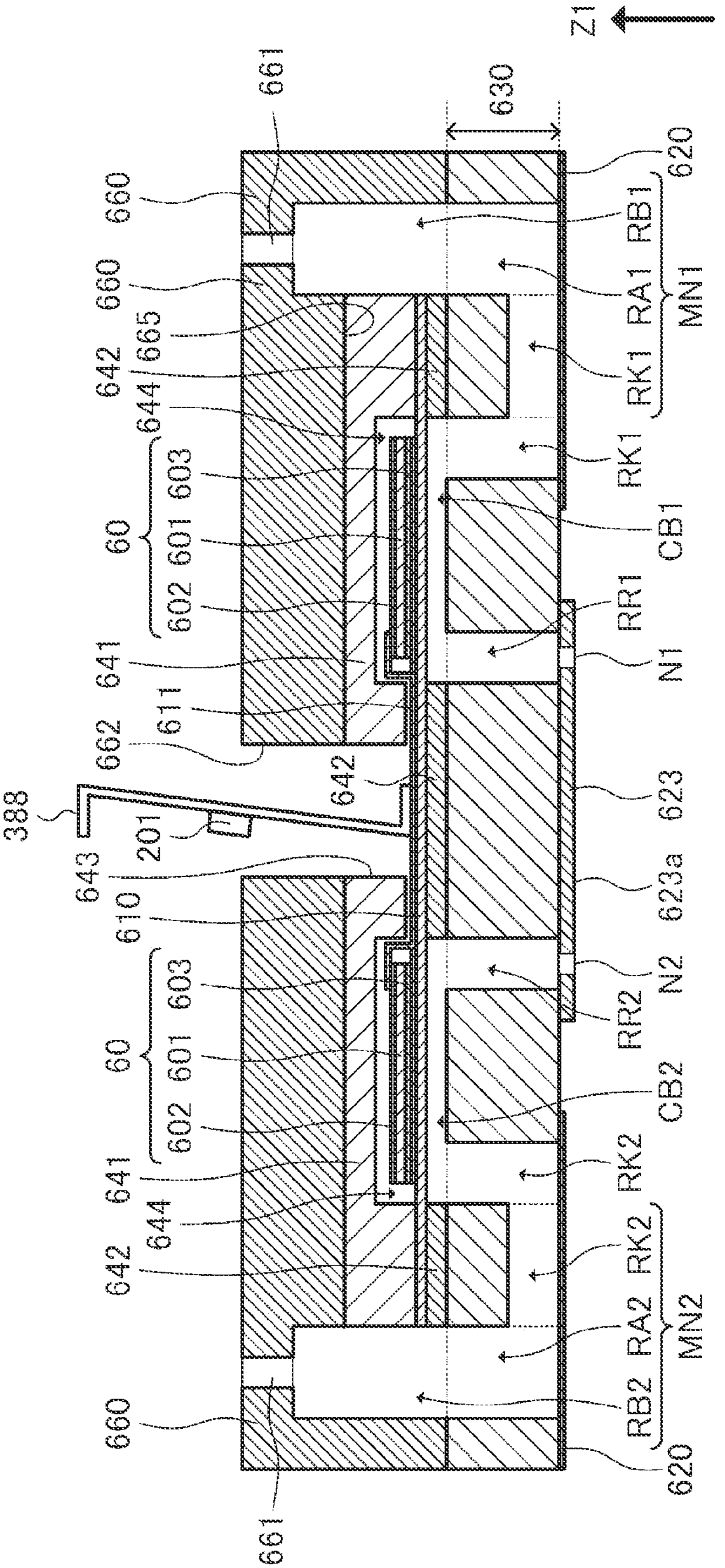
FIG. 11 is a diagram illustrating an example of a cross section of the discharge module.

Next, the structure of the liquid discharge module 20 will be described with reference to FIGS. 9 to 11. FIG. 9 is a diagram illustrating the structure of the liquid discharge module 20. Here, in describing the structure of the liquid discharge module 20, FIGS. 9 to 11 illustrate arrows indicating the X1 direction, the Y1 direction, and the Z1 direction orthogonal to each other. In addition, in the description of FIGS. 9 to 11, the starting point side of the arrow indicating the X1 direction may be referred to as a −X1 side, the tip end side may be referred to as a +X1 side, the starting point side of the arrow indicating the Y1 direction may be referred to as a −Y1 side, the tip end side may be referred to as a +Y1 side, the starting point side of the arrow indicating the Z1 direction may be referred to as a −Z1 side, and the tip end side may be referred to as a +Z1 side. In addition, in the following description, the liquid discharge module 20 will be described as having six discharge modules 23, and when each of the six discharge modules 23 is distinguished, the discharge modules may be referred to as discharge modules 23-1 to 23-6.

As illustrated in FIG. 9, the liquid discharge module 20 includes a housing 31, an aggregate substrate 33, a flow path structure 34, a head substrate 35, a distribution flow path 37, a fixing plate 39, and discharge modules 23-1 to 23-6. In the liquid discharge module 20, the flow path structure 34, the head substrate 35, the distribution flow path 37, and the fixing plate 39 are laminated in the order of the fixing plate 39, the distribution flow path 37, the head substrate 35, and the flow path structure 34 from the −Z1 side to the +Z1 side along the Z1 direction. The housing 31 is located around the flow path structure 34, the head substrate 35, the distribution flow path 37, and the fixing plate 39 so as to support the flow path structure 34, the head substrate 35, the distribution flow path 37, and the fixing plate 39. The aggregate substrate 33 is erected on the +Z1 side of the housing 31 while being held by the housing 31, and the six discharge modules 23 are located between the distribution flow path 37 and the fixing plate 39 such that a part of the six discharge modules 23 is exposed to the outside of the liquid discharge module 20.

In describing the structure of the liquid discharge module 20, first, the structure of the discharge module 23 included in the liquid discharge module 20 will be described. FIG. 10 is a diagram illustrating an example of the structure of the discharge module 23. In addition, FIG. 11 is a diagram illustrating an example of a cross section of the discharge module 23. Here, FIG. 11 is a cross-sectional view of the discharge module 23 when the discharge module 23 is cut along the line XI-XI illustrated in FIG. 10, and the line XI-XI illustrated in FIG. 10 is a virtual line segment that passes through an introduction path 661 of the discharge module 23 and passes through a nozzle N1 and a nozzle N2.

As illustrated in FIGS. 10 and 11, the discharge module 23 includes a plurality of nozzles N1 arranged side by side and a plurality of nozzles N2 arranged side by side. The total number of nozzles N1 and nozzles N2 included in the discharge module 23 is n, which is the same as the number of discharge portions 600 included in the discharge module 23. In the present embodiment, the number of nozzles N1 and the number of nozzles N2 included in the discharge module 23 will be described as being the same. That is, the discharge module 23 includes n/2 nozzles N1 and n/2 nozzles N2. Here, when it is not necessary to distinguish between the nozzle N1 and the nozzle N2 in the following description, the nozzles may be simply referred to as a nozzle N.

The discharge module 23 includes a wiring member 388, a case 660, a protective substrate 641, a flow path formation substrate 642, a communication plate 630, a compliance substrate 620, and a nozzle plate 623.

On the flow path formation substrate 642, pressure chambers CB1 partitioned by a plurality of partition walls by anisotropic etching from one surface side are arranged side by side corresponding to the nozzle N1, and pressure chambers CB2 partitioned by a plurality of partition walls by anisotropic etching from one surface side are arranged side by side corresponding to the nozzle N2. Here, in the following description, when it is not necessary to distinguish between the pressure chamber CB1 and the pressure chamber CB2, the pressure chambers may be simply referred to as a pressure chamber CB.

The nozzle plate 623 is located on the −Z1 side of the flow path formation substrate 642. The nozzle plate 623 is provided with a nozzle row Ln1 formed by n/2 nozzles N1 and a nozzle row Ln2 formed by n/2 nozzles N2. Here, in the following description, the surface of the nozzle plate 623 on which the nozzle N opens on the −Z1 side may be referred to as a liquid ejection surface 623*a*.

The communication plate 630 is located on the −Z1 side of the flow path formation substrate 642 and on the +Z1 side of the nozzle plate 623. The communication plate 630 is provided with a nozzle communication path RR1 that communicates with the pressure chamber CB1 and the nozzle N1, and a nozzle communication path RR2 that communicates with the pressure chamber CB2 and the nozzle N2. In addition, the communication plate 630 is provided with a pressure chamber communication path RK1 for communicating the end portion of the pressure chamber CB1 and a manifold MN1 and a pressure chamber communication path RK2 for communicating the end portion of the pressure chamber CB2 and a manifold MN2 independently corresponding to each of the pressure chambers CB1 and CB2.

The manifold MN1 includes a supply communication path RA1 and a coupling communication path RX1. The supply communication path RA1 is provided so as to penetrate the communication plate 630 along the Z1 direction, and the coupling communication path RX1 opens on the nozzle plate 623 side of the communication plate 630 without penetrating the communication plate 630 in the Z1 direction and is provided halfway in the Z1 direction. Similarly, the manifold MN2 includes a supply communication path RA2 and a coupling communication path RX2. The supply communication path RA2 is provided so as to penetrate the communication plate 630 along the Z1 direction, and the coupling communication path RX2 opens on the nozzle plate 623 side of the communication plate 630, without penetrating the communication plate 630 in the Z1 direction and is provided halfway in the Z1 direction. The coupling communication path RX1 included in the manifold MN1 communicates with the corresponding pressure chamber CB1 by the pressure chamber communication path RK1, and the coupling communication path RX2 included in the manifold MN2 communicates with the corresponding pressure chamber CB2 by the pressure chamber communication path RK2.

Here, in the following description, when it is not necessary to distinguish between the nozzle communication path RR1 and the nozzle communication path RR2, the nozzle communication paths may be simply referred to as a nozzle communication path RR, and it is not necessary to distinguish between the manifold MN1 and the manifold MN2, the manifolds may be simply referred to as a manifold MN. When it is not necessary to distinguish between the supply communication path RA1 and the supply communication path RA2, the supply communication paths may be simply referred to as a supply communication path RA, and when it is not necessary to distinguish between the coupling communication path RX1 and the coupling communication path RX2, the coupling communication paths may be simply referred to as a coupling communication path RX.

A diaphragm 610 is located on the surface of the flow path formation substrate 642 on the +Z1 side. In addition, n piezoelectric elements 60 corresponding to each of the nozzles N1 and N2 are formed in two rows on the surface of the diaphragm 610 on the +Z1 side.

The piezoelectric element 60 has a piezoelectric body 601 and a pair of electrodes 602, 603 provided so as to interpose the piezoelectric body 601. The electrode 602 and the piezoelectric body 601 are formed for each pressure chamber CB on the +Z1 side surface of the diaphragm 610, and the electrode 603 is configured as a common electrode common to the pressure chamber CB on the +Z1 side surface of the diaphragm 610. The piezoelectric element 60 is driven such that the piezoelectric body 601 is displaced in the vertical direction by supplying the drive signal VOUT from the drive signal selection circuit 200 to the electrode 602, and supplying the reference voltage signal VBS to the electrode 603, which is a common electrode.

The protective substrate 641 is bonded to the surface of the flow path formation substrate 642 on the +Z1 side. The protective substrate 641 forms a protective space 644 for protecting the piezoelectric element 60. In addition, the protective substrate 641 is provided with a through-hole 643 penetrating along the Z1 direction. A lead electrode 611 drawn from each of the electrodes 602 and 603 of the piezoelectric element 60 is extended such that the end portion is exposed inside the through-hole 643. The wiring member 388 is electrically coupled to the lead electrode 611 exposed inside the through-hole 643.

In addition, a case 660 that defines a part of the manifold MN communicating with a plurality of pressure chambers CB is fixed to the protective substrate 641 and the communication plate 630. The case 660 is bonded to the protective substrate 641 and also to the communication plate 630. Specifically, the case 660 includes a recessed portion 665 in which the flow path formation substrate 642 and the protective substrate 641 are accommodated on the surface on the −Z1 side. The recessed portion 665 has a wider opening area than that of the surface on which the protective substrate 641 is bonded to the flow path formation substrate 642. The flow path formation substrate 642 or the like is accommodated in the recessed portion 665. The opening surface of the recessed portion 665 on the −Z1 side is sealed by the communication plate 630 in a state where the flow path formation substrate 642 and the like are accommodated in the recessed portion 665. As a result, a supply communication path RB1 and a supply communication path RB2 are defined by the case 660, the flow path formation substrate 642, and the protective substrate 641 on an outer peripheral portion of the flow path formation substrate 642. Here, when it is not necessary to distinguish between the supply communication path RB1 and the supply communication path RB2, the supply communication paths may be simply referred to as a supply communication path RB.

In addition, a compliance substrate 620 is provided on the surface of the communication plate 630 where the supply communication path RA and the coupling communication path RX are opened. The compliance substrate 620 seals the openings of the supply communication path RA and the coupling communication path RX. Such a compliance substrate 620 includes a sealing film 621 and a fixed substrate 622. The sealing film 621 is formed of a flexible thin film or the like, and the fixed substrate 622 is formed of a hard material such as a metal such as stainless steel.

In addition, the case 660 is provided with an introduction path 661 for supplying ink to the manifold MN. Furthermore, the case 660 is an opening that communicates with the through-hole 643 of the protective substrate 641 and penetrates along the Z1 direction, and is provided with a coupling port 662 through which the wiring member 388 is inserted.

The wiring member 388 is a flexible member for electrically coupling the discharge module 23 and the head substrate 35, and for example, an FPC can be used. An integrated circuit 201 is mounted on the wiring member 388 by chip on film (COF). At least a part of the drive signal selection circuit 200 described above is mounted on the integrated circuit 201.

In the discharge module 23 configured as described above, the wiring member 388 propagates the drive signals COMA, COMB, and COMC, the reference voltage signal VBS, the clock signal SCK, the print data signal SI, and the latch signal LAT. Among these signals, the drive signals COMA, COMB, and COMC, the clock signal SCK, the print data signal SI, and the latch signal LAT are input to the drive signal selection circuit 200 including the integrated circuit 201 provided in the wiring member 388. The drive signal selection circuit 200 generates and outputs a drive signal VOUT by selecting or not selecting the drive signals COMA, COMB, and COMC based on the input clock signal SCK, the print data signal SI, and the latch signal LAT. The drive signal VOUT output by the drive signal selection circuit 200 propagates through the wiring member 388 and is supplied to the electrode 602 via the lead electrode 611. In addition, the reference voltage signal VBS propagates through the wiring member 388 and is supplied to the electrode 603 via the lead electrode 611. As a result, the piezoelectric body 601 is deformed according to the potential difference between the drive signal VOUT supplied to the electrode 602 and the reference voltage signal VBS supplied to the electrode 603. That is, the piezoelectric element 60 is driven. As the piezoelectric element 60 is driven, the diaphragm 610 provided with the piezoelectric element 60 is displaced in the vertical direction. As a result, the internal pressure of the corresponding pressure chamber CB changes, and the ink stored inside the pressure chamber CB is discharged from the nozzle N in response to the change in the internal pressure of the pressure chamber CB.

In the discharge module 23 configured as described above, the configuration including the nozzle N, the nozzle communication path RR, the pressure chamber CB, the piezoelectric element 60, and the diaphragm 610 corresponds to the discharge portion 600 described above. That is, the discharge module 23 includes the piezoelectric element 60, and includes a plurality of discharge portions 600 that discharge ink in response to the drive of the piezoelectric element 60.

Returning to FIG. 9, the fixing plate 39 is located on the −Z1 side of the discharge module 23. Six discharge modules 23 are fixed to the fixing plate 39. Specifically, the fixing plate 39 penetrates the fixing plate 39 along the Z1 direction and has six opening portions 391 corresponding to each of the six discharge modules 23. The six discharge modules 23 are fixed to the fixing plate 39 such that the liquid ejection surface 623*a* is exposed from each of the six opening portions 391.

The distribution flow path 37 is located on the +Z1 side of the discharge module 23. Four introduction portions 373 are provided on the surface of the distribution flow path 37 on the +Z1 side. The four introduction portions 373 are flow path tubes that protrude from the surface of the distribution flow path 37 on the +Z1 side toward the +Z1 side along the Z1 direction, and communicate with a flow path hole (not illustrated) formed on the surface of the flow path structure 34 on the −Z1 side. In addition, a flow path tube (not illustrated) that communicates with the four introduction portions 373 is located on the surface of the distribution flow path 37 on the −Z1 side. The flow path tube (not illustrated) located on the surface of the distribution flow path 37 on the −Z1 side communicates with the introduction path 661 included in each of the six discharge modules 23. In addition, the distribution flow path 37 includes six opening portions 371 penetrating along the Z1 direction. The wiring member 388 included in each of the six discharge modules 23 is inserted into the six opening portions 371.

The head substrate 35 is located on the +Z1 side of the distribution flow path 37. A wiring member FC electrically coupled to the aggregate substrate 33 described later is attached to the head substrate 35. In addition, the head substrate 35 is formed with four opening portions 351 and cutout portions 352 and 353. The wiring members 388 included in the discharge modules 23-2 to 23-5 are inserted through four opening portions 351 and electrically coupled to the head substrate 35 by soldering or the like. In addition, the wiring member 388 included in the discharge module 23-1 passes through the cutout portion 352, and the wiring member 388 included in the discharge module 23-6 passes through the cutout portion 353. The wiring member 388 included in each of the discharge modules 23-1 and 23-6 passed through each of the cutout portions 352 and 353 is electrically coupled to the head substrate 35 by soldering or the like.

In addition, four cutout portions 355 are formed at the four corners of the head substrate 35. The introduction portion 373 passes through the four cutout portions 355. The four introduction portions 373 passed through the cutout portion 355 are coupled to the flow path structure 34 located on the +Z1 side of the head substrate 35.

The flow path structure 34 includes a flow path plate Su1 and a flow path plate Su2. The flow path plate Su1 and the flow path plate Su2 are laminated along the Z1 direction in a state where the flow path plate Su1 is located on the +Z1 side and the flow path plate Su2 is located on the −Z1 side, and are bonded to each other by an adhesive or the like. In addition, the flow path structure 34 includes four introduction portions 341 protruding toward the +Z1 side along the Z1 direction on the surface on the +Z1 side. The four introduction portions 341 communicate with the flow path hole (not illustrated) formed on the surface of the flow path structure 34 on the −Z1 side via an ink flow path formed inside the flow path structure 34. A flow path hole (not illustrated) formed on the surface of the flow path structure 34 on the −Z1 side communicates with the four introduction portions 373. Furthermore, the flow path structure 34 is formed with a through-hole 343 penetrating along the Z1 direction. The wiring member FC electrically coupled to the head substrate 35 is inserted into the through-hole 343.

Here, inside the flow path structure 34, in addition to the ink flow path that communicates with the introduction portion 341 and the flow path hole (not illustrated) formed on the surface on the −Z1 side, a capture filter or the like for capturing foreign matter contained in the ink flowing through the ink flow path may be provided.

The housing 31 is located so as to cover the periphery of the flow path structure 34, the head substrate 35, the distribution flow path 37, and the fixing plate 39, and supports the flow path structure 34, the head substrate 35, the distribution flow path 37, and the fixing plate 39. The housing 31 includes four opening portions 311, an aggregate substrate insertion portion 313, and a holding member 315.

The four introduction portions 341 included in the flow path structure 34 are inserted into the four opening portions 311. Ink is supplied from the liquid container 3 to the four introduction portions 341 through which the four opening portions 311 are inserted through a tube (not illustrated) or the like.

The holding member 315 interposes the aggregate substrate 33 in a state where the aggregate substrate insertion portion 313 is partially inserted between the holding member 315 and the housing 31. The aggregate substrate 33 is provided with a coupling portion 330. The coupling member 30 through which various signals propagates such as a data signal DATA, drive signals COMA, COMB, and COMC, a reference voltage signal VBS, and other power supply voltages output by the head drive module 10 is attached to the coupling portion 330. In addition, the wiring member FC included in the head substrate 35 is electrically coupled to the aggregate substrate 33. As a result, the aggregate substrate 33 and the head substrate 35 are electrically coupled to each other. Here, the aggregate substrate 33 may be provided with a semiconductor device corresponding to the above-described restoration circuit 220. In addition, although FIG. 9 illustrates a case where one coupling portion 330 is provided on the aggregate substrate 33, the aggregate substrate 33 may include a plurality of coupling portions 330.

In the liquid discharge module 20 configured as described above, when the liquid container 3 and the introduction portion 341 communicate with each other via a tube (not illustrated) or the like, the ink stored in the liquid container 3 is supplied to the liquid discharge module 20. The ink supplied to the liquid discharge module 20 is guided to a flow path hole (not illustrated) formed on the surface of the flow path structure 34 on the −Z1 side via the ink flow path formed inside the flow path structure 34, and then is supplied to the four introduction portions 373 included in the distribution flow path 37. The ink supplied to the distribution flow path 37 is distributed correspondingly to each of the six discharge modules 23 in an ink flow path (not illustrated) formed inside the distribution flow path 37, and then supplied to the introduction path 661 included in the corresponding discharge module 23. The ink supplied to the discharge module 23 via the introduction path 661 is stored in the pressure chamber CB included in the discharge portion 600.

In addition, various signals including the drive signals COMA1 to COMA6, COMB1 to COMB6, and COMC1 to COMC6, the reference voltage signal VBS, and the data signal DATA output by the head drive module 10 propagate through the coupling member 30 and are input to the liquid discharge module 20 via the coupling portion 330. Various signals including the drive signals COMA1 to COMA6, COMB1 to COMB6, and COMC1 to COMC6, the reference voltage signal VBS, and the data signal DATA input to the liquid discharge module 20 propagate through the aggregate substrate 33 and the head substrate 35. At this time, the restoration circuit 220 generates clock signals SCK1 to SCK6, print data signals SI1 to SI6, and latch signals LAT1 to LAT6 corresponding to each of the discharge modules 23-1 to 23-6 from the data signal DATA and separates these signals corresponding to each of the discharge modules 23-1 to 23-6. Each of the drive signals COMA1 to COMA6, COMB1 to COMB6, and COMC1 to COMC6, the reference voltage signal VBS, the clock signals SCK1 to SCK6, the print data signals SI1 to SI6, and the latch signals LAT1 to LAT6 is input to the wiring member 388 of the corresponding discharge module 23. The drive signals COMA, COMB, and COMC, the reference voltage signal VBS, the clock signal SCK, the print data signal SI, and the latch signal LAT supplied to the wiring member 388 propagate through the wiring member 388. At this time, the integrated circuit 201 including the drive signal selection circuit 200 provided in the wiring member 388 generates a drive signal VOUT corresponding to each of the n discharge portions 600, and supplies the drive signal VOUT to the electrode 602 of the piezoelectric element 60 included in the corresponding discharge portion 600. As a result, the n piezoelectric elements 60 are individually driven according to the drive signal VOUT. As a result, the ink stored in the pressure chamber CB corresponding to the piezoelectric element 60 is discharged from the corresponding nozzle N.

As described above, in the liquid discharge device 1 of the present embodiment, the liquid discharge module 20 includes the electrode 602 and the electrode 603, includes the plurality of piezoelectric elements 60 driven by the drive signal VOUT supplied to the electrode 602 and the reference voltage signal VBS supplied to the electrode 603, and includes the plurality of discharge modules 23 for discharging ink by driving the piezoelectric element 60.

That is, the liquid discharge device 1 of the present embodiment includes the liquid discharge module 20 that includes the piezoelectric element 60 included in the discharge module 23-1 and having the electrode 602 and the electrode 603, the piezoelectric element 60 included in the discharge module 23-2 and having the electrode 602 and the electrode 603, the piezoelectric element 60 included in the discharge module 23-3 and having the electrode 602 and the electrode 603, the piezoelectric element 60 included in the discharge module 23-4 and having the electrode 602 and the electrode 603, the piezoelectric element 60 included in the discharge module 23-5 and having the electrode 602 and the electrode 603, and the piezoelectric element 60 included in the discharge module 23-6 and having the electrode 602 and the electrode 603, and that discharges ink by driving the piezoelectric element 60 included in the discharge module 23-1, the piezoelectric element 60 included in the discharge module 23-2, the piezoelectric element 60 included in the discharge module 23-3, the piezoelectric element 60 included in the discharge module 23-4, the piezoelectric element 60 included in the discharge module 23-5, and the piezoelectric element 60 included in the discharge module 23-6.

5. Structure of Head Drive Module

Figure 12:
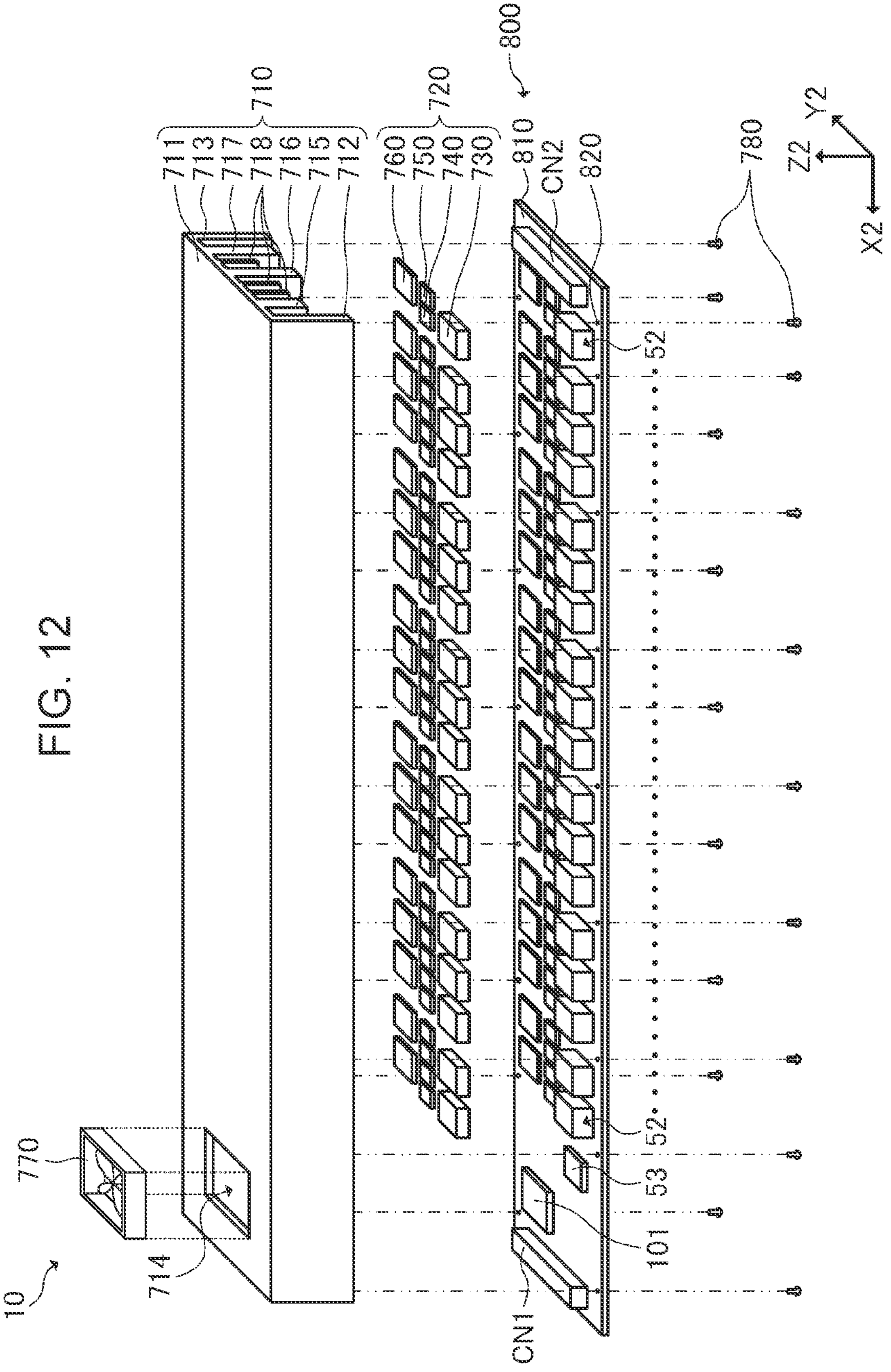
FIG. 12 is a diagram illustrating an example of a structure of a head drive module.

Next, the structure of the head drive module 10 will be described with reference to FIG. 12. Here, in describing the structure of the head drive module 10, FIG. 12 illustrates arrows indicating the X2 direction, the Y2 direction, and the Z2 direction which are independent of the above-described X1 direction, Y1 direction, and Z1 direction and are orthogonal to each other. In addition, in the following description, the starting point side of the arrow indicating the X2 direction may be referred to as a −X2 side, the tip end side may be referred to as a +X2 side, the starting point side of the arrow indicating the Y2 direction may be referred to as a −Y2 side, the tip end side may be referred to as a +Y2 side, the starting point side of the arrow indicating the Z2 direction may be referred to as a −Z2 side, and the tip end side may be referred to as a +Z2 side.

FIG. 12 is a diagram illustrating an example of the structure of the head drive module 10. As illustrated in FIG. 12, the head drive module 10 includes a drive circuit substrate 800, a heat conductive member group 720, a plurality of screws 780, and a cooling fan 770.

The drive circuit substrate 800 receives an image information signal IP from the control unit 2 and outputs a plurality of signals including the drive signals COMA, COMB, and COMC, the reference voltage signal VBS, and the data signal DATA to the liquid discharge module 20. That is, the drive circuit substrate 800 drives the piezoelectric element 60 of the liquid discharge module 20.

The drive circuit substrate 800 includes a plurality of drive circuits 52, a reference voltage output circuit 53, an integrated circuit 101, coupling portions CN1 and CN2, and a wiring substrate 810. The wiring substrate 810 includes a plurality of through-holes 820 that penetrate the wiring substrate 810 along the Z2 direction. In addition, the wiring substrate 810 is provided with the plurality of drive circuits 52, the reference voltage output circuit 53, the integrated circuit 101, and the coupling portions CN1 and CN2.

The coupling portion CN1 is located on the +X2 side of the wiring substrate 810. A cable (not illustrated) for electrically coupling the control unit 2 and the drive circuit substrate 800 is attached to the coupling portion CN1. As a result, the image information signal IP output by the control unit 2 is input to the drive circuit substrate 800. The coupling portion CN2 is located on the −X2 side of the wiring substrate 810. The coupling member 30 for electrically coupling the drive circuit substrate 800 and the liquid discharge module 20 is attached to the coupling portion CN2. As a result, a signal including the drive signals COMA, COMB, and COMC, the reference voltage signal VBS, and the data signal DATA output by the drive circuit substrate 800 are propagated to the liquid discharge module 20.

The integrated circuit 101, the reference voltage output circuit 53, and the plurality of drive circuits 52 are located between the coupling portions CN1 and CN2 on the wiring substrate 810. Specifically, the integrated circuit 101 is located on the −X2 side of the coupling portion CN1, the reference voltage output circuit 53 is located on the −X2 side of the integrated circuit 101, and the plurality of drive circuits 52 are located side by side along the X2 direction on the −X2 side of the reference voltage output circuit 53.

That is, the wiring substrate 810 is provided with drive circuits 52*a*1 to 52*a*6, 52*b*1 to 52*b*6, and 52*c*1 to 52*c*6 as a plurality of drive circuits 52, and a reference voltage output circuit 53. The configuration including the integrated circuit 101, the reference voltage output circuit 53, and the plurality of drive circuits 52 provided on the wiring substrate 810 generates a signal including the drive signals COMA, COMB, and COMC, the reference voltage signal VBS, and the data signal DATA based on the image information signal IP input from the coupling portion CN1, and outputs the signal to the liquid discharge module 20.

In other words, the wiring substrate 810 propagates the drive signals COMA1, COMB1, and COMC1 for driving the piezoelectric element 60 included in the discharge module 23-1 of the liquid discharge module 20, the drive signals COMA2, COMB2, and COMC2 for driving the piezoelectric element 60 included in the discharge module 23-2 of the liquid discharge module 20, the drive signals COMA3, COMB3, and COMC3 for driving the piezoelectric element 60 included in the discharge module 23-3 of the liquid discharge module 20, the drive signals COMA4, COMB4, and COMC4 for driving the piezoelectric element 60 included in the discharge module 23-4 of the liquid discharge module 20, the drive signals COMA5, COMB5, and COMA5 for driving the piezoelectric element 60 included in the discharge module 23-5 of the liquid discharge module 20, and the drive signals COMA6, COMB6, and COMC6 for driving the piezoelectric element 60 included in the discharge module 23-6 of the liquid discharge module 20.

Here, the wiring substrate 810 may be provided with a plurality of electronic components in addition to the plurality of drive circuits 52, the reference voltage output circuit 53, the integrated circuit 101, and the coupling portions CN1 and CN2. The details of the drive circuit substrate 800 including the wiring substrate 810 will be described later.

The heat sink 710 is located on the +Z2 side of the drive circuit substrate 800 and is attached to the wiring substrate 810 by the plurality of screws 780. The heat sink 710 includes a bottom portion 711, side portions 712 and 713, protruding portions 715, 716, and 717, and a plurality of fin portions 718.

The bottom portion 711 is a substantially rectangular shape located facing the wiring substrate 810 and extending in a plane formed by the X2 direction and the Y2 direction. The side portion 712 protrudes from the end portion of the bottom portion 711 on the −Y2 side toward the −Z2 side and extends along the X2 direction. At least a part of the end portion of the side portion 712 on the −Z2 side is in contact with the end portion of the wiring substrate 810 on the −Y2 side. The side portion 713 protrudes from the end portion of the bottom portion 711 on the +Y2 side toward the −Z2 side and extends along the X2 direction. At least a part of the end portion of the side portion 713 on the −Z2 side is in contact with the end portion of the wiring substrate 810 on the +Y2 side. That is, the heat sink 710 includes the bottom portion 711 and the side portions 712 and 713, and constitutes an accommodation space that opens on the −Z2 side. The plurality of drive circuits 52 included in the drive circuit substrate 800 are accommodated in the accommodation space constituted by the heat sink 710.

The protruding portions 715, 716, and 717 are provided corresponding to the inductor L1, the transistors M1 and M2, and the integrated circuit 500 included in each of the plurality of drive circuits 52 provided on the wiring substrate 810 inside the accommodation space configured to include the bottom portion 711 and the side portions 712 and 713. Specifically, the protruding portion 715 is located corresponding to the inductor L1 provided on the wiring substrate 810, protrudes from the bottom portion 711 toward the −Z2 side, and extends along the X2 direction. The protruding portion 716 is located corresponding to the transistors M1 and M2 provided on the wiring substrate 810, protrudes from the bottom portion 711 toward the −Z2 side, and extends along the X2 direction. The protruding portion 717 is located corresponding to the integrated circuit 500 provided on the wiring substrate 810, protrudes from the bottom portion 711 toward the −Z2 side, and extends along the X2 direction.

Each of the plurality of fin portions 718 protrudes from the bottom portion 711 toward the −Z2 side, extends along the X2 direction, and is located apart from each other in the Y2 direction. Since the heat sink 710 includes the plurality of fin portions 718, the surface area of the heat sink 710 is increased. As a result, the heat radiation performance of the heat sink 710 is improved. The number of such fin portions 718 can be set based on the amount of heat released by the heat sink 710, the length of the fin portion 718 along the Z2 direction, and an optimum interval defined according to the air flow applied to the fin portion 718, and the like.

The heat sink 710 configured as described above is attached to the wiring substrate 810 of the drive circuit substrate 800 to release the heat generated by the plurality of drive circuits 52 provided on the wiring substrate 810. Furthermore, the heat sink 710 is attached so as to cover the plurality of drive circuits 52 provided on the wiring substrate 810, and thus functions as a protective member for protecting the plurality of drive circuits 52 provided on the wiring substrate 810 from impacts and the like. Therefore, it is preferable that the heat sink 710 is a substance having sufficient rigidity for protecting the drive circuit 52 in addition to high thermal conductivity for releasing the heat generated by the drive circuit 52, and is configured to contain a metal such as aluminum, iron, or copper.

The heat conductive member group 720 is located between the drive circuit substrate 800 and the heat sink 710. The heat conductive member group 720 comes into contact with both the plurality of drive circuits 52 provided on the wiring substrate 810 and the heat sink 710 by attaching the heat sink 710 to the wiring substrate 810. As a result, the heat conductive member group 720 enhances the contact efficiency between the plurality of drive circuits 52 and the heat sink 710, and enhances the heat conduction efficiency conducted from the drive circuit substrate 800 to the heat sink 710. Such a heat conductive member group 720 is preferably a substance having elasticity, flame retardancy, and electrical insulation, in addition to thermal conductivity. For example, a gel sheet or rubber sheet containing silicone or acrylic resin and having high thermal conductivity can be used. As a result, the heat conductive member group 720 functions as a conductive member that conducts the heat generated in the drive circuit substrate 800 to the heat sink 710.

Furthermore, since the heat conductive member group 720 is configured to include a gel sheet or a rubber sheet, the heat conductive member group 720 functions as an insulating member for ensuring electrical insulation performance between the drive circuit substrate 800 and the heat sink 710, and also functions as a cushioning member for relieving stress which may occur when the heat sink 710 is attached to the drive circuit substrate 800.

Specifically, the heat conductive member group 720 includes heat conductive members 730, 740, 750, and 760. The heat conductive member 730 is located between the inductor L1 included in each of the plurality of drive circuits 52 and the protruding portion 715 included in the heat sink 710, and comes into contact with both the inductor L1 and the protruding portion 715 included in each of the plurality of drive circuits 52 by attaching the heat sink 710 to the drive circuit substrate 800. As a result, the heat conductive member 730 enhances the conduction efficiency of heat generated by the inductor L1 to the heat sink 710. The heat conductive member 740 is located between the transistor M1 included in each of the plurality of drive circuits 52 and the protruding portion 716 included in the heat sink 710, and comes into contact with both the transistor M1 and the protruding portion 716 included in each of the plurality of drive circuits 52 by attaching the heat sink 710 to the drive circuit substrate 800. As a result, the heat conductive member 740 enhances the conduction efficiency of heat generated by the transistor M1 to the heat sink 710. The heat conductive member 750 is located between the transistor M2 included in each of the plurality of drive circuits 52 and the protruding portion 716 included in the heat sink 710, and comes into contact with both the transistor M2 and the protruding portion 716 included in each of the plurality of drive circuits 52 by attaching the heat sink 710 to the drive circuit substrate 800. As a result, the heat conductive member 750 enhances the conduction efficiency of heat generated by the transistor M2 to the heat sink 710. The heat conductive member 760 is located between the integrated circuit 500 included in each of the plurality of drive circuits 52 and the protruding portion 717 included in the heat sink 710, and comes into contact with both the integrated circuit 500 and the protruding portion 717 included in each of the plurality of drive circuits 52 by attaching the heat sink 710 to the drive circuit substrate 800. As a result, the heat conductive member 760 enhances the conduction efficiency of heat generated by the transistor M2 to the heat sink 710.

Each of the plurality of screws 780 inserts each of the plurality of through-holes 820 included in the wiring substrate 810 included in the drive circuit substrate 800 from the −Z2 side toward the +Z2 side. Each of the plurality of screws 780 is fastened to the heat sink 710. As a result, the heat sink 710 is attached to the wiring substrate 810 included in the drive circuit substrate 800.

The cooling fan 770 is located on the −Z2 side of the heat sink 710. The cooling fan 770 introduces the outside air into the head drive module 10 through an opening portion 714 provided in an upper portion of the heat sink 710 on the +X2 side. Specifically, the heat sink 710 includes an opening portion 714 that penetrates the outside of the heat sink 710 and the accommodation space formed by the heat sink 710. The cooling fan 770 is attached to the heat sink 710 so as to cover the opening portion 714. By operating the cooling fan 770, outside air is introduced into the accommodation space formed by the heat sink 710 through the opening portion 714. As a result, the circulation efficiency of the air floating inside the accommodation space formed by the heat sink 710 is improved, and the heat release efficiency generated in the drive circuit 52 accommodated in the accommodation space is further improved.

Here, the cooling fan 770 may be attached so as to increase the circulation efficiency of the air floating inside the accommodation space formed by the heat sink 710. Therefore, the opening portion 714 to which the cooling fan 770 is attached may be located on any side surface of the accommodation space formed by the heat sink 710. In addition, the fact that the cooling fan 770 operates so as to introduce outside air into the accommodation space formed by the heat sink 710 is not limited to the fact that the cooling fan 770 operates so as to take in outside air into the accommodation space, and includes the case where the cooling fan 770 operates so as to exhaust the air floating inside the accommodation space.

The image information signal IP output by the control unit 2 is input to the head drive module 10 configured as described above via the coupling portion CN2. The integrated circuit 101 included in the head drive module 10 generates and outputs basic drive signals dA1 to dA6, dB1 to dB6, and dC1 to dC6, and a data signal DATA based on the input image information signal IP, and the reference voltage output circuit 53 generates and outputs a reference voltage signal VBS. The basic drive signals dA1 to dA6, dB1 to dB6, and dC1 to dC6 propagate through the wiring substrate 810 and are input to the corresponding drive circuits **52*a*1 to 52*a*6, 52*b*1 to 52*b*6, and 52*c*1 to 52*c*6. Each of the drive circuits 52*a*1 to 52*a*6, 52*b*1 to 52*b*6, and 52*c*1 to 52*c*6 generates and outputs drive signals COMA1 to COMA6, COMB1 to COMB6, and COMC1 to COMC6 corresponding to the basic drive signals dA1 to dA6, dB1 to dB6, and dC1 to dC6 input corresponding thereto. The data signal DATA output by the integrated circuit 101, the drive signals COMA1 to COMA6, COMB1 to COMB6, and COMC1 to COMC6 output by each of the drive circuits 52*a*1 to 52*a*6, 52*b*1 to 52*b*6, and 52*c*1 to 52*c*6, and the reference voltage signal VBS output by the reference voltage output circuit 53 propagate through the wiring substrate 810 and are output to the liquid discharge module 20 via the coupling portion CN2**.

6. Configuration of Drive Circuit Substrate

As described above, in the liquid discharge device 1 of the present embodiment, the piezoelectric element 60 included in each of the discharge modules 23-1 to 23-6 included in the liquid discharge module 20 is driven according to the potential difference between the drive signals COMA1 to COMA6, COMB1 to COMB6, and COMC1 to COMC6 output by the head drive module 10 and the reference voltage signal VBS. Each of the discharge modules 23-1 to 23-6 discharges an amount of ink corresponding to the drive amount of the piezoelectric element 60 from the corresponding nozzle N. Therefore, in order to improve the discharge accuracy of the ink discharged by the liquid discharge module 20, it is required to improve the waveform accuracy of the drive signals COMA1 to COMA6, COMB1 to COMB6, and COMC1 to COMC6 for driving the piezoelectric element 60.

Therefore, from the viewpoint of improving the waveform accuracy of the drive signals COMA1 to COMA6, COMB1 to COMB6, and COMC1 to COMC6 that drive the piezoelectric element 60, an example of the configuration of the drive circuit substrate 800 that generates the drive signals COMA1 to COMA6, COMB1 to COMB6, and COMC1 to COMC6, and outputs these signals to the liquid discharge module 20 will be described more specifically.

Figure 13:
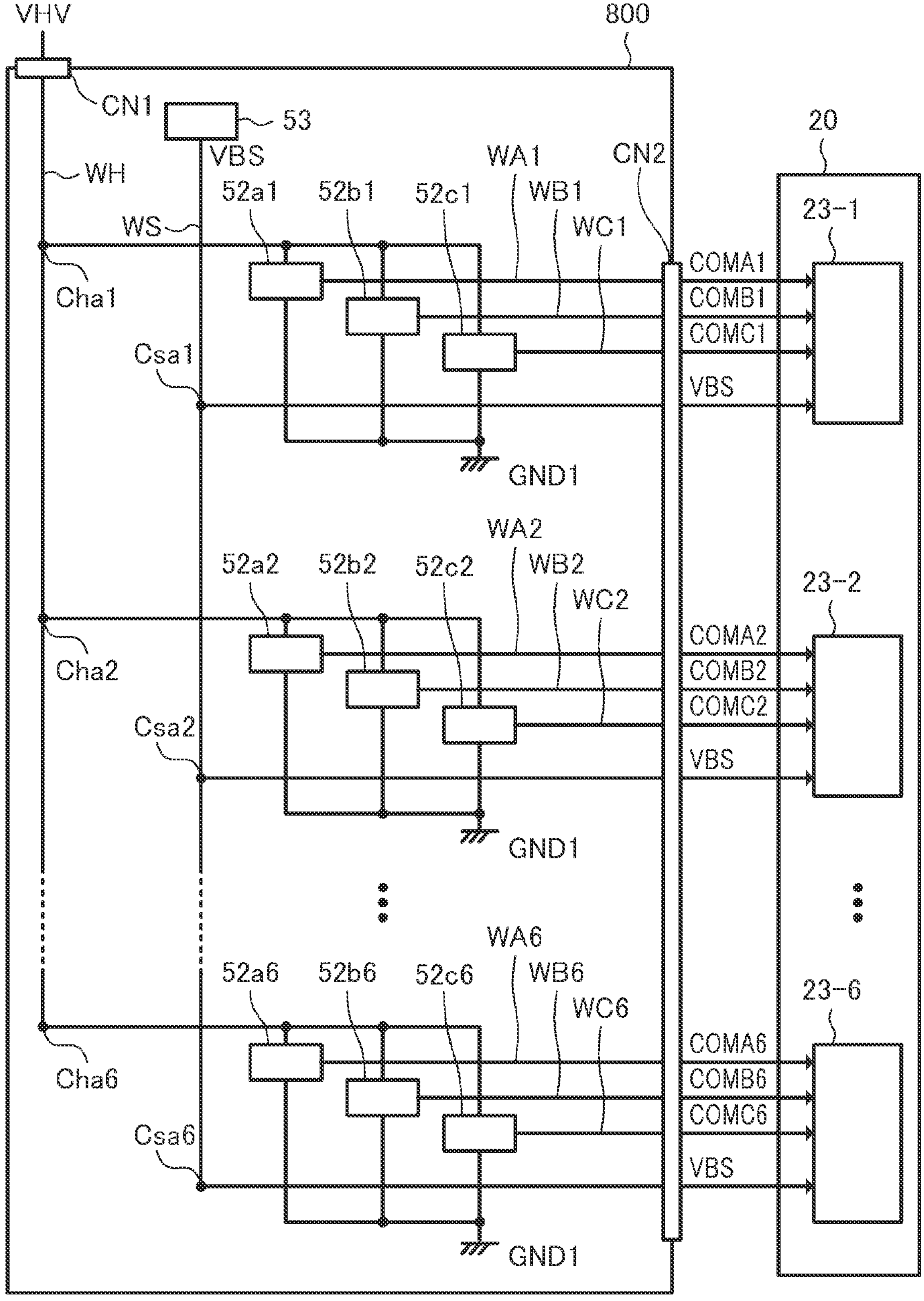
FIG. 13 is a diagram illustrating an example of an electrical coupling relationship of a drive circuit substrate.

FIG. 13 is a diagram illustrating an example of an electrical coupling relationship of the drive circuit substrate 800. In FIG. 13, the integrated circuit 101 which has a small contribution to the waveform accuracy of the drive signals COMA, COMB, and COMC, and the reference voltage signal VBS, and the wiring through which the data signal DATA output by the integrated circuit 101 is propagated are omitted. In addition, in FIG. 13, a voltage VHV that is input to each of the drive circuits 52*a*1 to 52*a*6, 52*b*1 to 52*b*6, and 52*c*1 to 52*c*6, and functions as an amplification voltage in each of the drive circuits 52*a*1 to 52*a*6, 52*b*1 to 52*b*6, and 52*c*1 to 52*c*6 is illustrated. Although the voltage VHV is illustrated in FIG. 13 as being supplied from a power supply circuit (not illustrated) configured outside the drive circuit substrate 800, the voltage VHV may be generated by the power supply circuit (not illustrated) provided on the drive circuit substrate 800.

As described above, the drive circuit substrate 800 includes the drive circuits 52*a*1 to 52*a*6, 52*b*1 to 52*b*6, and 52*c*1 to 52*c*6, the reference voltage output circuit 53, and the coupling portions CN1 and CN2. In addition, the wiring substrate 810 included in the drive circuit substrate 800 includes the wirings WA1 to WA6 through which each of the drive signals COMA1 to COMA6 propagates, the wirings WB1 to WB6 through which each of the drive signals COMB1 to COMB6 propagates, the wirings WC1 to WC6 through which each of the drive signals COMC1 to COMC6 propagates, the wiring WS through which the reference voltage signal VBS propagates, and the wiring WH through which the voltage VHV propagates.

The voltage VHV is input to the drive circuit substrate 800 via the coupling portion CN1. The voltage VHV propagates through the wiring WH provided on the wiring substrate 810.

The voltage VHV propagating through the wiring WH is branched at the contact Cha1 and is input to each of the drive circuits 52*a*1, 52*b*1, and 52*c*1. Each of the drive circuits 52*a*1, 52*b*1, and 52*c*1 generates and outputs drive signals COMA1, COMB1, and COMC1 by amplifying and demodulating the modulation signal Ms based on the input voltage VHV. At this time, the drive signal COMA1 output by the drive circuit 52*a*1 propagates through the wiring WA1 included in the wiring substrate 810 and is input to the discharge module 23-1 included in the liquid discharge module 20 via the coupling portion CN2, the drive signal COMB1 output by the drive circuit 52*b*1 propagates through the wiring WB1 included in the wiring substrate 810 and is input to the discharge module 23-1 included in the liquid discharge module 20 via the coupling portion CN2, and the drive signal COMC1 output by the drive circuit 52*c*1 propagates through the wiring WC1 included in the wiring substrate 810 and is input to the discharge module 23-1 included in the liquid discharge module 20 via the coupling portion CN2.

Similarly, the voltage VHV propagating through the wiring WH is branched at each of the contacts Cha2 to Cha6 and is input to each of the drive circuits 52*a*2 to 52*a*6, 52*b*2 to 52*b*6, and 52*c*2 to 52*c*6. Each of the drive circuits 52*a*2 to 52*a*6, 52*b*2 to 52*b*6, and 52*c*2 to 52*c*6 generates and outputs drive signals COMA2 to COMA6, COMB2 to COMB6, and COMC1 to COMC6 by amplifying and demodulating the modulation signal Ms based on the input voltage VHV. At this time, the drive signals COMA2, COMB2, and COMC2 output by each of the drive circuits 52*a*2, 52*b*2, and 52*c*2 propagate through each of the wirings WA2, WB2, and WC2 included in the wiring substrate 810, and are input to the discharge module 23-2 included in the liquid discharge module 20 via the coupling portion CN2. The drive signals COMA3, COMB3, and COMC3 output by each of the drive circuits 52*a*3, 52*b*3, and 52*c*3 propagate through each of the wirings WA3, WB3, and WC3 included in the wiring substrate 810, and are input to the discharge module 23-3 included in the liquid discharge module 20 via the coupling portion CN2. The drive signals COMA4, COMB4, and COMC4 output by each of the drive circuits 52*a*4, 52*b*4, and 52*c*4 propagate through each of the wirings WA4, WB4, and WC4 included in the wiring substrate 810, and are input to the discharge module 23-4 included in the liquid discharge module 20 via the coupling portion CN2. The drive signals COMA5, COMB5, and COMA5 output by each of the drive circuits 52*a*5, 52*b*5, and 52*c*5 propagate through each of the wirings WA5, WB5, and WC5 included in the wiring substrate 810, and are input to the discharge module 23-5 included in the liquid discharge module 20 via the coupling portion CN2. The drive signals COMA6, COMB6, and COMC6 output by each of the drive circuits 52*a*6, 52*b*6, and 52*c*6 propagate through each of the wirings WA6, WB6, and WC6 included in the wiring substrate 810, and are input to the discharge module 23-6 included in the liquid discharge module 20 via the coupling portion CN2.

The reference voltage output circuit 53 generates and outputs a reference voltage signal VBS having a predetermined voltage value by stepping down or stepping up the voltage VHV or a voltage signal (not illustrated). The reference voltage signal VBS output by the reference voltage output circuit 53 propagates through the wiring WS provided on the wiring substrate 810. The wiring WS is branched at each of the contacts Csa1 to Csa6 and is supplied to the electrode 603 of the piezoelectric element 60 included in each of the discharge modules 23-1 to 23-6 via the coupling portion CN2.

Figure 14:
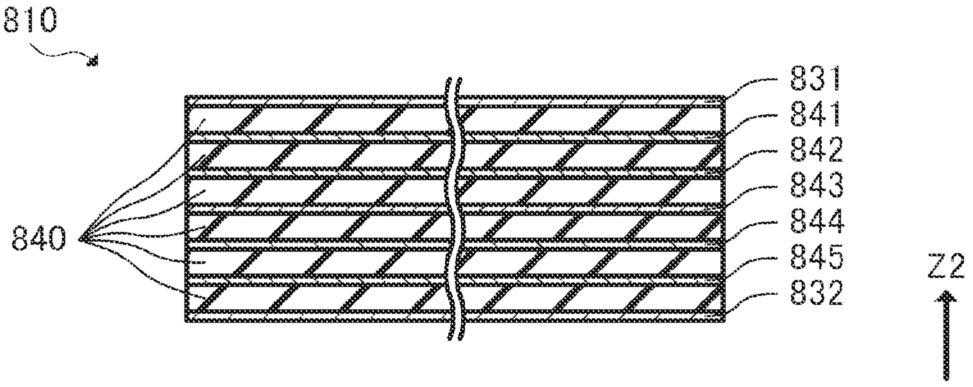
FIG. 14 is a diagram illustrating an example of a cross-sectional structure of a wiring substrate included in a drive circuit substrate.

Next, a specific example of the drive circuit substrate 800 corresponding to the electrical coupling relationship illustrated in FIG. 13 will be described. FIG. 14 is a diagram illustrating an example of a cross-sectional structure of the wiring substrate 810 included in the drive circuit substrate 800. As illustrated in FIG. 14, the wiring substrate 810 includes surfaces 831 and 832, layers 841 to 845, and a plurality of insulating layers 840.

The surface 831 and the surface 832 are located so as to face each other along the Z2 direction such that the surface 831 is on the +Z2 side and the surface 832 is on the −Z2 side. In addition, the layers 841 to 845 are located between the surface 831 and the surface 832 in the direction along the Z2 direction. At this time, the layers 841 to 845 are located in the order of the layer 841, the layer 842, the layer 843, the layer 844, and the layer 845 from the +Z2 side where the surface 831 is located to the −Z2 side where the surface 832 is located.

On the surfaces 831 and 832, a plurality of electronic components constituting various circuits including the plurality of drive circuits 52, and a part of a plurality of wiring patterns for electrically coupling the electronic components to each other and propagating various signals are provided. In addition, the layers 841 to 845 are provided with the plurality of wiring patterns for electrically coupling the electronic components provided on the surfaces 831 and 832 and propagating various signals. That is, the surfaces 831 and 832 and the layers 841 to 845 correspond to the wiring layer provided with the wiring pattern for propagating various signals. The wiring pattern provided on each of the surfaces 831 and 832 and the layers 841 to 845 corresponding to such wiring layers is formed by etching a copper foil, which is a material with excellent electrical conductivity.

The plurality of insulating layers 840 are located between the surface 831 and the layer 841, between the layer 841 and the layer 842, between the layer 842 and the layer 843, between the layer 843 and the layer 844, between the layer 844 and the layer 845, and between the layer 845 and the surface 832, respectively in the direction along the Z2 direction. Such a plurality of insulating layers 840 are insulators for insulating the layers of the surfaces 831, 832 and the layers 841 to 845, and configured to include, for example, a substance having excellent insulating performance such as epoxy glass formed by impregnating a glass fiber cloth with an epoxy resin.

As described above, the wiring substrate 810 according to the present embodiment is a so-called multilayer substrate including the surface 831 and the surface 832 different from the surface 831 and having a plurality of wiring layers provided along the Z2 direction between the surface 831 and the surface 832. In addition, the wiring substrate 810 configured to include such a multilayer substrate has via wiring penetrating the plurality of insulating layers 840 in order to electrically couple the surfaces 831 and 832 and the layers 841 to 845 to each other. The via wiring provided on the wiring substrate 810 has a known structure and detailed description thereof will be omitted. As the via wiring provided on the wiring substrate 810 of the present embodiment, for example, a via wiring with a diameter of 0.3 mm, a via wiring with a diameter of 0.5 mm, or the like can be used according to the amount of current flowing through the via wiring. That is, the wiring substrate 810 of the present embodiment includes a plurality of wiring layers provided along the Z direction and the via wiring for electrically coupling the layers of the plurality of wiring layers.

First, a specific example of the configuration of the surfaces 831, 832 on which various electronic components are mounted will be described. Here, in the liquid discharge device 1 of the present embodiment, various electronic components are described as being mounted on the surface 831, and detailed description of the surface 832 will be omitted. Not all the electronic components constituting the drive circuit substrate 800 are mounted on the surface 831 of the wiring substrate 810. In addition, a part or all of the configuration mounted on the surface 831 described below may be mounted on the surface 832.

Figure 15:
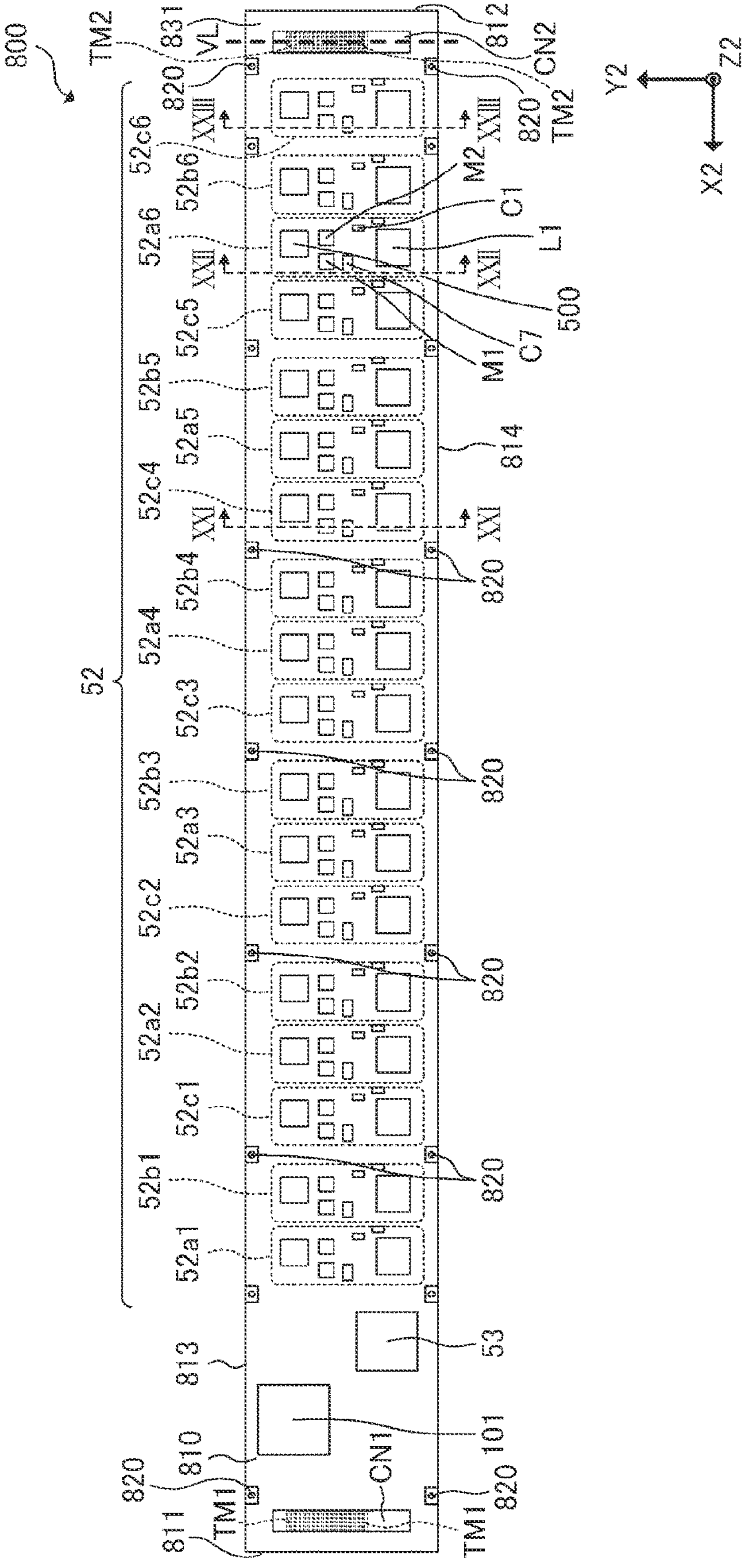
FIG. 15 is a diagram illustrating an example of a configuration of a surface of the wiring substrate.

FIG. 15 is a diagram illustrating an example of a configuration of the surface 831 of the wiring substrate 810. Here, FIG. 15 illustrates an example of the configuration of the surface 831 when the wiring substrate 810 is viewed from the +Z2 side along the Z2 direction. In the following description, the case where the wiring substrate 810 is viewed from the +Z2 side along the Z2 direction may be referred to as a plan view of the wiring substrate 810.

As illustrated in FIG. 15, the wiring substrate 810 is a substantially rectangular shape including sides 811 and 812 facing each other along the X2 direction and sides 813 and 814 facing each other along the Y2 direction.

Specifically, the side 811 is located on the +X2 side of the wiring substrate 810, and the side 812 is located on the −X2 side of the wiring substrate 810. The side 813 intersects both sides 811 and 812 and is located on the +Y2 side of the wiring substrate 810. The side 814 intersects both sides 811 and 812 and is located on the −Y2 side of the wiring substrate 810.

The surface 831 of the wiring substrate 810 is provided with the coupling portions CN1 and CN2, the integrated circuit 101, the plurality of drive circuits 52, and the reference voltage output circuit 53.

The coupling portion CN1 is electrically coupled to a plurality of terminals TM1 included in the wiring substrate 810 by solder or the like. The plurality of terminals TM1 included in the wiring substrate 810 are arranged side by side along the side 811 of the wiring substrate 810 in the direction along the Y direction. That is, the coupling portion CN1 is located along the side 811. The coupling portion CN1 is electrically coupled to the control unit 2. Specifically, a cable (not illustrated) electrically coupled to the control unit 2 is attached to the coupling portion CN1. As a result, a signal including the image information signal IP output by the control unit 2 is supplied to the head drive module 10 via the terminal TM1. The coupling portion CN1 may be a board to board (B to B) connector that enables electrical coupling between the control unit 2 and the head drive module 10 without using a cable.

The coupling portion CN2 is electrically coupled to a plurality of terminals TM2 included in the wiring substrate 810 by solder or the like. The plurality of terminals TM2 included in the wiring substrate 810 are arranged side by side along the side 812 of the wiring substrate 810 in the direction along the Y direction. That is, the coupling portion CN2 is located along the side 812. The coupling portion CN2 is electrically coupled to the liquid discharge module 20. Specifically, one end of the coupling member 30 is attached to the coupling portion CN2. In addition, the other end of the coupling member 30 is coupled to the coupling portion 330 included in the liquid discharge module 20. As a result, the signal including the drive signals COMA1 to COMA6, COMB1 to COMB6, and COMC1 to COMC6 and the data signal DATA output by the head drive module 10 are supplied to the liquid discharge module 20 via the plurality of terminals TM2, the coupling portion CN2, and the coupling member 30. That is, the wiring substrate 810 includes the terminal TM2 that outputs the drive signals COMA1 to COMA6, COMB1 to COMB6, and COMC1 to COMC6. Here, the coupling portions CN2 and 330 may be B to B connectors as described above.

The integrated circuit 101 is located on the −X2 side of the coupling portion CN1. The integrated circuit 101 includes all or a part of the above-described control circuit 100 and all or a part of the conversion circuit 120. The integrated circuit 101 generates and outputs various signals including the data signal DATA, the basic drive signal dA1 to dA6, dB1 to dB6, and dC1 to dC6 based on the image information signal IP input via the coupling portion CN1. The data signal DATA output by the integrated circuit 101 propagates through a wiring pattern (not illustrated) provided on the wiring substrate 810, and is output to the liquid discharge module 20 via the coupling portion CN2. In addition, each of the basic drive signals dA1 to dA6, dB1 to dB6, and dC1 to dC6 output by the integrated circuit 101 propagates through a wiring pattern (not illustrated) provided on the wiring substrate 810, and is input to the corresponding drive circuits 52*a*1 to 52*a*6, 52*b*1 to 52*b*6, and 52*c*1 to 52*c*6.

The reference voltage output circuit 53 is located on the −X2 side of the integrated circuit 101. The reference voltage output circuit 53 generates and outputs a reference voltage signal VBS by stepping down or stepping up the voltage VHV input from the coupling portion CN1 or a voltage signal (not illustrated). The reference voltage signal VBS propagates through the wiring pattern provided on the wiring substrate 810 and is supplied to the liquid discharge module 20 via the coupling portion CN2. Such a reference voltage output circuit 53 may be configured to include one or a plurality of semiconductor devices, or may be configured to include a plurality of electronic components.

Here, FIG. 15 illustrates a case where the integrated circuit 101 and the reference voltage output circuit 53 are disposed on the surface 831 of the wiring substrate 810 together with the plurality of drive circuits 52, but at least one of the integrated circuit 101 and the reference voltage output circuit 53 may be disposed on the surface 832 of the wiring substrate 810. Furthermore, at least one of the integrated circuit 101 and the reference voltage output circuit 53 may be provided on a circuit substrate (not illustrated) different from the wiring substrate 810.

The plurality of drive circuits 52 including the drive circuits **52*a*1 to 52*a*6, 52*b*1 to 52*b*6, and 52*c*1 to 52*c*6 are located between the reference voltage output circuit 53 and the coupling portion CN2, and are located side by side along the X2 direction. Specifically, the drive circuits 52*a*1 to 52*a*6, 52*b*1 to 52*b*6, and 52*c*1 to 52*c*6 corresponding to each of the discharge modules 23-1 to 23-6 included in the liquid discharge module 20 are located side by side in the order of the drive circuits 52*a*1, 52*b*1, 52*c*1, 52*a*2, 52*b*2, 52*c*2, 52*a*3, 52*b*3, 52*c*3, 52*a*4, 52*b*4, 52*c*4, 52*a*5, 52*b*5, 52*c*5, 52*a*6, 52*b*6, and 52*c*6 on the surface 831 of the wiring substrate 810** from the +X2 side to the −X2 side along the X2 direction.

In this case, the transistor M1 and the transistor M2 included in each of the plurality of drive circuits 52 are located side by side such that the transistor M1 is on the +X2 side and the transistor M2 is on the −X2 side in the direction along the X2 direction. The inductor L1 is located on the −Y2 side of the transistors M1 and M2 located side by side in the direction along the X2 direction, and the integrated circuit 500 is located on the +Y2 side of the transistors M1 and M2 located side by side in the direction along the X2 direction. That is, the integrated circuit 500, the transistors M1 and M2, and the inductor L1 included in the drive circuit 52 are located side by side in the order of the integrated circuit 500, the transistors M1 and M2 arranged side by side, and the inductor L1 along the direction from the side 813 to the side 814 in the surface 831 of the wiring substrate 810.

In addition, the capacitors C1 and C7 of each of the plurality of drive circuits 52 are located between the transistors M1 and M2 arranged side by side along the direction from the side 813 toward the side 814 and the inductor L1. In this case, the capacitor C7 is located in the vicinity of the transistor M1, and the capacitor C1 is located in the vicinity of the inductor L1.

The capacitor C7 reduces noise that can be superimposed on the voltage VHV supplied to the drain of the transistor M1 and also reduces voltage fluctuations that can occur in the voltage VHV. By locating such a capacitor C7 in the vicinity of the transistor M1, the wiring length between the capacitor C1 and the drain of the transistor M1 can be shortened. As a result, the possibility that noise is superimposed on the voltage VHV can be reduced, and the possibility that the voltage value of the voltage VHV input to the drain of the transistor M1 fluctuates can be further reduced. As a result, the accuracy of the voltage VHV supplied to the transistor M1 is improved, and the accuracy of the amplification modulation signals AMs output by the amplifier circuit 550 including the transistor M1 is improved.

The capacitor C1 and the inductor L1 constitute a low-pass filter. The drive signal COM is generated by demodulating the amplification modulation signal AMs output by the amplifier circuit 550 by a low-pass filter including the capacitor C1 and the inductor L1. By locating the capacitor C1 constituting such a low-pass filter in the vicinity of the inductor L1, the wiring length that electrically couples the capacitor C1 and the inductor L1 can be shortened. As a result, the operational stability of the low-pass filter configured to include the capacitor C1 and the inductor L1 is improved. Therefore, the waveform accuracy of the drive signal COM output by the demodulation circuit 560 including the low-pass filter configured to include the capacitor C1 and the inductor L1 is improved.

Here, in the wiring substrate 810, the integrated circuits 500 included in each of the plurality of drive circuits 52 are located side by side along the X2 direction. The transistors M1 and M2 arranged side by side are alternately located side by side along the X2 direction, and the inductors L1 are located side by side along the X2 direction. That is, the plurality of drive circuits 52 are located on the surface 831 of the wiring substrate 810 such that a row of integrated circuits 500 arranged side by side from the side 812 to the side 811, a row of transistors M1 and M2 arranged side by side from the side 812 to the side 811, and a row of inductor L1 arranged side by side from the side 812 to the side 811 are formed.

Next, the configurations of the layers 841 to 845 located between the surface 831 and the surface 832 of the wiring layers of the wiring substrate 810 will be described. As illustrated in FIG. 14, the layers 841 to 845 included in the wiring substrate 810 are located in the order of the layer 841, the layer 842, the layer 843, the layer 844, and the layer 845 from the +Z2 side where the surface 831 is located toward the −Z2 side where the surface 832 is located in the direction along the Z2 direction.

The layer 841 is provided with a wiring pattern through which a constant potential signal, for example, a ground potential GND, propagates. In addition, the layer 842 is provided with wirings WA1 to WA6 through which the drive signals COMA1 to COMA6 propagate, and wiring patterns through which the ground potential GND propagates. The layer 843 is provided with wirings WC1 to WC6 through which the drive signals COMC1 to COMC6 propagate, and wiring WS through which the reference voltage signal VBS propagates. The layer 844 is provided with wirings WB1 to WB6 through which the drive signals COMB1 to COMB6 propagate and wiring patterns through which the ground potential GND propagates. The layer 845 is provided with a wiring pattern through which a constant potential signal, for example, a ground potential GND, propagates.

Figure 16:
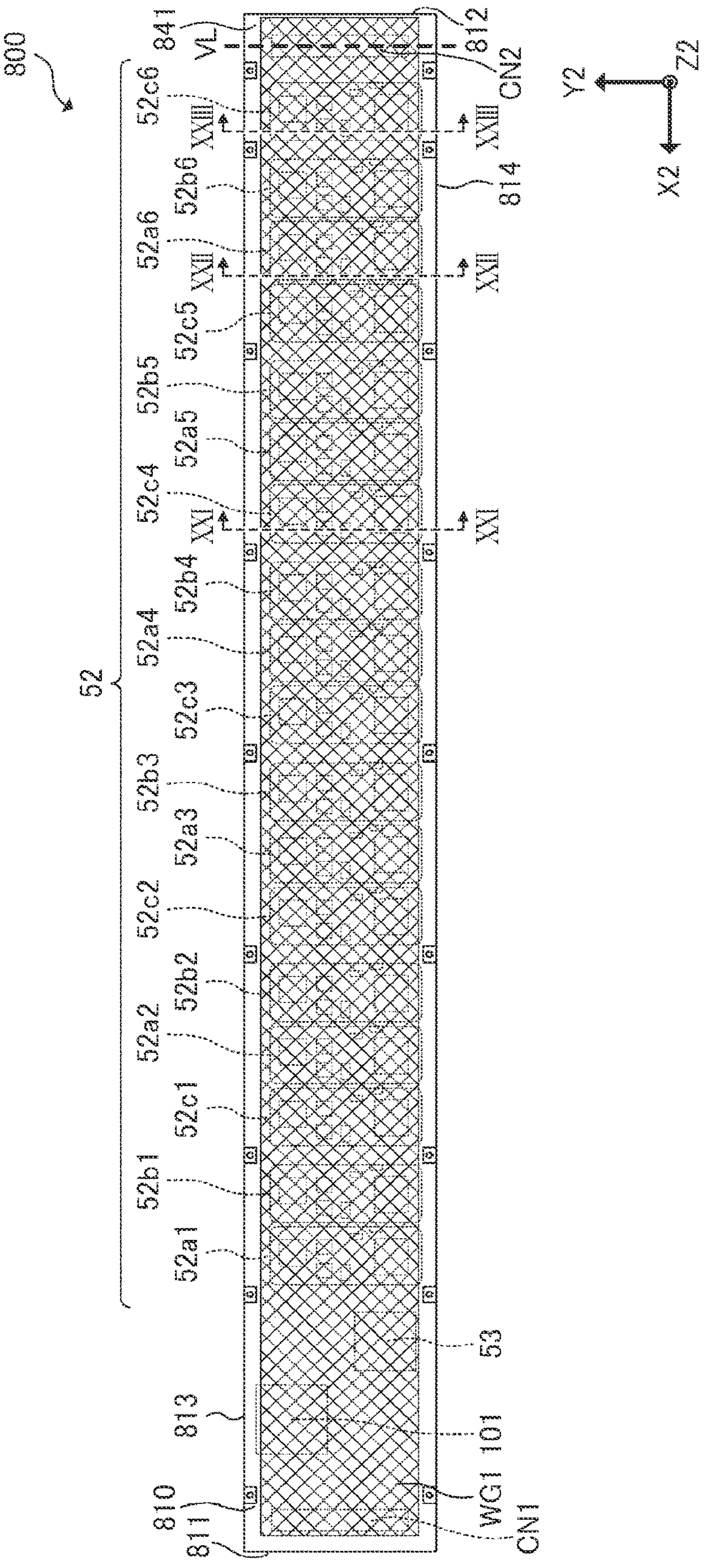
FIG. 16 is a diagram illustrating an example of a configuration of a layer of the wiring substrate.

First, a specific example of the configuration of the layer 841 of the inner layers of the wiring substrate 810 will be described. FIG. 16 is a diagram illustrating an example of a configuration of the layer 841 of the wiring substrate 810. Here, FIG. 16 is a perspective view illustrating an example of the configuration of the layer 841 in a plan view of the wiring substrate 810. In FIG. 16, a part of the configuration provided other than the layer 841 of the wiring substrate 810 is illustrated by a broken line.

As illustrated in FIG. 16, the wiring WG1 is formed on substantially one surface of the layer 841 in the layer 841. Specifically, the layer 841 is formed with the wiring WG1 such that at least a part thereof overlaps with at least a part of each of the drive circuits **52*a*1 to 52*a*6, 52*b*1 to 52*b*6, and 52*c*1 to 52*c*6 in a plan view of the wiring substrate 810. The ground potential GND, which is a signal having a constant voltage and for example, is a reference potential of the drive circuit substrate 800, is supplied to the wiring WG1**.

In FIG. 16, the case where only the wiring WG1 is formed on substantially one surface of the layer 841 is illustrated, but the present disclosure is not limited thereto. That is, in addition to the wiring WG1, the layer 841 may be provided with a wiring pattern through which various signals such as the data signals DATA, the clock signals SCK1 to SCK6 generated by restoring the data signal DATA, the print data signals SI1 to SI6, and the latch signals LAT1 to LAT6 and a power supply voltage propagate. Furthermore, the layer 841 may be provided with via wiring for electrically coupling the layers of the wiring substrate 810 to each other. Therefore, the fact that the wiring WG1 is formed on substantially one surface of the layer 841 is not limited to the fact that the wiring WG1 is formed in the entire region of the layer 841. Specifically, the wiring WG1 may occupy most of the region of the layer 841, and for example, the wiring WG1 may occupy 50% or more of the entire region of the layer 841.

That is, the wiring substrate 810 includes the layer 841 as a plurality of wiring layers, and the layer 841 includes the wiring WG1 through which a signal having a constant potential propagates. The wiring WG1 is located so as to overlap with the wirings WA1 to WA6 through which the drive signals COMA1 to COMA6 propagate in the direction along the Z direction. As a result, the wiring WG1 functions as a shield that protects the wirings WA1 to WA6 from external noise.

Here, in the liquid discharge device 1 of the present embodiment, it is described that a constant potential signal propagated through the wiring WG1 is a ground signal, and the wiring WG1 may propagate a DC voltage such as a power supply voltage as a constant potential signal.

Figure 17:
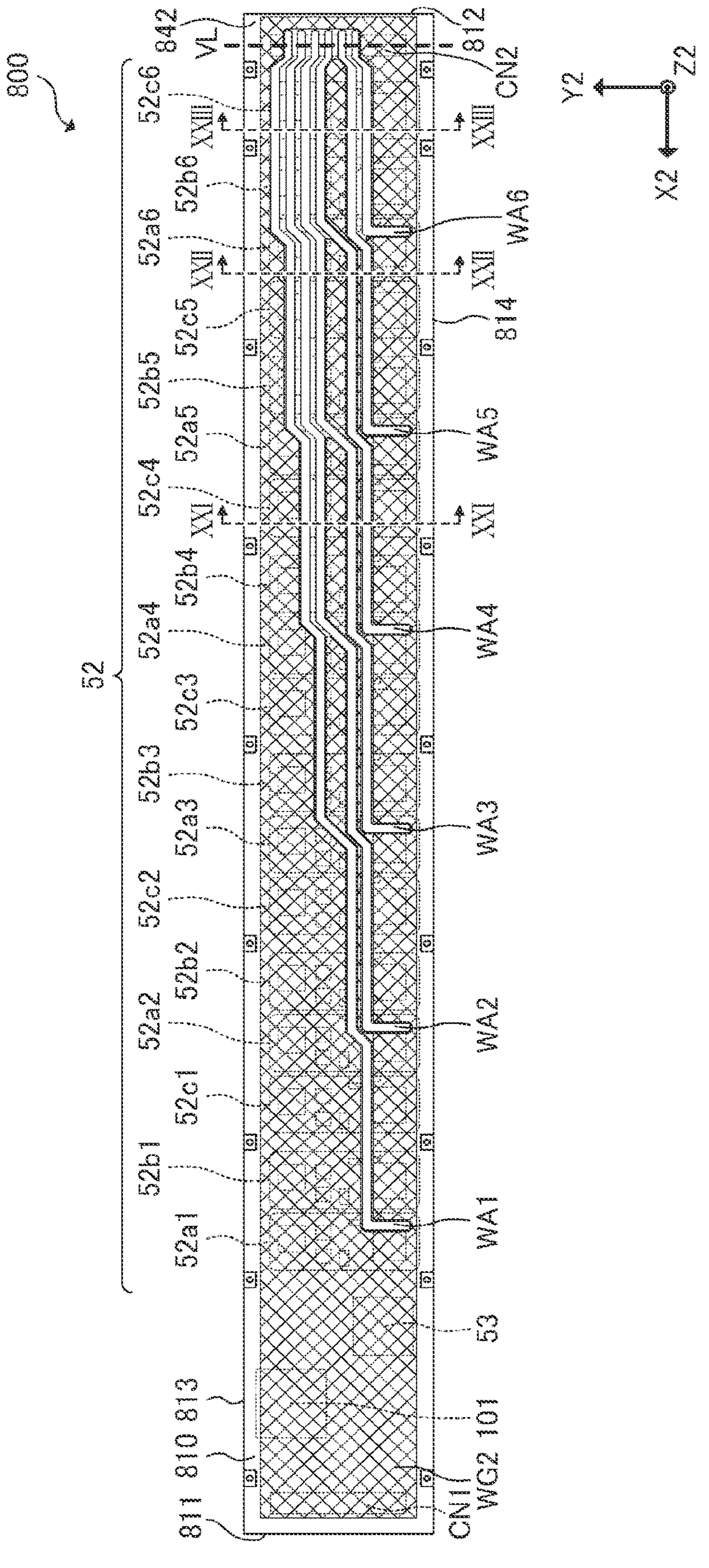
FIG. 17 is a diagram illustrating an example of a configuration of a layer of the wiring substrate.

Next, a specific example of the configuration of the layer 842 of the inner layers of the wiring substrate 810 will be described. FIG. 17 is a diagram illustrating an example of a configuration of the layer 842 of the wiring substrate 810. Here, FIG. 17 is a perspective view illustrating an example of the configuration of the layer 842 in a plan view of the wiring substrate 810. In FIG. 17, a part of the configuration provided other than the layer 842 of the wiring substrate 810 is illustrated by a broken line.

The wirings WA1 to WA6 are formed on the layer 842. One end of the wiring WA1 is electrically coupled to one end of the inductor L1 and one end of the capacitor C1 included in the drive circuit 52*a*1 through a via (not illustrated), and the other end of the wiring WA1 is electrically coupled to the coupling portion CN2 through a via (not illustrated) and the terminal TM2. As a result, the wiring WA1 propagates the drive signal COMA1 output by the drive circuit 52*a*1 to the coupling portion CN2.

The wiring WA2 is located on the −X2 side of the wiring WA1 and on the −Y2 side of the wiring WA1. One end of the wiring WA2 is electrically coupled to one end of the inductor L1 and one end of the capacitor C1 included in the drive circuit 52*a*2 through a via (not illustrated), and the other end of the wiring WA2 is electrically coupled to the coupling portion CN2 through a via (not illustrated) and the terminal TM2. As a result, the wiring WA2 propagates the drive signal COMA2 output by the drive circuit 52*a*2 to the coupling portion CN2.

The wiring WA3 is located on the −X2 side of the wiring WA2 and on the −Y2 side of the wiring WA2. One end of the wiring WA3 is electrically coupled to one end of the inductor L1 and one end of the capacitor C1 included in the drive circuit 52*a*3 through a via (not illustrated), and the other end of the wiring WA3 is electrically coupled to the coupling portion CN2 through a via (not illustrated) and the terminal TM2. As a result, the wiring WA3 propagates the drive signal COMA3 output by the drive circuit 52*a*3 to the coupling portion CN2.

The wiring WA4 is located on the −X2 side of the wiring WA3 and on the −Y2 side of the wiring WA3. One end of the wiring WA4 is electrically coupled to one end of the inductor L1 and one end of the capacitor C1 included in the drive circuit 52*a*4 through a via (not illustrated), and the other end of the wiring WA4 is electrically coupled to the coupling portion CN2 through a via (not illustrated) and the terminal TM2. As a result, the wiring WA4 propagates the drive signal COMA4 output by the drive circuit 52*a*4 to the coupling portion CN2.

The wiring WA5 is located on the −X2 side of the wiring WA4 and on the −Y2 side of the wiring WA4. One end of the wiring WA5 is electrically coupled to one end of the inductor L1 and one end of the capacitor C1 included in the drive circuit 52*a*5 through a via (not illustrated), and the other end of the wiring WA5 is electrically coupled to the coupling portion CN2 through a via (not illustrated) and the terminal TM2. As a result, the wiring WA5 propagates the drive signal COMA5 output by the drive circuit 52*a*5 to the coupling portion CN2.

The wiring WA6 is located on the −X2 side of the wiring WA5 and on the −Y2 side of the wiring WA5. One end of the wiring WA6 is electrically coupled to one end of the inductor L1 and one end of the capacitor C1 included in the drive circuit 52*a*6 through a via (not illustrated), and the other end of the wiring WA6 is electrically coupled to the coupling portion CN2 through a via (not illustrated) and the terminal TM2. As a result, the wiring WA6 propagates the drive signal COMA6 output by the drive circuit 52*a*6 to the coupling portion CN2.

That is, the wiring WA1 through which the drive signal COMA1 propagates, the wiring WA2 through which the drive signal COMA2 propagates, the wiring WA3 through which the drive signal COMA3 propagates, the wiring WA4 through which the drive signal COMA4 propagates, the wiring WA5 through which the drive signal COMA5 propagates, and the wiring WA6 through which the drive signal COMA6 propagates are located side by side in the order of the wiring WA1, the wiring WA2, the wiring WA3, the wiring WA4, the wiring WA5, and the wiring WA6 from the +Y2 side to the −Y2 side along the Y2 direction on the layer 842. In the following description, in the layer 842, a region between the wiring WA1 and the wiring WA2 may be referred to as an inter-wire region BW12, a region between the wiring WA2 and the wiring WA3 may be referred to as an inter-wire region BW23, a region between the wiring WA3 and the wiring WA4 may be referred to as an inter-wire region BW34, a region between the wiring WA4 and the wiring WA5 may be referred to as an inter-wire region BW45, and a region between the wiring WA5 and the wiring WA6 may be referred to as an inter-wire region BW56.

In addition, the wiring WG2 is formed on the layer 842. Specifically, the wiring WG2 is formed in the layer 842 on substantially one surface of a region that does not overlap with the wirings WA1 to WA6 described above. At this time, at least a part of the wiring WG2 is also located in the inter-wire regions BW12, BW23, BW34, BW45, and BW56. The ground potential GND, which is a signal having a constant voltage and is a reference potential of the drive circuit substrate 800, is supplied to the wiring WG2. That is, the wiring WG2 propagates a signal having a constant potential and a constant signal at the ground potential GND.

No, instead of a constant signal at the ground potential GND, a constant signal at a predetermined voltage value, such as a power supply voltage, may be propagated to the wiring WG2.

Here, in addition to the wirings WA1 to WA6, and WG2, the layer 842 may be provided with a wiring pattern through which various signals such as the data signals DATA, the clock signals SCK1 to SCK6 generated by restoring the data signal DATA, the print data signals SI1 to SI6, and the latch signals LAT1 to LAT6 and a power supply voltage propagate, or via wiring for coupling the layers included in the wiring substrate 810 to each other may be provided.

As described above, the layer 841 among the plurality of wiring layers included in the wiring substrate 810 includes the wiring WA1 through which the drive signal COMA1 which is supplied to the electrode 602 of the piezoelectric element 60 included in the discharge module 23-1 and drives the piezoelectric element 60 such that ink is discharged from the liquid discharge module 20 propagates, of the drive signal COM, the wiring WA2 through which the drive signal COMA2 which is supplied to the electrode 602 of the piezoelectric element 60 included in the discharge module 23-2 and drives the piezoelectric element 60 such that ink is discharged from the liquid discharge module 20 propagates, of the drive signal COM, the wiring WA3 through which the drive signal COMA3 which is supplied to the electrode 602 of the piezoelectric element 60 included in the discharge module 23-3 and drives the piezoelectric element 60 such that ink is discharged from the liquid discharge module 20, of the drive signal COM, the wiring WA4 through which the drive signal COMA4 which is supplied to the electrode 602 of the piezoelectric element 60 included in the discharge module 23-4 and drives the piezoelectric element 60 such that ink is discharged from the liquid discharge module 20 propagates, of the drive signal COM, the wiring WA5 through which the drive signal COMA5 which is supplied to the electrode 602 of the piezoelectric element 60 included in the discharge module 23-5 and drives the piezoelectric element 60 such that ink is discharged from the liquid discharge module 20 propagates, of the drive signal COM, the wiring WA6 through which the drive signal COMA6 which is supplied to the electrode 602 of the piezoelectric element 60 included in the discharge module 23-6 and drives the piezoelectric element 60 such that ink is discharged from the liquid discharge module 20 propagates, of the drive signal COM, and at least a part of the wiring WG2 located in the inter-wire region BW12 between the wiring WA1 and the wiring WA2, in the inter-wire region BW23 between the wiring WA2 and the wiring WA3, in the inter-wire region BW34 between the wiring WA3 and the wiring WA4, in the inter-wire region BW45 between the wiring WA4 and the wiring WA5, and in the inter-wire region BW56 between the wiring WA5 and the wiring WA6.

Figure 18:
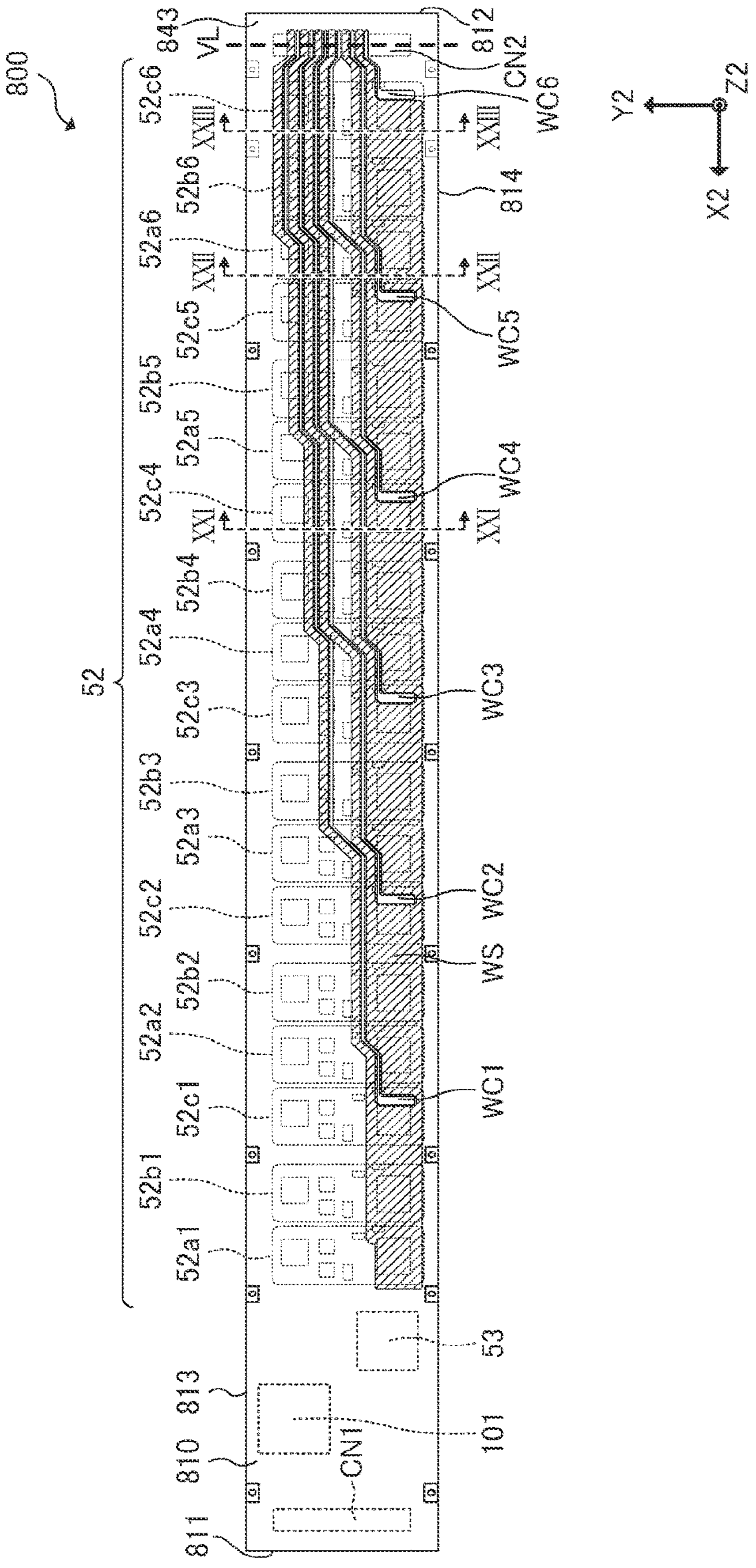
FIG. 18 is a diagram illustrating an example of a configuration of a layer of the wiring substrate.

Next, a specific example of the configuration of the layer 843 of the inner layers of the wiring substrate 810 will be described. FIG. 18 is a diagram illustrating an example of a configuration of the layer 843 of the wiring substrate 810. Here, FIG. 18 is a perspective view illustrating an example of the configuration of the layer 843 in a plan view of the wiring substrate 810. In FIG. 18, a part of the configuration provided other than the layer 843 of the wiring substrate 810 is illustrated by a broken line.

The layer 842 and the layer 843 are located adjacent to each other in a plurality of wiring layers of the wiring substrate 810. In other words, the layer 842 is located between the layer 843 and the layer 841 along the Z direction.

The wirings WC1 to WS are formed on the layer 843. One end of the wiring WC1 is electrically coupled to one end of the inductor L1 and one end of the capacitor C1 included in the drive circuit 52*c*1 through a via (not illustrated), and the other end of the wiring WC1 is electrically coupled to the coupling portion CN2 through a via (not illustrated) and the terminal TM2. As a result, the wiring WC1 propagates the drive signal COMC1 output by the drive circuit 52*c*1 to the coupling portion CN2.

The wiring WC2 is located on the −X2 side of the wiring WC1 and on the −Y2 side of the wiring WC1. One end of the wiring WC2 is electrically coupled to one end of the inductor L1 and one end of the capacitor C1 included in the drive circuit 52*c*2 through a via (not illustrated), and the other end of the wiring WC2 is electrically coupled to the coupling portion CN2 through a via (not illustrated) and the terminal TM2. As a result, the wiring WC2 propagates the drive signal COMC2 output by the drive circuit 52*c*2 to the coupling portion CN2.

The wiring WC3 is located on the −X2 side of the wiring WC2 and on the −Y2 side of the wiring WC2. One end of the wiring WC3 is electrically coupled to one end of the inductor L1 and one end of the capacitor C1 included in the drive circuit 52*c*3 through a via (not illustrated), and the other end of the wiring WC3 is electrically coupled to the coupling portion CN2 through a via (not illustrated) and the terminal TM2. As a result, the wiring WC3 propagates the drive signal COMC3 output by the drive circuit 52*c*3 to the coupling portion CN2.

The wiring WC4 is located on the −X2 side of the wiring WC3 and on the −Y2 side of the wiring WC3. One end of the wiring WC4 is electrically coupled to one end of the inductor L1 and one end of the capacitor C1 included in the drive circuit 52*c*4 through a via (not illustrated), and the other end of the wiring WC4 is electrically coupled to the coupling portion CN2 through a via (not illustrated) and the terminal TM2. As a result, the wiring WC4 propagates the drive signal COMC4 output by the drive circuit 52*c*4 to the coupling portion CN2.

The wiring WC5 is located on the −X2 side of the wiring WC4 and on the −Y2 side of the wiring WC4. One end of the wiring WC5 is electrically coupled to one end of the inductor L1 and one end of the capacitor C1 included in the drive circuit 52*c*5 through a via (not illustrated), and the other end of the wiring WC5 is electrically coupled to the coupling portion CN2 through a via (not illustrated) and the terminal TM2. As a result, the wiring WC5 propagates the drive signal COMC5 output by the drive circuit 52*c*5 to the coupling portion CN2.

The wiring WC6 is located on the −X2 side of the wiring WC5 and on the −Y2 side of the wiring WC5. One end of the wiring WC6 is electrically coupled to one end of the inductor L1 and one end of the capacitor C1 included in the drive circuit 52*c*6 through a via (not illustrated), and the other end of the wiring WC6 is electrically coupled to the coupling portion CN2 through a via (not illustrated) and the terminal TM2. As a result, the wiring WC6 propagates the drive signal COMC6 output by the drive circuit 52*c*6 to the coupling portion CN2.

In addition, the wiring WS is formed on the layer 843. The reference voltage signal VBS output by the reference voltage output circuit 53 is supplied to the wiring WS through a via (not illustrated) or the like. That is, the wiring WS propagates the reference voltage signal VBS. The wiring WS is branched corresponding to each of the discharge modules 23-1 to 23-6, and each of the branched end portions is electrically coupled to the coupling portion CN2 through a via (not illustrated) and the terminal TM2.

Here, in addition to the wirings WA1 to WA6 and WS, the layer 843 may be provided with a part of a wiring pattern through which various signals such as the data signals DATA, the clock signals SCK1 to SCK6 generated by restoring the data signal DATA, the print data signals SI1 to SI6, and the latch signals LAT1 to LAT6 and a power supply voltage propagate, or via wiring for coupling the layers included in the wiring substrate 810 to each other may be provided.

As described above, the layer 841 of the plurality of wiring layers included in the wiring substrate 810 includes the wiring WC1 through which the drive signal COMC1 which is supplied to the electrode 602 of the piezoelectric element 60 included in the discharge module 23-1 and drives the piezoelectric element 60 such that ink is not discharged from the liquid discharge module 20 propagates, of the drive signal COM, the wiring WC2 through which the drive signal COMC2 which is supplied to the electrode 602 of the piezoelectric element 60 included in the discharge module 23-2 and drives the piezoelectric element 60 such that ink is not discharged from the liquid discharge module 20 propagates, of the drive signal COM, the wiring WC3 through which the drive signal COMC3 which is supplied to the electrode 602 of the piezoelectric element 60 included in the discharge module 23-3 and drives the piezoelectric element 60 such that ink is not discharged from the liquid discharge module 20 propagates, of the drive signal COM, the wiring WC4 through which the drive signal COMC4 which is supplied to the electrode 602 of the piezoelectric element 60 included in the discharge module 23-4 and drives the piezoelectric element 60 such that ink is not discharged from the liquid discharge module 20 propagates, of the drive signal COM, the wiring WC5 through which the drive signal COMC5 which is supplied to the electrode 602 of the piezoelectric element 60 included in the discharge module 23-5 and drives the piezoelectric element 60 such that ink is not discharged from the liquid discharge module 20 propagates, of the drive signal COM, the wiring WC6 through which the drive signal COMC6 which is supplied to the electrode 602 of the piezoelectric element 60 included in the discharge module 23-6 and drives the piezoelectric element 60 such that ink is not discharged from the liquid discharge module 20 propagates, of the drive signal COM, and the wiring WS through which the reference voltage signal VBS supplied to the electrode 603 of the piezoelectric element 60 included in the discharge module 23-1, supplied to the electrode 603 of the piezoelectric element 60 included in the discharge module 23-2, supplied to the electrode 603 of the piezoelectric element 60 included in the discharge module 23-3, supplied to the electrode 603 of the piezoelectric element 60 included in the discharge module 23-4, supplied to the electrode 603 of the piezoelectric element 60 included in the discharge module 23-5, and supplied to the electrode 603 of the piezoelectric element 60 included in the discharge module 23-6, and having a constant voltage value propagates.

At this time, the wire width of the wirings WC1 to WC6 propagating the drive signals COMC1 to COMC6 provided in the layer 843 is smaller than the wire width of the wirings WA1 to WA6 propagating the drive signals COMA1 to COMA6 provided in the layer 842. The wire width of the wirings WC1 to WC6 propagating the drive signals COMC1 to COMC6 provided in the layer 843 is smaller than the wire width of the wirings WB1 to WB6 propagating the drive signals COMB1 to COMB6 provided in the layer 844 described later.

As described above, the drive signals COMC1 to COMC6 drive the corresponding piezoelectric elements 60 such that the ink is not discharged from the nozzle N.

Therefore, the amount of current generated by the propagation of the drive signals COMC1 to COMC6 is smaller than the amount of current generated by the propagation of the drive signals COMA1 to COMA6 and COMB1 to COMB6 that drive the corresponding piezoelectric elements 60 such that ink is discharged from the nozzles N. The wire width of the wirings WC1 to WC6 propagating the drive signals COMC1 to COMC6 having such a small amount of current is made smaller than the wire width of the wirings WA1 to WA6 that propagate the drive signals COMA1 to COMA6, and smaller than the wire width of the wirings WB1 to WB6 that propagate the drive signals COMB1 to COMB6, so that the size of the wiring substrate 810 can be reduced.

Figure 19:
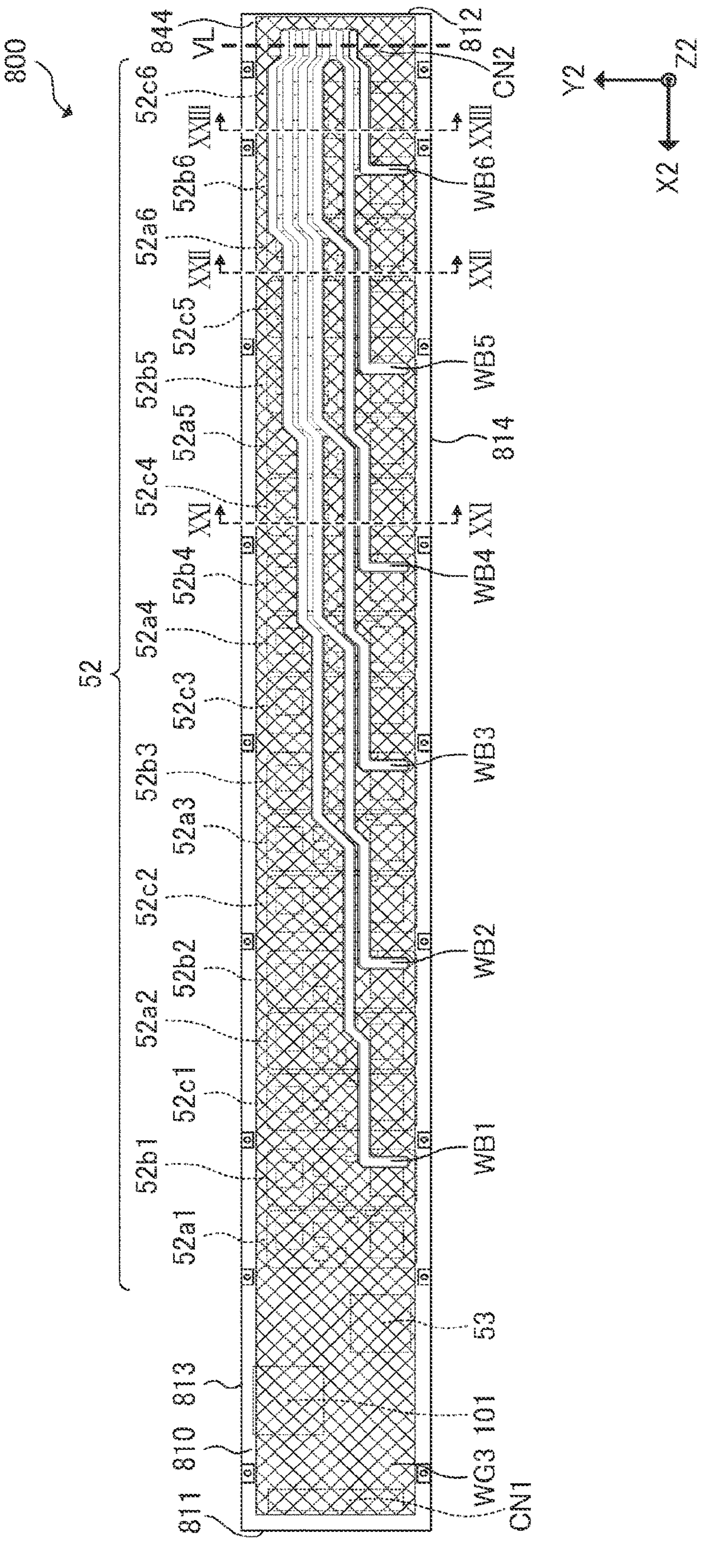
FIG. 19 is a diagram illustrating an example of a configuration of a layer of the wiring substrate.

Next, a specific example of the configuration of the layer 844 of the inner layers of the wiring substrate 810 will be described. FIG. 19 is a diagram illustrating an example of a configuration of the layer 844 of the wiring substrate 810. Here, FIG. 19 is a perspective view illustrating an example of the configuration of the layer 844 in a plan view of the wiring substrate 810. In FIG. 19, a part of the configuration provided other than the layer 844 of the wiring substrate 810 is illustrated by a broken line. The layer 844 and the layer 843 are located adjacent to each other in the plurality of wiring layers of the wiring substrate 810. That is, the layer 843 is located between the layer 842 and the layer 844 in the direction along the Z direction.

The wirings WB1 to WB6 are formed on the layer 844. One end of the wiring WB1 is electrically coupled to one end of the inductor L1 and one end of the capacitor C1 included in the drive circuit 52*b*1 through a via (not illustrated), and the other end of the wiring WB1 is electrically coupled to the coupling portion CN2 through a via (not illustrated) and the terminal TM2. As a result, the wiring WB1 propagates the drive signal COMB1 output by the drive circuit 52*b*1 to the coupling portion CN2.

The wiring WB2 is located on the −X2 side of the wiring WB1 and on the −Y2 side of the wiring WB1. One end of the wiring WB2 is electrically coupled to one end of the inductor L1 and one end of the capacitor C1 included in the drive circuit 52*b*2 through a via (not illustrated), and the other end of the wiring WB2 is electrically coupled to the coupling portion CN2 through a via (not illustrated) and the terminal TM2. As a result, the wiring WB2 propagates the drive signal COMB2 output by the drive circuit 52*b*2 to the coupling portion CN2.

The wiring WB3 is located on the −X2 side of the wiring WB2 and on the −Y2 side of the wiring WB2. One end of the wiring WB3 is electrically coupled to one end of the inductor L1 and one end of the capacitor C1 included in the drive circuit 52*b*3 through a via (not illustrated), and the other end of the wiring WB3 is electrically coupled to the coupling portion CN2 through a via (not illustrated) and the terminal TM2. As a result, the wiring WB3 propagates the drive signal COMB3 output by the drive circuit 52*b*3 to the coupling portion CN2.

The wiring WB4 is located on the −X2 side of the wiring WB3 and on the −Y2 side of the wiring WB3. One end of the wiring WB4 is electrically coupled to one end of the inductor L1 and one end of the capacitor C1 included in the drive circuit 52*b*4 through a via (not illustrated), and the other end of the wiring WB4 is electrically coupled to the coupling portion CN2 through a via (not illustrated) and the terminal TM2. As a result, the wiring WB4 propagates the drive signal COMB4 output by the drive circuit 52*b*4 to the coupling portion CN2.

The wiring WB5 is located on the −X2 side of the wiring WB4 and on the −Y2 side of the wiring WB4. One end of the wiring WB5 is electrically coupled to one end of the inductor L1 and one end of the capacitor C1 included in the drive circuit 52*b*5 through a via (not illustrated), and the other end of the wiring WB5 is electrically coupled to the coupling portion CN2 through a via (not illustrated) and the terminal TM2. As a result, the wiring WB5 propagates the drive signal COMB5 output by the drive circuit 52*b*5 to the coupling portion CN2.

The wiring WB6 is located on the −X2 side of the wiring WB5 and on the −Y2 side of the wiring WB5. One end of the wiring WB6 is electrically coupled to one end of the inductor L1 and one end of the capacitor C1 included in the drive circuit 52*b*6 through a via (not illustrated), and the other end of the wiring WB6 is electrically coupled to the coupling portion CN2 through a via (not illustrated) and the terminal TM2. As a result, the wiring WB6 propagates the drive signal COMB6 output by the drive circuit 52*b*6 to the coupling portion CN2.

That is, the wiring WB1 through which the drive signal COMB1 propagates, the wiring WB2 through which the drive signal COMB2 propagates, the wiring WB3 through which the drive signal COMB3 propagates, the wiring WB4 through which the drive signal COMB4 propagates, the wiring WB5 through which the drive signal COMB5 propagates, and the wiring WB6 through which the drive signal COMB6 propagates are located side by side in the order of the wiring WB1, the wiring WB2, the wiring WB3, the wiring WB4, the wiring WB5, and the wiring WB6 from the +Y2 side to the −Y2 side along the Y2 direction on the layer 844.

Here, in addition to the wirings WB1 to WB6, the layer 844 may be provided with a wiring pattern through which various signals such as the data signals DATA, the clock signals SCK1 to SCK6 generated by restoring the data signal DATA, the print data signals SI1 to SI6, and the latch signals LAT1 to LAT6 and a power supply voltage propagate, or via wiring for coupling the layers included in the wiring substrate 810 to each other may be provided.

In addition, the wiring WG3 is formed on the layer 844. Specifically, the wiring WG3 is formed in the layer 842 on substantially one surface of a region that does not overlap with the wirings WB1 to WB6 described above. At this time, at least a part of the wiring WG2 is also located in a region between the wiring WB1 and the wiring WB2, a region between the wiring WB2 and the wiring WB3, a region between the wiring WB3 and the wiring WB4, a region between the wiring WB4 and the wiring WB5, and in a region between the wiring WB5 and the wiring WB6.

As described above, the layer 844 of the plurality of wiring layers included in the wiring substrate 810 includes the wiring WB1 through which the drive signal COMB1 which is supplied to the electrode 602 of the piezoelectric element 60 included in the discharge module 23-1 and drives the piezoelectric element 60 such that ink is not discharged from the liquid discharge module 20 propagates, of the drive signal COM, the wiring WB2 through which the drive signal COMB2 which is supplied to the electrode 602 of the piezoelectric element 60 included in the discharge module 23-2 and drives the piezoelectric element 60 such that ink is not discharged from the liquid discharge module 20 propagates, of the drive signal COM, the wiring WB3 through which the drive signal COMB3 which is supplied to the electrode 602 of the piezoelectric element 60 included in the discharge module 23-3 and drives the piezoelectric element 60 such that ink is not discharged from the liquid discharge module 20 propagates, of the drive signal COM, the wiring WB4 through which the drive signal COMB4 which is supplied to the electrode 602 of the piezoelectric element 60 included in the discharge module 23-4 and drives the piezoelectric element 60 such that ink is not discharged from the liquid discharge module 20 propagates, of the drive signal COM, the wiring WB5 through which the drive signal COMB5 which is supplied to the electrode 602 of the piezoelectric element 60 included in the discharge module 23-5 and drives the piezoelectric element 60 such that ink is not discharged from the liquid discharge module 20 propagates, of the drive signal COM, the wiring WB6 through which the drive signal COMB6 which is supplied to the electrode 602 of the piezoelectric element 60 included in the discharge module 23-6 and drives the piezoelectric element 60 such that ink is not discharged from the liquid discharge module 20 propagates, of the drive signal COM, and at least a part of the wiring WG3 located between the wiring WB1 and the wiring WB2, between the wiring WB2 and the wiring WB3, between the wiring WB3 and the wiring WB4, between the wiring WB4 and the wiring WB5, and between the wiring WB5 and the wiring WB6.

Figure 20:
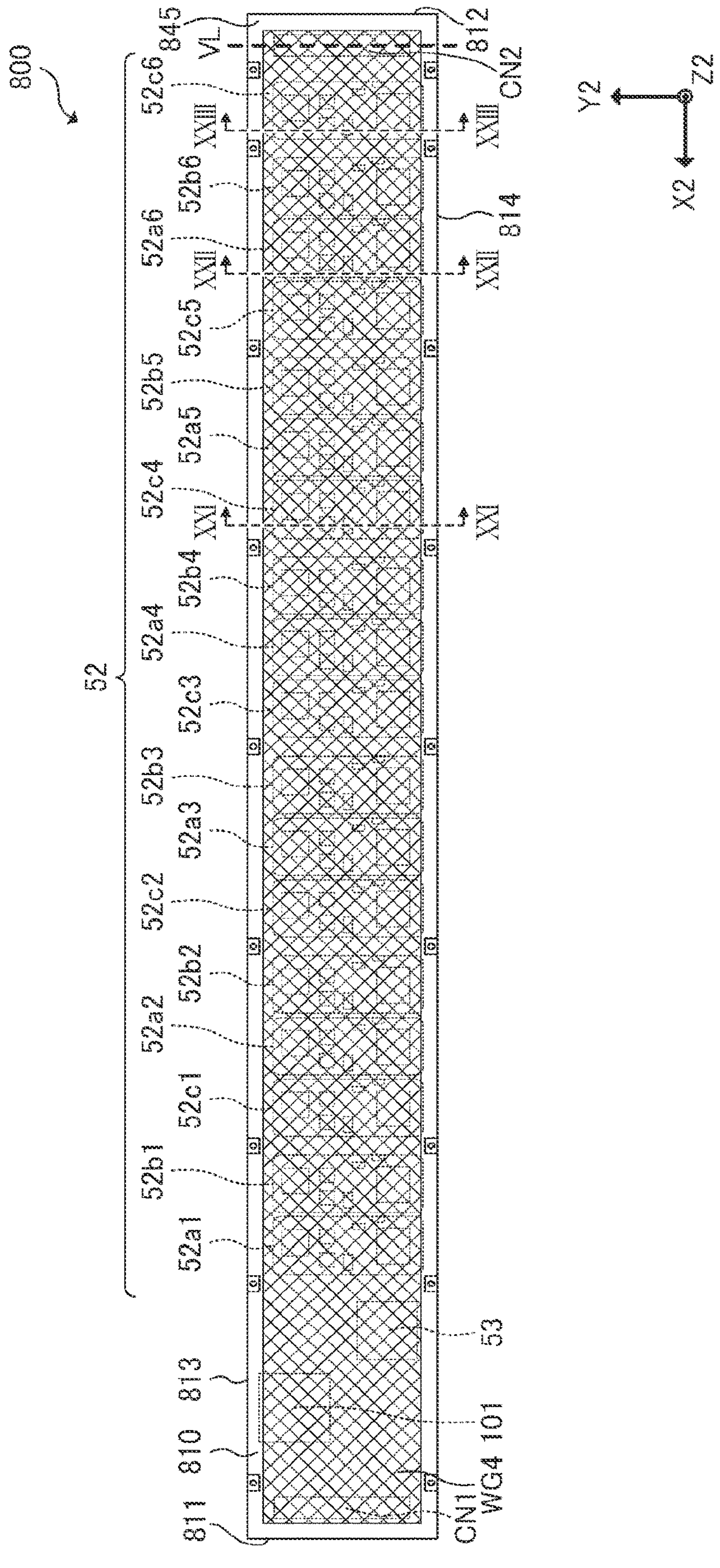
FIG. 20 is a diagram illustrating an example of a configuration of a layer of the wiring substrate.

Next, a specific example of the configuration of the layer 845 of the inner layers of the wiring substrate 810 will be described. FIG. 20 is a diagram illustrating an example of a configuration of the layer 845 of the wiring substrate 810. Here, FIG. 20 is a perspective view illustrating an example of the configuration of the layer 845 in a plan view of the wiring substrate 810. In FIG. 20, a part of the configuration provided other than the layer 845 of the wiring substrate 810 is illustrated by a broken line. The layer 843 is located between the layer 842 and the layer 845 in the direction along the Z direction.

As illustrated in FIG. 20, the wiring WG4 is formed on substantially one surface of the layer 845 in the layer 845. Specifically, the layer 845 is formed with the wiring WG4 such that at least a part thereof overlaps with at least a part of each of the drive circuits 52*a*1 to 52*a*6, 52*b*1 to 52*b*6, and 52*c*1 to 52*c*6, in a plan view of the wiring substrate 810. The ground potential GND, which is a signal having a constant voltage and is a reference potential of the drive circuit substrate 800, is supplied to the wiring WG4.

In FIG. 20, the case where only the wiring WG4 is formed on substantially one surface of the layer 845 is illustrated, but the present disclosure is not limited thereto. That is, in addition to the wiring WG4, the layer 845 may be provided with a wiring pattern through which various signals such as the data signals DATA, the clock signals SCK1 to SCK6 generated by restoring the data signal DATA, the print data signals SI1 to SI6, and the latch signals LAT1 to LAT6 and a power supply voltage propagate. Furthermore, the layer 845 may be provided with via wiring for electrically coupling the layers of the wiring substrate 810 to each other. Therefore, the fact that the wiring WG4 is formed on substantially one surface of the layer 845 is not limited to the fact that the wiring WG4 is formed in the entire region of the layer 845. Specifically, the wiring WG4 may occupy most of the region of the layer 845, and for example, the wiring WG4 may occupy 50% or more of the entire region of the layer 845.

That is, the wiring substrate 810 includes the layer 845 as a plurality of wiring layers, and the layer 845 includes the wiring WG4 through which a signal having a constant potential propagates. The wiring WG4 is located so as to overlap with the wirings WB1 to Wb6 through which the drive signals COMB1 to COMB6 propagate in the direction along the Z direction. As a result, the wiring WG4 functions as a shield that protects the wirings WB1 to WB6 from external noise.

Here, in the liquid discharge device 1 of the present embodiment, it is described that a constant potential signal propagated through the wiring WG4 is a ground signal, and the wiring WG4 may propagate a DC voltage such as a power supply voltage as a constant potential signal.

In the drive circuit substrate 800 configured as described above, in the direction along the Z direction, at least a part of the wiring WA1 is located so as to overlap with the wiring WS, at least a part of the wiring WA2 is located so as to overlap with the wiring WS, at least a part of the wiring WA3 is located so as to overlap with the wiring WS, at least a part of the wiring WA4 is located so as to overlap with the wiring WS, at least a part of the wiring WA5 is located so as to overlap with the wiring WS, and at least a part of the wiring WA6 is located so as to overlap with the wiring WS. In addition, in the direction along the Z direction, at least a part of the wiring WB1 is located so as to overlap with the wiring WA1, at least a part of the wiring WB2 is located so as to overlap with the wiring WA2, at least a part of the wiring WB3 is located so as to overlap with the wiring WA3, at least a part of the wiring WB4 is located so as to overlap with the wiring WA4, at least a part of the wiring WB5 is located so as to overlap with the wiring WA5, and at least a part of the wiring WB6 is located so as to overlap with the wiring WA6.

That is, in the direction along the Z direction, the wiring WS is located between the wiring WA1 and the wiring WB1, between the wiring WA2 and the wiring WB2, between the wiring WA3 and the wiring WB3, between the wiring WA4 and the wiring WB4, between the wiring WA5 and the wiring WB5, and between the wiring WA6 and the wiring WB6, respectively. As a result, the inductance component generated by the current flowing when the drive signals COMA1 to COMA6 and COMB1 to COMB6 are propagated is reduced. As a result, the possibility that the signal waveforms of the drive signals COMA1 to COMA6 and COMB to COMC6 are distorted by the inductance component is reduced.

In addition, the wiring WB1 is located such that at least a part thereof overlaps with the wiring WA1, the wiring WB2 is located such that at least a part thereof overlaps with the wiring WA2, the wiring WB3 is located such that at least a part thereof overlaps with the wiring WA3, the wiring WB4 is located such that at least a part thereof overlaps with the wiring WA4, the wiring WB5 is located such that at least a part thereof overlaps with the wiring WA5, and the wiring WB6 is located such that at least a part thereof overlaps with the wiring WA6. Therefore, the wiring WG3 provided in a layer 844, and at least a part of which is located between the wiring WB1 and the wiring WB2, between the wiring WB2 and the wiring WB3, between the wiring WB3 and the wiring WB4, between the wiring WB4 and the wiring WB5, and between the wiring WB5 and the wiring WB6, is located such that at least a part thereof overlaps with the inter-wire region BW12 between the wiring WA1 and the wiring WA2, the inter-wire region BW23 between the wiring WA2 and the wiring WA3, the inter-wire region BW34 between the wiring WA3 and the wiring WA4, the inter-wire region BW45 between the wiring WA4 and the wiring WA5, and the inter-wire region BW56 between the wiring WA5 and the wiring WA6.

Furthermore, in the direction along the Z direction, at least a part of the wiring WC1 is located so as to overlap with the inter-wire region BW12, at least a part of the wiring WC2 is located so as to overlap with the inter-wire region BW23, at least a part of the wiring WC3 is located so as to overlap with the inter-wire region BW34, at least a part of the wiring WC4 is located so as to overlap with the inter-wire region BW45, and at least a part of the wiring WC5 is located so as to overlap with the inter-wire region BW56.

The drive signals COMC1 to COMC6 propagated through the wirings WC1 to WC6 are signals having smaller voltage values than those of the drive signals COMA1 to COMA6. Such drive signals COMC1 to COMC6 are located so as to overlap with the inter-wire regions BW12, BW23, BW34, BW45, and BW56, so that while reducing the possibility that the size of the wiring substrate 810 is increased, the possibility that the drive signals COMA1 to COMC6 are superimposed on the drive signals COMA1 to COMA6 is reduced.

In the wiring substrate 810 configured as described above, the layer 842 has a region in which the wiring WG2 is not disposed in a part of the inter-wire regions BW12, BW23, BW34, BW45, and BW56, and the layer 844 has a region with which the wiring WG4 does not overlap in a part of the inter-wire regions BW12, BW23, BW34, BW45, and BW56 when viewed along the Z direction.

Specifically, the inter-wire region BW12 includes a wide inter-wiring region wBW12 in which the inter-wiring distance between the wiring WA1 and the wiring WB2 is larger than the sum of the wire width of the wiring WC1 and the minimum diameter of the via wiring, and a narrow inter-wiring region nBW12 in which the inter-wiring distance between the wiring WA1 and the wiring WB2 is smaller than the sum of the wire width of the wiring WC1 and the minimum diameter of the via wiring and larger than the wire width of the via wiring. In the inter-wire region BW12, the narrow inter-wiring region nBW12 between a virtual line VL coupling the terminal TM2 for outputting the drive signal COMA1 and the terminal TM2 for outputting the drive signal COMA2 and the wide inter-wiring region wBW12 includes a region in which the wiring WG2 is not located, and the wiring WG4 does not overlap with the narrow inter-wiring region nBW12 between the virtual line VL and the wide inter-wiring region wBW12 when viewed along the Z direction.

Similarly, the inter-wire region BW23 includes a wide inter-wiring region wBW23 in which the inter-wiring distance between the wiring WA2 and the wiring WB3 is larger than the sum of the wire width of the wiring WC2 and the minimum diameter of the via wiring, and a narrow inter-wiring region nBW23 in which the inter-wiring distance between the wiring WA2 and the wiring WB3 is smaller than the sum of the wire width of the wiring WC2 and the minimum diameter of the via wiring and larger than the wire width of the via wiring. In the inter-wire region BW23, the narrow inter-wiring region nBW23 between a virtual line VL coupling the terminal TM2 for outputting the drive signal COMA2 and the terminal TM2 for outputting the drive signal COMA3 and the wide inter-wiring region wBW23 includes a region in which the wiring WG2 is not located, and the wiring WG4 does not overlap with the narrow inter-wiring region nBW23 between the virtual line VL and the wide inter-wiring region wBW23 when viewed along the Z direction.

Similarly, the inter-wire region BW34 includes a wide inter-wiring region wBW34 in which the inter-wiring distance between the wiring WA3 and the wiring WB4 is larger than the sum of the wire width of the wiring WC3 and the minimum diameter of the via wiring, and a narrow inter-wiring region nBW34 in which the inter-wiring distance between the wiring WA3 and the wiring WB4 is smaller than the sum of the wire width of the wiring WC3 and the minimum diameter of the via wiring and larger than the wire width of the via wiring. In the inter-wire region BW34, the narrow inter-wiring region nBW34 between a virtual line VL coupling the terminal TM2 for outputting the drive signal COMA3 and the terminal TM2 for outputting the drive signal COMA4 and the wide inter-wiring region wBW34 includes a region in which the wiring WG2 is not located, and the wiring WG4 does not overlap with the narrow inter-wiring region nBW34 between the virtual line VL and the wide inter-wiring region wBW34 when viewed along the Z direction.

Similarly, the inter-wire region BW45 includes a wide inter-wiring region wBW45 in which the inter-wiring distance between the wiring WA4 and the wiring WB5 is larger than the sum of the wire width of the wiring WC4 and the minimum diameter of the via wiring, and a narrow inter-wiring region nBW45 in which the inter-wiring distance between the wiring WA4 and the wiring WB5 is smaller than the sum of the wire width of the wiring WC4 and the minimum diameter of the via wiring and larger than the wire width of the via wiring. In the inter-wire region BW45, the narrow inter-wiring region nBW45 between a virtual line VL coupling the terminal TM2 for outputting the drive signal COMA4 and the terminal TM2 for outputting the drive signal COMA5 and the wide inter-wiring region wBW45 includes a region in which the wiring WG2 is not located, and the wiring WG4 does not overlap with the narrow inter-wiring region nBW45 between the virtual line VL and the wide inter-wiring region wBW45 when viewed along the Z direction.

Similarly, the inter-wire region BW56 includes a wide inter-wiring region wBW56 in which the inter-wiring distance between the wiring WA5 and the wiring WB6 is larger than the sum of the wire width of the wiring WC5 and the minimum diameter of the via wiring, and a narrow inter-wiring region nBW56 in which the inter-wiring distance between the wiring WA5 and the wiring WB6 is smaller than the sum of the wire width of the wiring WC5 and the minimum diameter of the via wiring and larger than the wire width of the via wiring. In the inter-wire region BW56, the narrow inter-wiring region nBW56 between a virtual line VL coupling the terminal TM2 for outputting the drive signal COMA5 and the terminal TM2 for outputting the drive signal COMA6 and the wide inter-wiring region wBW56 includes a region in which the wiring WG2 is not located, and the wiring WG4 does not overlap with the narrow inter-wiring region nBW56 between the virtual line VL and the wide inter-wiring region wBW56 when viewed along the Z direction.

Here, the wire widths of the wirings WC1 to WC6 correspond to the length of the wirings WC1 to WC6 in a direction intersecting, and preferably orthogonal to the direction from one end of the inductor L1 of each of the drive circuits 52*c*1 to 52*c*6 toward the terminal TM2. In addition, the minimum diameter of the via wiring corresponds to the diameter of the smallest via wiring among the via wiring formed on the wiring substrate 810. That is, the wide inter-wiring regions wBW12, wBW23, wBW34, wBW45, and wBW56 larger than the sum of the wire widths of the wirings WC1 to WC5 and the minimum diameter of the via wiring correspond to a region in which the via wiring can be provided in each of the inter-wire regions BW12, BW23, BW34, BW45, and BW56. The narrow inter-wiring region nBW12, nBW23, nBW34, nBW45, and nBW56 smaller than the sum of the wire widths of the wirings WC1 to WC5 and the minimum diameter of the via wirings and larger than the wire width of the via wiring correspond to a region i which the via wiring cannot be provided in each of the inter-wire regions BW12, BW23, BW34, BW45, and BW56. That is, the via wiring included in the wiring substrate 810 is located in the wide inter-wiring region wBW12, wBW23, wBW34, wBW45, and wBW56, and is not located in the narrow inter-wiring region nBW12, nBW23, nBW34, nBW45, and nBW56.

A specific example of such a configuration will be described with reference to FIGS. 21 to 23. Here, the relationship of the narrow inter-wiring region nBW12 where the wiring WG2 is not located between the virtual line VL and the wide inter-wiring region wBW12 in the inter-wire region BW12, the relationship of the narrow inter-wiring region nBW23 where the wiring WG2 is not located between the virtual line VL and the wide inter-wiring region wBW23 in the inter-wire region BW23, the relationship of the narrow inter-wiring region nBW34 where the wiring WG2 is not located between the virtual line VL and the wide inter-wiring region wBW34 in the inter-wire region BW34, the relationship of the narrow inter-wiring region nBW45 where the wiring WG2 is not located between the virtual line VL and the wide inter-wiring region wBW45 in the inter-wire region BW45, and the relationship of the narrow inter-wiring region nBW56 where the wiring WG2 is not located between the virtual line VL and the wide inter-wiring region wBW56 in the inter-wire region BW56, are all the same as each other. Furthermore, the relationship of the narrow inter-wiring region nBW12 where the wiring WG4 is not overlapped between the virtual line VL and the wide inter-wiring region wBW12 in the inter-wire region BW12, the relationship of the narrow inter-wiring region nBW23 where the wiring WG4 is not overlapped between the virtual line VL and the wide inter-wiring region wBW23 in the inter-wire region BW23, the relationship of the narrow inter-wiring region nBW34 where the wiring WG4 is not overlapped between the virtual line VL and the wide inter-wiring region wBW34 in the inter-wire region BW34, the relationship of the narrow inter-wiring region nBW45 where the wiring WG4 is not overlapped between the virtual line VL and the wide inter-wiring region wBW45 in the inter-wire region BW45, and the relationship of the narrow inter-wiring region nBW56 where the wiring WG4 is not overlapped between the virtual line VL and the wide inter-wiring region wBW56 in the inter-wire region BW56, are all the same as each other.

Therefore, in the following description, in the inter-wire region BW34, only the relationship of the narrow inter-wiring region nBW34 where the wiring WG2 is not located between the virtual line VL and the wide inter-wiring region wBW34, and the relationship of the narrow inter-wiring region nBW34 where the wiring WG4 is not overlapped will be described.

Figure 21:
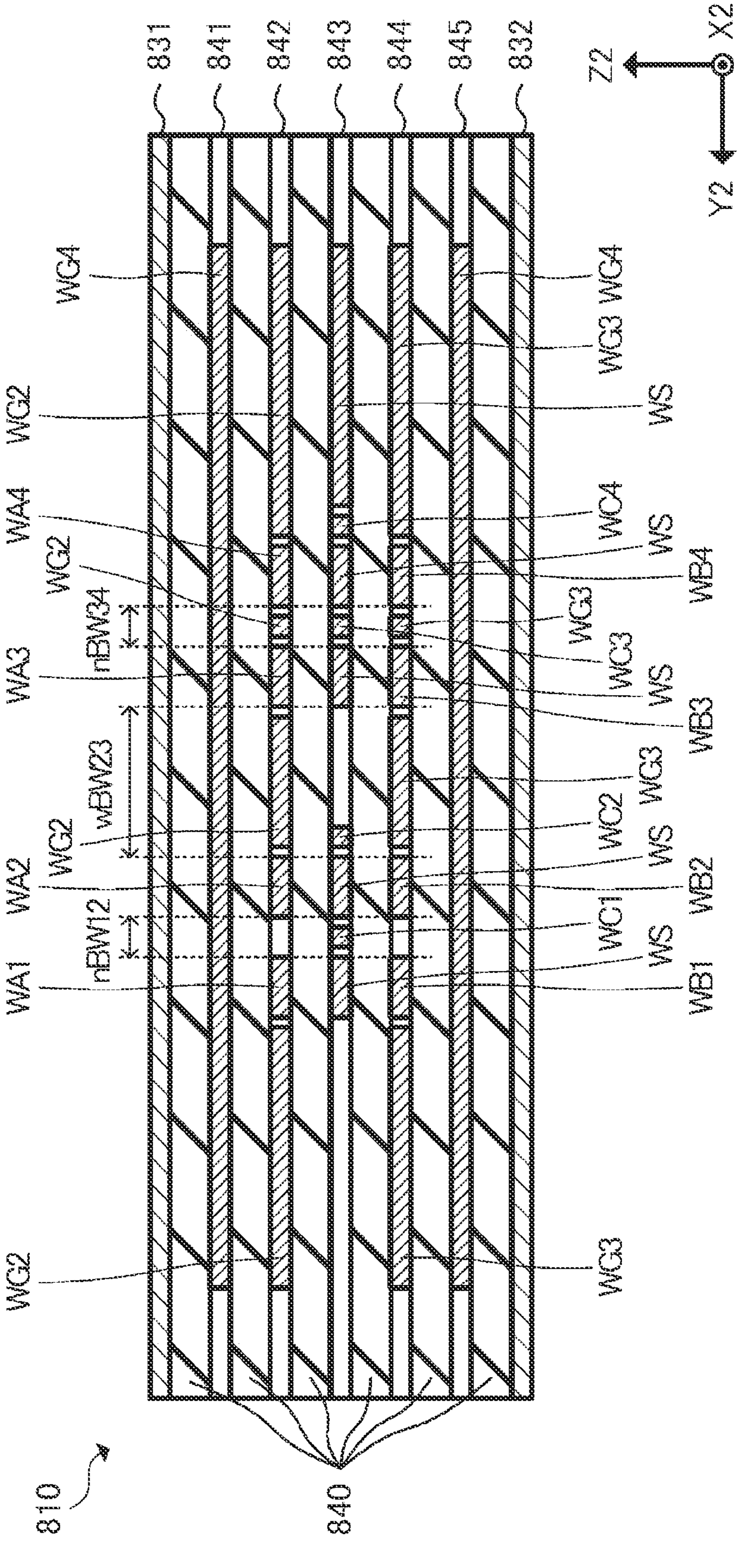
FIG. 21 is a cross-sectional view of the wiring substrate when the wiring substrate is cut along the line XXI-XXI.

FIG. 21 is a cross-sectional view of the wiring substrate 810 when the wiring substrate 810 is cut along the line XXI-XXI illustrated in FIGS. 15 to 20. FIG. 22 is a cross-sectional view of the wiring substrate 810 when the wiring substrate 810 is cut along the line XXII-XXII illustrated in FIGS. 15 to 20. FIG. 23 is a cross-sectional view of the wiring substrate 810 when the wiring substrate 810 is cut along the line XXIII-XXIII illustrated in FIGS. 15 to 20.

Here, the line XXI-XXI is a line segment that cuts the wiring substrate 810 along the Y2 direction at a position where the inter-wire region BW34 is the narrow inter-wiring region nBW34, the XXII-XXII line is located on the coupling portion CN2 side than line XXI-XXI and is a line segment that cuts the wiring substrate 810 along the Y2 direction at a position where the inter-wire region BW34 is the wide inter-wiring region wBW34, and the line XXIII-XXIII is located on the coupling portion CN2 side than line XXII-XXII and is a line segment that cuts the wiring substrate 810 along the Y2 direction at a position where the inter-wire region BW34 is the narrow inter-wiring region nBW34.

As illustrated in FIG. 21, in a cross section of the wiring substrate 810 cut by the line segment XXI-XXI, the wiring WG2 is located in the narrow inter-wiring region nBW34 of the layer 842, the wiring WC3 is located in a region that overlaps the narrow inter-wiring region nBW34 of the layer 843 when viewed along the Z direction, and the wiring WG3 is located in a region that overlaps with the narrow inter-wiring region nBW34 of the layer 844 when viewed along the Z direction. That is, in a cross section of the wiring substrate 810 cut by the line segment XXI-XXI, at least a part of the wiring WC3 is located so as to overlap with the wiring WG2 and the wiring WG3 when viewed along the Z direction.

Figure 22:
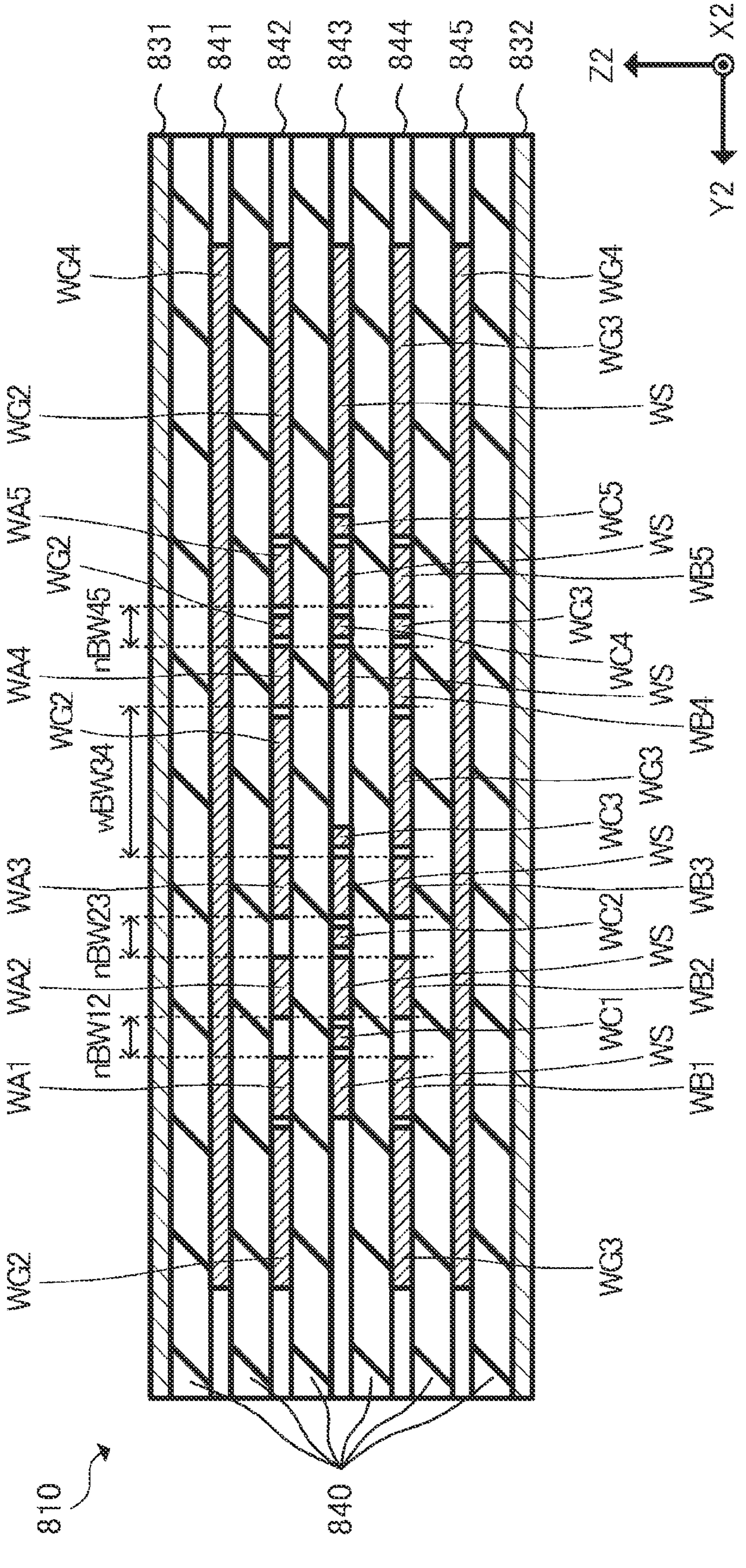
FIG. 22 is a cross-sectional view of the wiring substrate when the wiring substrate is cut along the line XXII-XXII.

As illustrated in FIG. 22, in a cross section of the wiring substrate 810 cut by the line segment XXII-XXII, the wiring WG2 is located in the wide inter-wiring region wBW34 of the layer 842, the wiring WC3 is located in a region that overlaps the wide inter-wiring region wBW34 of the layer 843 when viewed along the Z direction, and the wiring WG3 is located in a region that overlaps with the wide inter-wiring region wBW34 of the layer 844 when viewed along the Z direction. That is, in a cross section of the wiring substrate 810 cut by the line segment XXII-XXII, at least a part of the wiring WC3 is located so as to overlap with the wiring WG2 and the wiring WG3 when viewed along the Z direction.

Figure 23:
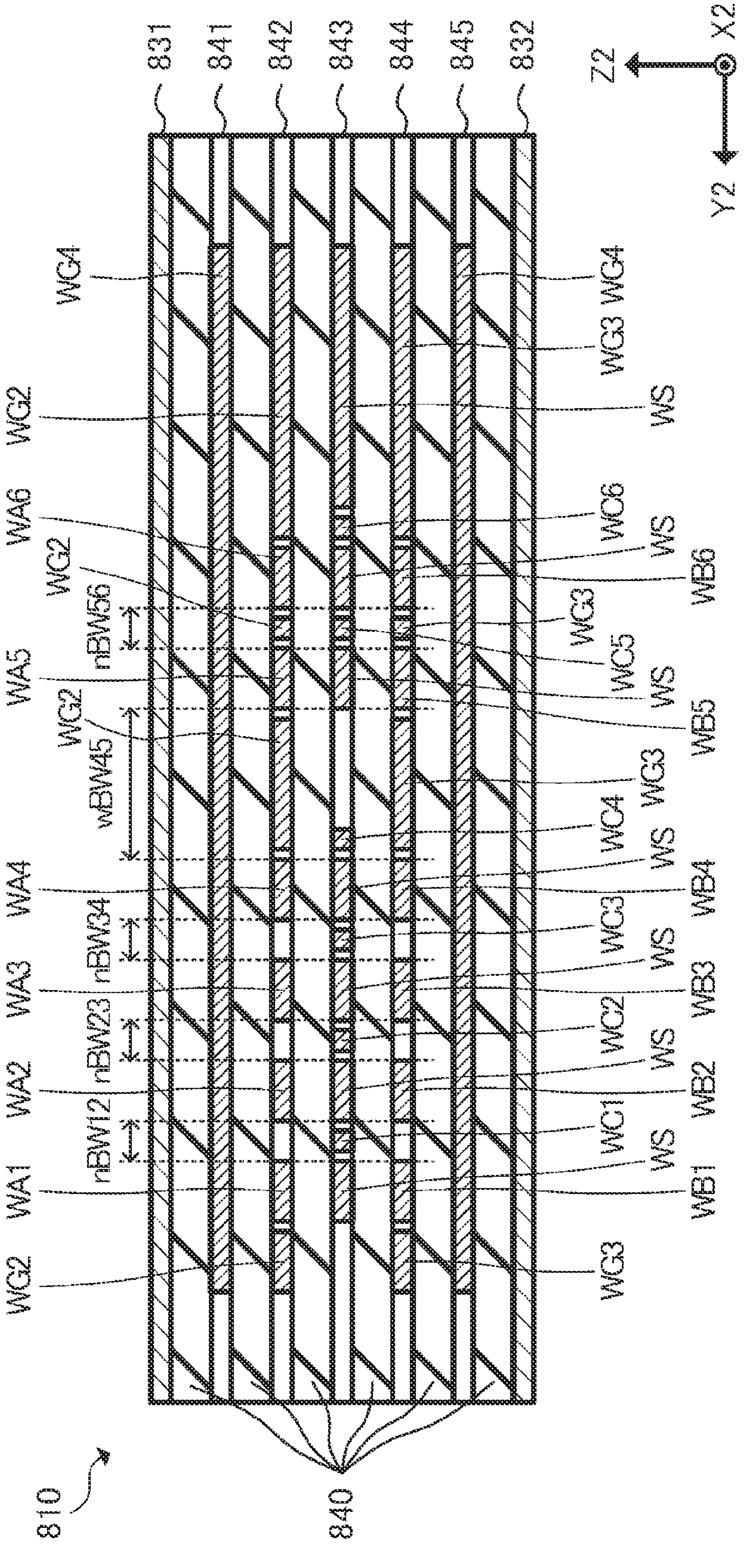
FIG. 23 is a cross-sectional view of the wiring substrate when the wiring substrate is cut along the line XXIII-XXIII.

As illustrated in FIG. 23, in a cross section of the wiring substrate 810 cut by the line segment XXIII-XXIII, the wiring WG2 is not located in the narrow inter-wiring region nBW34 of the layer 842, the wiring WC3 is located in a region that overlaps the narrow inter-wiring region nBW34 of the layer 843 when viewed along the Z direction, and the wiring WG3 is not located in a region that overlaps with the narrow inter-wiring region nBW34 of the layer 844 when viewed along the Z direction. That is, in the cross section of the wiring substrate 810 cut by the line segment XXIII-XXIII, the wiring WC3 does not overlap with the wiring WG2 and the wiring WG3 when viewed along the Z direction. At this time, it is preferable that a wiring pattern through which other than the wiring WA3 and the wiring WA4 propagates is not formed in the narrow inter-wiring region nBW34 of the layer 842, and a wiring pattern other than the wiring WB3 and the wiring WB4 is not formed in the region overlapping with the narrow inter-wiring region nBW34 of the layer 844.

As illustrated in FIGS. 15 to 20, in the inter-wire region BW34, the wide inter-wiring region wBW34 is not located on the coupling portion CN2 side than the line segment XXIII-XXIII. That is, the wiring WG2 is not located in the narrow inter-wiring region nBW34 located on the coupling portion CN2 side than the wide inter-wiring region wBW34 located closest to the coupling portion CN2, and the wiring WG3 is not located in the region overlapping with the narrow inter-wiring region nBW34 located on the coupling portion CN2 side than the wide inter-wiring region wBW34 located closest to the coupling portion CN2.

Here, as described above, the wide inter-wiring region wBW34 is a region in which the via wiring can be provided, and the narrow inter-wiring region nBW34 is a region in which the via wiring cannot be provided. Therefore, when the wiring WG3 is not located in the region overlapping with the narrow inter-wiring region nBW34 located on the coupling portion CN2 side than the wide inter-wiring region wBW34 located closest to the coupling portion CN2, in a case in which the via wiring cannot be provided between the coupling portion CN2 and the wide inter-wiring region wBW34, no wiring pattern other than the wiring WA3 and the wiring WA4 is provided in the region of the coupling portion CN2 than the wide inter-wiring region wBW34 of the layer 842, and no wiring pattern other than the wiring WB3 and the wiring WB4 is provided in the region of the layer 844 overlapping with the region of the coupling portion CN2 than the wide inter-wiring region wBW34 of the layer 842.

Similarly, the wiring WG2 is not located in the narrow inter-wiring region nBW12 located on the coupling portion CN2 side than the wide inter-wiring region wBW12 located closest to the coupling portion CN2, and the wiring WG3 is not located in the region overlapping with the narrow inter-wiring region nBW12 located on the coupling portion CN2 side than the wide inter-wiring region wBW12 located closest to the coupling portion CN2. The wiring WG2 is not located in the narrow inter-wiring region nBW23 located on the coupling portion CN2 side than the wide inter-wiring region wBW23 located closest to the coupling portion CN2, and the wiring WG3 is not located in the region overlapping with the narrow inter-wiring region nBW23 located on the coupling portion CN2 side than the wide inter-wiring region wBW23 located closest to the coupling portion CN2. The wiring WG2 is not located in the narrow inter-wiring region nBW45 located on the coupling portion CN2 side than the wide inter-wiring region wBW45 located closest to the coupling portion CN2, and the wiring WG3 is not located in the region overlapping with the narrow inter-wiring region nBW45 located on the coupling portion CN2 side than the wide inter-wiring region wBW45 located closest to the coupling portion CN2. The wiring WG2 is not located in the narrow inter-wiring region nBW56 located on the coupling portion CN2 side than the wide inter-wiring region wBW56 located closest to the coupling portion CN2, and the wiring WG3 is not located in the region overlapping with the narrow inter-wiring region nBW56 located on the coupling portion CN2 side than the wide inter-wiring region wBW56 located closest to the coupling portion CN2.

In the liquid discharge device 1 configured as described above, the liquid discharge module 20 is an example of a discharge head, the piezoelectric element 60 included in the discharge module 23-3 of the liquid discharge module 20 is an example of a first piezoelectric element, the electrode 602 of the piezoelectric element 60 is an example of a first electrode, and the electrode 603 of the piezoelectric element 60 is an example of a second electrode. In addition, the piezoelectric element 60 included in the discharge module 23-4 of the liquid discharge module 20 is an example of a second piezoelectric element, the electrode 602 of the piezoelectric element 60 is an example of a third electrode, and the electrode 603 of the piezoelectric element 60 is an example of a fourth electrode. The drive signals COM and VOUT are examples of drive signals, the drive signal COMA3 is an example of a first drive signal, the drive signal COMA4 is an example of a second drive signal, the drive signal COMC3 is an example of a third drive signal, the drive signal COMB3 is an example of a fourth drive signal, and the drive signal COMB4 is an example of a fifth drive signal, of the drive signal COM.

In addition, the layer 842 is an example of a first wiring layer, the layer 843 is an example of a second wiring layer, the layer 841 is an example of a third wiring layer, the layer 844 is an example of a fourth wiring layer, and the layer 845 is an example of a sixth wiring layer. The wiring WA3 is an example of first wiring, the wiring WA4 is an example of second wiring, the wiring WG2 is an example of third wiring, the wiring WC3 is an example of fourth wiring, the wiring WS is an example of fifth wiring, the wiring WG1 is an example of sixth wiring, the wiring WB3 is an example of seventh wiring, the wiring WB4 is an example of eighth wiring, the wiring WG3 is an example of ninth wiring, and the wiring wG4 is an example of eleventh wiring. In addition, the inter-wire region BW34 is an example of an inter-wiring region, TM2 to which the drive signal COMA3 is supplied is an example of a first terminal in the terminal TM2, and TM2 to which the drive signal COMA4 is supplied is an example of a second terminal in the terminal TM2. The Z direction is an example of the first direction.

7. Action and Effect

In the liquid discharge device 1 and the wiring substrate 810 configured as described above, the inter-wire region BW34 includes the wide inter-wiring region wBW34 in which the inter-wiring distance between the wiring WA3 and the wiring WB4 is larger than the sum of the wire width of the wiring WC3 and the minimum diameter of the via wiring, and the narrow inter-wiring region nBW34 in which the inter-wiring distance between the wiring WA3 and the wiring WB4 is smaller than the sum of the wire width of the wiring WC3 and the minimum diameter of the via wiring and larger than the wire width of the via wiring. In the inter-wire region BW34, the narrow inter-wiring region nBW34 between a virtual line VL coupling the terminal TM2 for outputting the drive signal COMA3 and the terminal TM2 for outputting the drive signal COMA4 and the wide inter-wiring region wBW34 includes a region in which the wiring WG2 is not located. As a result, in the inter-wire region BW34, the wiring WG2 serves as an antenna, and the possibility that noise is superimposed on the wiring WG2 is reduced. As a result, noise superimposed on the wiring WG2 contributes to the wiring WC3 located overlapping with the inter-wire region BW34, and the possibility that the waveform accuracy of the drive signal COMC propagated through the wiring WC3 is lowered is reduced. That is, the accuracy of the drive signal COMC supplied to the discharge module 23-3 is improved.

Furthermore, when viewed along the Z direction, the wiring WG4 does not overlap with the narrow inter-wiring region nBW34 between the virtual line VL and the wide inter-wiring region wBW34, so that the wiring WG4 serves as an antenna and the possibility that noise is superimposed on the wiring WG4 is reduced. As a result, noise superimposed on the wiring WG4 contributes to the wiring WC3 located overlapping with the inter-wire region BW34, and the possibility that the waveform accuracy of the drive signal COMC propagated through the wiring WC3 is lowered is reduced. That is, the accuracy of the drive signal COMC supplied to the discharge module 23-3 is further improved.

8. Modification Example

In the liquid discharge device 1 described above, the wiring substrate 810 may include a wiring layer located between the layer 843 and the layer 844 and in which a wiring pattern through which the reference voltage signal VBS is propagated is provided on substantially one surface. That is, the wiring substrate 810 includes the wiring layer in which the wiring pattern for propagating the reference voltage signal VBS supplied to the electrode 603 of the piezoelectric element 60 included in each of the discharge modules 23-1 to 23-6 is provided on substantially one surface, among the plurality of wiring layers, and the wiring layer may be located between the layer 843 and the layer 844 in a direction along the Z direction. As a result, the resistance value of the feedback path that feeds back after the drive signals COMA, COMB, and COMC are supplied to the piezoelectric element 60 can be reduced, and the possibility that the voltage value of the reference voltage signal VBS changes is reduced.

Here, the wiring layer located between the layer 843 and the layer 844 and in which the wiring pattern for propagating the reference voltage signal VBS is provided on substantially one surface is an example of a fifth wiring layer, and the wiring pattern through which the reference voltage signal VBS is propagated and which is provided on substantially one surface of the wiring layer is an example of a tenth wiring.

Although the embodiments and the modification example have been described above, the present disclosure is not limited to these embodiments, and can be implemented in various aspects without departing from the gist thereof. For example, the above embodiments can be combined as appropriate.

The present disclosure includes a configuration substantially the same as the configuration described in the embodiments (for example, a configuration having the same function, method, and result, or a configuration having the same object and effect). In addition, the present disclosure also includes a configuration in which a non-essential part of the configuration described in the embodiments is replaced. In addition, the present disclosure also includes a configuration that exhibits the same action and effect as those of the configuration described in the embodiments or a configuration that can achieve the same object. In addition, the present disclosure also includes a configuration in which a known technique is added to the configuration described in the embodiments.

The following contents are derived from the above-described embodiments.

According to an aspect of the present disclosure, there is provided a liquid discharge device including a discharge head that includes a first piezoelectric element having a first electrode and a second electrode, and a second piezoelectric element having a third electrode and a fourth electrode, and that discharges a liquid by driving the first piezoelectric element and the second piezoelectric element, and a wiring substrate through which a drive signal for driving the first piezoelectric element and the second piezoelectric element propagates, and includes a plurality of wiring layers provided along a first direction and a via wiring electrically coupling layers of the plurality of wiring layers, in which a first wiring layer among the plurality of wiring layers includes a first wiring through which a first drive signal supplied to the first electrode for driving the first piezoelectric element such that the liquid is discharged from the discharge head propagates, among the drive signals, a second wiring through which a second drive signal supplied to the third electrode for driving the second piezoelectric element such that the liquid is discharged from the discharge head propagates, among the drive signals, and a third wiring in which at least a part thereof located in an inter-wiring region between the first wiring and the second wiring, a second wiring layer among the plurality of wiring layers includes a fourth wiring through which a third drive signal supplied to the first electrode for driving the first piezoelectric element such that the liquid is not discharged from the discharge head propagates, among the drive signals, and a fifth wiring through which a reference voltage signal supplied to the second electrode and the fourth electrode and having a constant voltage value propagates, the wiring substrate includes a first terminal that outputs the first drive signal, and a second terminal that outputs a second drive signal, in which the first wiring layer and the second wiring layer are located adjacent to each other in the plurality of wiring layers, in a direction along the first direction, at least a part of the fourth wiring is located so as to overlap with the inter-wiring region, the inter-wiring region includes a wide inter-wiring region in which an inter-wiring distance between the first wiring and the second wiring is larger than a sum of a wire width of the fourth wiring and a minimum diameter of the via wiring, and a narrow inter-wiring region in which the inter-wiring distance is smaller than the sum of the wire width of the fourth wiring and the minimum diameter of the via wiring, and larger than a wire width of the via wiring, and the third wiring is not located in the narrow inter-wiring region between a virtual line coupling the first terminal and the second terminal, and the wide inter-wiring region, in the inter-wiring region of the first wiring layer.

According to this liquid discharge device, the fourth wiring through which the third drive signal having a small current value propagates is located such that at least a part of the fourth wiring overlaps the inter-wiring region in the direction along the first direction so as not to overlap with the first wiring through which the first drive signal having a large current value propagates, and the second wiring through which the second drive signal propagates. Therefore, the possibility that the signal waveforms of the first drive signal, the second drive signal, and the third drive signal are distorted due to the influence of the inductance is reduced.

Furthermore, in the direction along the first direction, in the inter-wiring region in which the fourth wiring is located, the third wiring is not located in the narrow inter-wiring region between the virtual line coupling the first terminal and the second terminal and the wide inter-wiring region, so that the third wiring serves as an antenna, and the possibility that noise is superimposed on the fourth wiring located overlapping in the first direction is reduced. As a result, the possibility that the signal waveform of the third drive signal propagating through the fourth wiring is distorted is reduced.

In an aspect of the liquid discharge device, the via wiring may be located in the wide inter-wiring region and may not be located in the narrow inter-wiring region.

In an aspect of the liquid discharge device, the wire width of the fourth wiring may be smaller than a wire width of the first wiring, and the wire width of the fourth wiring may be smaller than a wire width of the second wiring.

In an aspect of the liquid discharge device, in the direction along the first direction, at least a part of the first wiring may be located so as to overlap with the fifth wiring, and at least a part of the second wiring may be located so as to overlap with the fifth wiring.

According to this liquid discharge device, the first wiring through which the first drive signal propagates to the electrode 602 of the first piezoelectric element and the fifth wiring through which the reference voltage signal propagates to the electrode 603 of the first piezoelectric element are located facing each other along the first direction, so that an inductance component generated by a current accompanying supply of the first drive signal to the first piezoelectric element is canceled. The second wiring through which the second drive signal propagates to the electrode 602 of the second piezoelectric element and the fifth wiring through which the reference voltage signal propagates to the electrode 603 of the second piezoelectric element are located facing each other along the first direction, so that an inductance component generated by a current accompanying supply of the first drive signal to the first piezoelectric element is canceled. As a result, the possibility that the signal waveforms of the first drive signal and the second drive signal are distorted is reduced.

In an aspect of the liquid discharge device, a signal having a constant potential may be propagated through the third wiring.

In an aspect of the liquid discharge device, a constant signal at a ground potential may be propagated through the third wiring.

In an aspect of the liquid discharge device, a third wiring layer among the plurality of wiring layers may include a sixth wiring through which a signal having a constant potential propagates, in the direction along the first direction, the first wiring layer may be located between the second wiring layer and the third wiring layer, and in the direction along the first direction, at least a part of the sixth wiring may be located so as to overlap with the first wiring.

In an aspect of the liquid discharge device, a fourth wiring layer among the plurality of wiring layers may include a seventh wiring through which a fourth drive signal supplied to the first electrode for driving the first piezoelectric element such that the liquid is discharged from the discharge head propagates, among the drive signals, an eighth wiring through which a fifth drive signal supplied to the third electrode for driving the second piezoelectric element such that the liquid is discharged from the discharge head propagates, among the drive signals, and in the direction along the first direction, a ninth wiring in which at least a part thereof is located so as to overlap with the inter-wiring region, in the direction along the first direction, the second wiring layer may be located between the first wiring layer and the fourth wiring layer, in the direction along the first direction, at least a part of the seventh wiring may be located so as to overlap with the first wiring, and in the direction along the first direction, at least a part of the eighth wiring may be located so as to overlap with the second wiring.

In an aspect of the liquid discharge device, in the direction along the first direction, the ninth wiring may not overlap with the narrow inter-wiring region between the virtual line and the wide inter-wiring region.

In an aspect of the liquid discharge device, a fifth wiring layer among the plurality of wiring layers may include a tenth wiring through which the reference voltage signal supplied to the second electrode and the fourth electrode and having a constant voltage value propagates, and in the direction along the first direction, the fifth wiring layer may be located between the second wiring layer and the fourth wiring layer.

In an aspect of the liquid discharge device, a sixth wiring layer among the plurality of wiring layers may include an eleventh wiring through which a signal having a constant potential propagates, and in the direction along the first direction, the fourth wiring layer may be located between the second wiring layer and the sixth wiring layer.

According to another aspect of the present disclosure, there is provided a wiring substrate that a drive signal for driving a first piezoelectric element and a second piezoelectric element propagates to a discharge head which includes the first piezoelectric element having a first electrode and a second electrode, and the second piezoelectric element having a third electrode and a fourth electrode, and which discharges a liquid by driving the first piezoelectric element and the second piezoelectric element, the wiring substrate including a plurality of wiring layers provided along a first direction, a via wiring that electrically couples layers of the plurality of wiring layers, a first terminal that outputs a first drive signal, and a second terminal that outputs a second drive signal, in which a first wiring layer among the plurality of wiring layers includes a first wiring through which a first drive signal supplied to the first electrode for driving the first piezoelectric element such that the liquid is discharged from the discharge head propagates, among the drive signals, a second wiring through which a second drive signal supplied to the third electrode for driving the second piezoelectric element such that the liquid is discharged from the discharge head propagates, among the drive signals, and a third wiring in which at least a part thereof located in an inter-wiring region between the first wiring and the second wiring, a second wiring layer among the plurality of wiring layers includes a fourth wiring through which a third drive signal supplied to the first electrode for driving the first piezoelectric element such that the liquid is not discharged from the discharge head propagates, among the drive signals, and a fifth wiring through which a reference voltage signal supplied to the second electrode and the fourth electrode and having a constant voltage value propagates, the first wiring layer and the second wiring layer are located adjacent to each other in the plurality of wiring layers, in a direction along the first direction, at least a part of the fourth wiring is located so as to overlap with the inter-wiring region, the inter-wiring region includes a wide inter-wiring region in which an inter-wiring distance between the first wiring and the second wiring is larger than a sum of a wire width of the fourth wiring and a minimum diameter of the via wiring, and a narrow inter-wiring region in which the inter-wiring distance is smaller than the sum of the wire width of the fourth wiring and the minimum diameter of the via wiring, and larger than a wire width of the via wiring, and the third wiring is not located in the narrow inter-wiring region between a virtual line coupling the first terminal and the second terminal, and the wide inter-wiring region, in the inter-wiring region of the first wiring layer.

According to this wiring substrate, the fourth wiring through which the third drive signal having a small current value propagates is located such that at least a part of the fourth wiring overlaps the inter-wiring region in the direction along the first direction so as not to overlap with the first wiring through which the first drive signal having a large current value propagates, and the second wiring through which the second drive signal propagates. Therefore, the possibility that the signal waveforms of the first drive signal, the second drive signal, and the third drive signal are distorted due to the influence of the inductance is reduced.

Furthermore, in the direction along the first direction, in the inter-wiring region in which the fourth wiring is located, the third wiring is not located in the narrow inter-wiring region between the virtual line coupling the first terminal and the second terminal and the wide inter-wiring region, so that the third wiring serves as an antenna, and the possibility that noise is superimposed on the fourth wiring located overlapping in the first direction is reduced. As a result, the possibility that the signal waveform of the third drive signal propagating through the fourth wiring is distorted is reduced.

What is claimed is:

1. A liquid discharge device comprising:

a discharge head that includes a first piezoelectric element having a first electrode and a second electrode, and a second piezoelectric element having a third electrode and a fourth electrode, and that discharges a liquid by driving the first piezoelectric element and the second piezoelectric element; and a wiring substrate through which a drive signal for driving the first piezoelectric element and the second piezoelectric element propagates, and includes a plurality of wiring layers provided along a first direction and a via wiring electrically coupling layers of the plurality of wiring layers, wherein a first wiring layer among the plurality of wiring layers includes a first wiring through which a first drive signal supplied to the first electrode for driving the first piezoelectric element such that the liquid is discharged from the discharge head propagates, among the drive signals, a second wiring through which a second drive signal supplied to the third electrode for driving the second piezoelectric element such that the liquid is discharged from the discharge head propagates, among the drive signals, and a third wiring in which at least a part thereof is located in an inter-wiring region between the first wiring and the second wiring, a second wiring layer among the plurality of wiring layers includes a fourth wiring through which a third drive signal supplied to the first electrode for driving the first piezoelectric element such that the liquid is not discharged from the discharge head propagates, among the drive signals, and a fifth wiring through which a reference voltage signal supplied to the second electrode and the fourth electrode and having a constant voltage value propagates, the wiring substrate includes a first terminal that outputs the first drive signal, and a second terminal that outputs the second drive signal, the first wiring layer and the second wiring layer are located adjacent to each other in the plurality of wiring layers, in a direction along the first direction, at least a part of the fourth wiring is located so as to overlap with the inter-wiring region, the inter-wiring region includes a wide inter-wiring region in which an inter-wiring distance between the first wiring and the second wiring is larger than a sum of a wire width of the fourth wiring and a minimum diameter of the via wiring, and a narrow inter-wiring region in which the inter-wiring distance is smaller than the sum of the wire width of the fourth wiring and the minimum diameter of the via wiring, and larger than a wire width of the via wiring, and the third wiring is not located in the narrow inter-wiring region between a virtual line coupling the first terminal and the second terminal, and the wide inter-wiring region, in the inter-wiring region of the first wiring layer.

2. The liquid discharge device according to claim 1, wherein the via wiring is located in the wide inter-wiring region and not located in the narrow inter-wiring region.

3. The liquid discharge device according to claim 1, wherein the wire width of the fourth wiring is smaller than a wire width of the first wiring, and the wire width of the fourth wiring is smaller than a wire width of the second wiring.

4. The liquid discharge device according to claim 1, wherein in the direction along the first direction, at least a part of the first wiring is located so as to overlap with the fifth wiring, and at least a part of the second wiring is located so as to overlap with the fifth wiring.

5. The liquid discharge device according to claim 1, wherein a signal having a constant potential is propagated through the third wiring.

6. The liquid discharge device according to claim 4, wherein a constant signal at a ground potential is propagated through the third wiring.

7. The liquid discharge device according to claim 1, wherein a third wiring layer among the plurality of wiring layers includes a sixth wiring through which a signal having a constant potential propagates, in the direction along the first direction, the first wiring layer is located between the second wiring layer and the third wiring layer, and in the direction along the first direction, at least a part of the sixth wiring is located so as to overlap with the first wiring.

8. The liquid discharge device according to claim 1, wherein a fourth wiring layer among the plurality of wiring layers includes a seventh wiring through which a fourth drive signal supplied to the first electrode for driving the first piezoelectric element such that the liquid is discharged from the discharge head propagates, among the drive signals, an eighth wiring through which a fifth drive signal supplied to the third electrode for driving the second piezoelectric element such that the liquid is discharged from the discharge head propagates, among the drive signals, and in the direction along the first direction, a ninth wiring in which at least a part thereof is located so as to overlap with the inter-wiring region, in the direction along the first direction, the second wiring layer is located between the first wiring layer and the fourth wiring layer, in the direction along the first direction, at least a part of the seventh wiring is located so as to overlap with the first wiring, and in the direction along the first direction, at least a part of the eighth wiring is located so as to overlap with the second wiring.

9. The liquid discharge device according to claim 8, wherein in the direction along the first direction, the ninth wiring does not overlap with the narrow inter-wiring region between the virtual line and the wide inter-wiring region.

10. The liquid discharge device according to claim 8, wherein a fifth wiring layer among the plurality of wiring layers includes a tenth wiring through which the reference voltage signal supplied to the second electrode and the fourth electrode and having a constant voltage value propagates, and in the direction along the first direction, the fifth wiring layer is located between the second wiring layer and the fourth wiring layer.

11. The liquid discharge device according to claim 8, wherein a sixth wiring layer among the plurality of wiring layers includes an eleventh wiring through which a signal having a constant potential propagates, and in the direction along the first direction, the fourth wiring layer is located between the second wiring layer and the sixth wiring layer.

12. A wiring substrate through which a drive signal for driving a first piezoelectric element and a second piezoelectric element propagates to a discharge head which includes the first piezoelectric element having a first electrode and a second electrode, and the second piezoelectric element having a third electrode and a fourth electrode, and which discharges a liquid by driving the first piezoelectric element and the second piezoelectric element, the wiring substrate comprising:

a plurality of wiring layers provided along a first direction;

a via wiring that electrically couples layers of the plurality of wiring layers;

a first terminal that outputs a first drive signal; and a second terminal that outputs a second drive signal, wherein a first wiring layer among the plurality of wiring layers includes a first wiring through which a first drive signal supplied to the first electrode for driving the first piezoelectric element such that the liquid is discharged from the discharge head propagates, among the drive signals, a second wiring through which a second drive signal supplied to the third electrode for driving the second piezoelectric element such that the liquid is discharged from the discharge head propagates, among the drive signals, and a third wiring in which at least a part thereof located in an inter-wiring region between the first wiring and the second wiring, a second wiring layer among the plurality of wiring layers includes a fourth wiring through which a third drive signal supplied to the first electrode for driving the first piezoelectric element such that the liquid is not discharged from the discharge head propagates, among the drive signals, and a fifth wiring through which a reference voltage signal supplied to the second electrode and the fourth electrode and having a constant voltage value propagates, the first wiring layer and the second wiring layer are located adjacent to each other in the plurality of wiring layers, in a direction along the first direction, at least a part of the fourth wiring is located so as to overlap with the inter-wiring region, the inter-wiring region includes a wide inter-wiring region in which an inter-wiring distance between the first wiring and the second wiring is larger than a sum of a wire width of the fourth wiring and a minimum diameter of the via wiring, and a narrow inter-wiring region in which the inter-wiring distance is smaller than the sum of the wire width of the fourth wiring and the minimum diameter of the via wiring, and larger than a wire width of the via wiring, and the third wiring is not located in the narrow inter-wiring region between a virtual line coupling the first terminal and the second terminal, and the wide inter-wiring region, in the inter-wiring region of the first wiring layer.

* * * * *